(12) United States Patent
Sugita et al.

(10) Patent No.: US 10,731,398 B2
(45) Date of Patent: Aug. 4, 2020

(54) REVERSE ROTATION PREVENTION MECHANISM AND MOTOR WITH REDUCER

(71) Applicant: Mabuchi Motor Co., Ltd., Matsudo, Chiba (JP)

(72) Inventors: Ryoichi Sugita, Matsudo (JP); Toru Imai, Matsudo (JP)

(73) Assignee: Mabuchi Motor Co., Ltd., Matsudo (JP)

( * ) Notice: Subject to any disclaimer, the term of this patent is extended or adjusted under 35 U.S.C. 154(b) by 318 days.

(21) Appl. No.: 15/683,323

(22) Filed: Aug. 22, 2017

(65) Prior Publication Data

US 2017/0350182 A1  Dec. 7, 2017

Related U.S. Application Data

(63) Continuation of application No. PCT/JP2016/054071, filed on Feb. 12, 2016.

(30) Foreign Application Priority Data

Feb. 23, 2015  (JP) .................................. 2015-033202

(51) Int. Cl.
*F16D 59/00* (2006.01)
*E05F 15/697* (2015.01)
(Continued)

(52) U.S. Cl.
CPC ............ *E05F 15/697* (2015.01); *F16D 51/62* (2013.01); *F16D 59/00* (2013.01); *F16D 63/006* (2013.01);
(Continued)

(58) Field of Classification Search
CPC ...... E05F 15/697; F16D 51/62; F16D 63/006; F16D 65/22; F16H 1/16
See application file for complete search history.

(56) References Cited

U.S. PATENT DOCUMENTS 3,665,786 A * 5/1972 Kobayashi ............... B23Q 5/54
                                                            74/625
4,652,214 A   3/1987 Fabel
(Continued)

FOREIGN PATENT DOCUMENTS

JP           61-36476     2/1986
JP         7-71491 A      3/1995
(Continued)

OTHER PUBLICATIONS

Patent Cooperation Treaty: International Preliminary Report on Patentability for PCT/JP2016/054071 dated Aug. 29, 2017; 13 pages including English translation.
(Continued)

*Primary Examiner* — David M Fenstermacher
(74) *Attorney, Agent, or Firm* — Myers Wolin, LLC.

(57) ABSTRACT

A reverse rotation prevention mechanism is provided on a torque transmission path between an output shaft and a driving shaft of a motor. The reverse rotation prevention mechanism includes: a first frictional force generation unit configured to inhibit a lock plate provided on the torque transmission path from rotating relative to another member when an external force is exerted on the output shaft; and a second frictional force generation unit configured to generate a braking force that prevents reverse rotation when an external force is exerted on the output shaft by causing a portion of the lock plate to be pressed. The first frictional force generation unit is provided in an area different from the second frictional force generation unit.

12 Claims, 62 Drawing Sheets

(51) Int. Cl.

| | | |
|---|---|---|
| *F16D 51/62* | (2006.01) | |
| *F16D 65/16* | (2006.01) | |
| *F16D 63/00* | (2006.01) | |
| *F16D 65/22* | (2006.01) | |
| *F16H 1/16* | (2006.01) | |
| *F16D 127/00* | (2012.01) | |

(52) U.S. Cl.
CPC ............. *F16D 65/16* (2013.01); *F16D 65/22* (2013.01); *F16H 1/16* (2013.01); *E05Y 2201/216* (2013.01); *E05Y 2400/522* (2013.01); *E05Y 2900/55* (2013.01); *F16D 2127/004* (2013.01)

(56) References Cited

U.S. PATENT DOCUMENTS

| | | | | |
|---|---|---|---|---|
| 5,605,071 | A * | 2/1997 | Buchanan, Jr. | ............ F16H 1/16 188/134 |
| 5,777,411 | A | 7/1998 | Nakajima et al. | |
| 6,450,056 | B2 | 9/2002 | Torii et al. | |
| 6,789,443 | B1 * | 9/2004 | Torii | ...................... E05F 11/505 192/223.2 |
| 9,201,363 | B2 | 12/2015 | Fukunaga et al. | |
| 9,423,726 | B2 | 8/2016 | Morita et al. | |
| 2003/0000325 | A1 * | 1/2003 | Hoehn | ...................... F16H 3/24 74/425 |
| 2006/0117514 | A1 * | 6/2006 | Yagi | ........................ B60S 1/166 15/250.3 |
| 2007/0119280 | A1 | 5/2007 | Takahashi | |
| 2008/0022477 | A1 * | 1/2008 | Ota | ........................... B60S 1/08 15/250.34 |
| 2008/0087123 | A1 * | 4/2008 | Li | ............................ F16H 1/16 74/425 |
| 2010/0005918 | A1 * | 1/2010 | Mizuno | ................... B25J 9/102 74/490.03 |
| 2012/0073890 | A1 * | 3/2012 | Bindl | ...................... E02F 3/764 180/69.6 |
| 2013/0029801 | A1 * | 1/2013 | Oberle | .................. F16H 37/041 475/343 |
| 2015/0283834 | A1 | 10/2015 | Ohta | |
| 2017/0350182 | A1 | 12/2017 | Sugita et al. | |

FOREIGN PATENT DOCUMENTS

| | | |
|---|---|---|
| JP | 08-242551 | 9/1996 |
| JP | 2005-110449 A | 4/2005 |
| JP | 2007-40424 A | 2/2007 |
| JP | 2007-120758 A | 5/2007 |
| JP | 2010-048353 A | 3/2010 |
| WO | 2011/145388 A1 | 11/2011 |

OTHER PUBLICATIONS

International Search Report for PCT/JP2016/054071 dated May 17, 2016; 5 pages including English translation.
Notice of Reasons for Refusal for Japanese Application No. 2015-033202 dated May 31, 2017; 5 pages including English translation.
The State Intellectual Property Office of People's Republic of China: First Office Action for CN Application No. 201680011329.5 dated Aug. 28, 2018; 10 pages including English translation.
International Search Report issued by the Japan Patent Office for corresponding International Patent Application No. PCT/JP2016/071752, dated Oct. 4, 2016, with an English translation.
English translation of the International Preliminary Report on Patentability issued for corresponding International Patent Application No. PCT/JP2016/071752, dated Jan. 29, 2019.
Notice of Reasons for Refusal issued by the Japan Patent Office for corresponding Japanese Patent Application No. 2016-565704, dated Dec. 24, 2019, with an English translation.
Non-Final Office Action issued by the United States Patent and Trademark Office for corresponding U.S. Appl. No. 15/914,424, electronically dated Dec. 27, 2019.

* cited by examiner

28

28

36

36

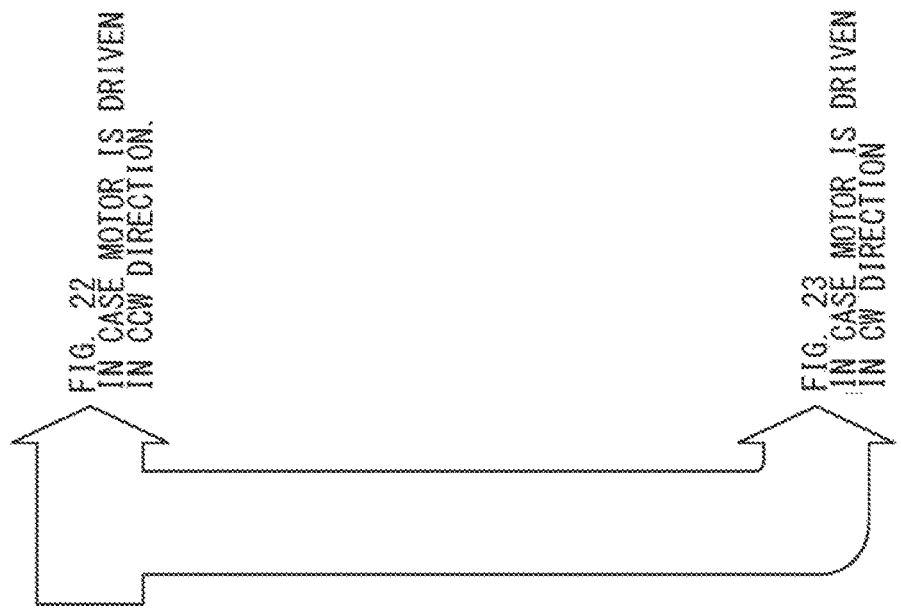
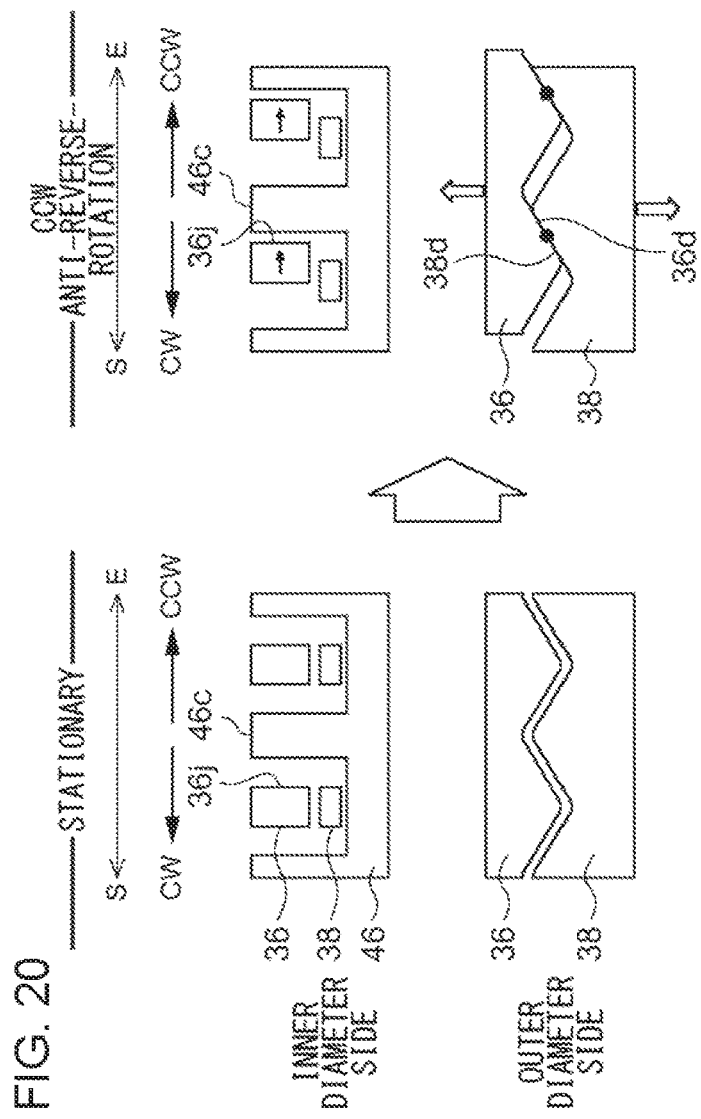
FIG. 20

64

64

68

68

70

70

74

74

222

222

US 10,731,398 B2

REVERSE ROTATION PREVENTION MECHANISM AND MOTOR WITH REDUCER

This application is based upon and claims the benefit of priority from the prior Japanese Patent Application No. 2015-033202 filed on Feb. 23, 2015, and International Patent Application No. PCT/JP2016/054071, filed on Feb. 12, 2016, the entire content of each of which is incorporated herein by reference.

BACKGROUND OF THE INVENTION

1. Field of the Invention

The present invention relates to mechanisms for preventing reverse rotation of a motor used to open or close a power window or sun roof of a vehicle.

2. Description of the Related Art

Motors provided with a reducer including a worm and a worm wheel are conventionally known. When used in an automobile power window system for moving a window vertically so as to open or close, motors provided with a reducer are required to have resistance to reverse rotation in order to prevent the window from opening under its own weight or vibration or being opened by a force from outside the vehicle.

Motors with a reducer furnished with a clutch mechanism to implement resistance to reverse rotation have been devised (see JP2010-48353). When a drive plate is rotated by an external exerted from the output side, the clutch mechanism presses the lock plate downward by causing the sloped surface of the drive plate and the sloped surface of the lock plate to come into sliding contact. A frictional force is generated between the lock plate and a facing member as the lock plate is thrust against the facing member, preventing the rotation of the lock plate and preventing reverse rotation due to an external force.

In the above-described clutch mechanism, the lock plate is pressed toward the facing member by a wave washer. For this reason, the lock plate slides over the facing member when the motor is driven, producing loss in the transmission torque. Further, abrasion of the facing member and the lock plate due to the sliding action could give rise to instability in frictional force in the presence of foreign materials or to reduction in life.

SUMMARY OF THE INVENTION

The present invention addresses these issues and a purpose thereof is to provide a mechanism that realizes stable anti-reverse-rotation performance.

A reverse rotation prevention mechanism according to an embodiment of the present invention is provided on a torque transmission path between an output shaft and a driving shaft of a motor and comprises: a first frictional force generation unit configured to inhibit a braking rotational member provided on the torque transmission path from rotating relative to another member when an external force is exerted on the output shaft; and a second frictional force generation unit configured to generate a braking force that prevents reverse rotation when an external force is exerted on the output shaft, by causing a portion of the braking rotational member to be pressed. The first frictional force generation unit is provided in an area different from the second frictional force generation unit.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 20 is a schematic diagram illustrating how the components work when an external force is exerted on the output shaft;

DETAILED DESCRIPTION OF THE INVENTION

Figure 1A:
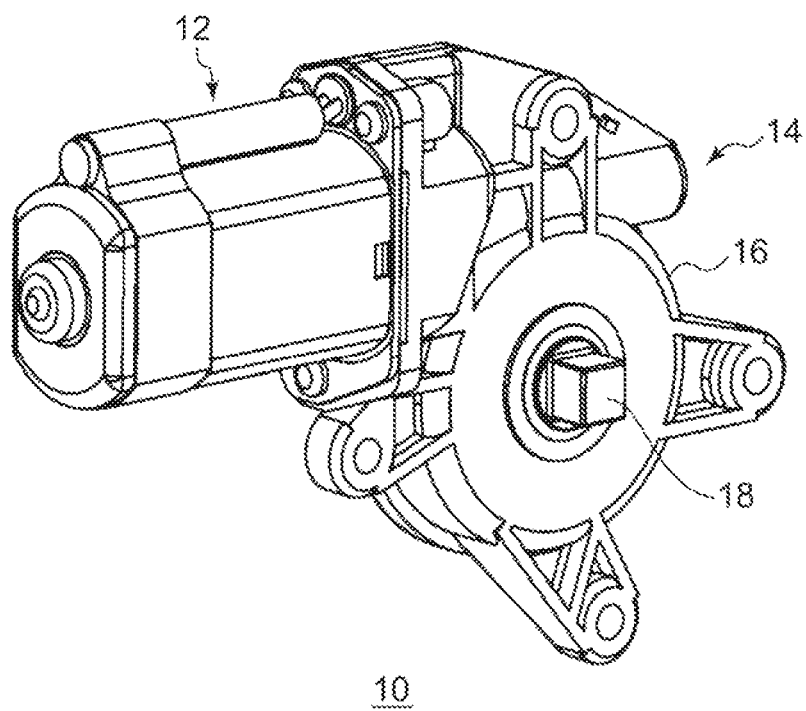
FIG. 1A is a perspective view of a motor with a reducer.

A reverse rotation prevention mechanism according to an embodiment of the present invention is provided on a torque transmission path between an output shaft and a driving shaft of a motor and comprises: a first frictional force generation unit configured to inhibit a braking rotational member provided on the torque transmission path from rotating relative to another member when an external force is exerted on the output shaft; and a second frictional force generation unit configured to generate a braking force that prevents reverse rotation when an external force is exerted on the output shaft, by causing a portion of the braking rotational member to be pressed. The first frictional force generation unit is provided in an area different from the second frictional force generation unit.

According to this embodiment, the second frictional force generation unit can be primarily configured to generate a braking force that prevents reverse rotation. Meanwhile, the first frictional force generation unit can be primarily configured to inhibit the rotation of the braking rotational member relative to another member. By providing frictional force generation units with different requirements for frictional force in separate areas, optimization and flexibility of design are promoted. For this reason, stable anti-reverse-rotation performance can be maintained for a long period of time.

The other member may be a non-rotating fixed member, and the first frictional force generation unit may be provided between the braking rotational member and the fixed member. This makes it difficult for the braking rotational member to move relative to the fixed member and inhibits the braking rotational member from co-rotating with another rotating body when an external force is exerted on the output shaft.

The other member may be a driving shaft side rotational member provided on the torque transmission path more toward the driving shaft of the motor than the braking rotational member. The driving shaft side rotational member may be engaged with and rotated along with the braking rotational member when the motor is driven. The first frictional force generation unit may be provided between the braking rotational member and the driving shaft side rotational member. This makes it difficult for the braking rotational member to move relative to the driving shaft side rotational member and inhibits the braking rotational member from co-rotating with another rotating body when an external force is exerted on the output shaft.

The reverse rotation prevention mechanism may further comprise a spacing mechanism that causes a portion of the braking rotational member to be spaced apart from the second frictional force generation unit when the motor is driven. This reduces the braking force from the second frictional force generation unit when the motor is driven.

A portion of the braking rotational member is a tapered surface tapered with respect to a central axis of the braking rotational member. Thus, a portion of the braking rotational member can generate a pressing force in a direction different from the direction in which the braking rotational member is pressed.

A taper angle of the tapered surface may be not less than 1° and less than 30°. This can generate a large pressing force.

The reverse rotation prevention mechanism may further comprise: a braking and pressing member configured to be spaced apart from the braking rotational member due to a reactive force responsive to a force that presses the braking rotational member against the second frictional force generation unit when an external force is exerted on the output shaft; and a third frictional force generation unit configured to generate a braking force that prevents reverse rotation when an external force is exerted on the output shaft, by causing a portion of the braking and pressing member to be pressed. This can generate a larger braking force.

Another embodiment of the present invention also relates to a reverse rotation prevention mechanism. The reverse rotation prevention mechanism is provided on a torque transmission path between an output shaft and a driving shaft of a motor, and comprises: a frictional force generation unit configured to generate a braking force that prevents reverse rotation when an external force is exerted on the output shaft, by causing a portion of the braking rotational member provided on the torque transmission path to be pressed; and a spacing mechanism that causes a portion of the braking rotational member to be spaced apart from the frictional force generation unit when the motor is driven.

According to this embodiment, the braking force from the frictional force generation unit is reduced when the motor is driven.

A motor with a reducer may comprise: a motor; a worm to which a rotational force of a driving shaft of the motor is transmitted; a worm wheel in mesh with the worm; an output shaft to which the rotational force exerted on the worm wheel is transmitted; and the reverse rotation prevention mechanism. By using a motor like this to open or close a power window or sun roof of a vehicle, for example, the window is prevented from opening under its own weight or vibration or being opened by a force from outside the vehicle.

The reverse rotation prevention mechanism may be provided on a torque transmission path between the driving shaft of the motor and the worm. This ensures that the external force exerted on the output shaft is reduced by the worm and the worm wheel before being exerted on the reverse rotation prevention mechanism, making it possible to lower the strength of members constituting the reverse rotation prevention mechanism.

The reverse rotation prevention mechanism may be provided on a torque transmission path between the worm wheel and the output shaft. By partly assigning the function of the reverse rotation prevention mechanism to the worm wheel, etc. (existent components), an increase in the number of components associated with the introduction of the reverse rotation prevention mechanism is inhibited.

Optional combinations of the aforementioned constituting elements, and implementations of the invention in the form of methods, apparatuses, and systems may also be practiced as additional modes of the present invention.

According to the present invention, stable anti-reverse-rotation performance is realized.

The motor with a reducer according to the present invention is applicable to devices adapted to reduce motor rotation and move an object accordingly. For example, the inventive motor can be suitably used in devices like a power window system, sun roof, power seat, door closure, etc. of a vehicle in which resistance to reverse rotation is required.

A description will be given of an embodiment of the present invention with reference to the drawings. Like numerals represent like elements so that the description will be omitted accordingly. The structure described below is by way of example only and does not limit the scope of the invention.

[Motor with a Reducer]

Figure 1B:
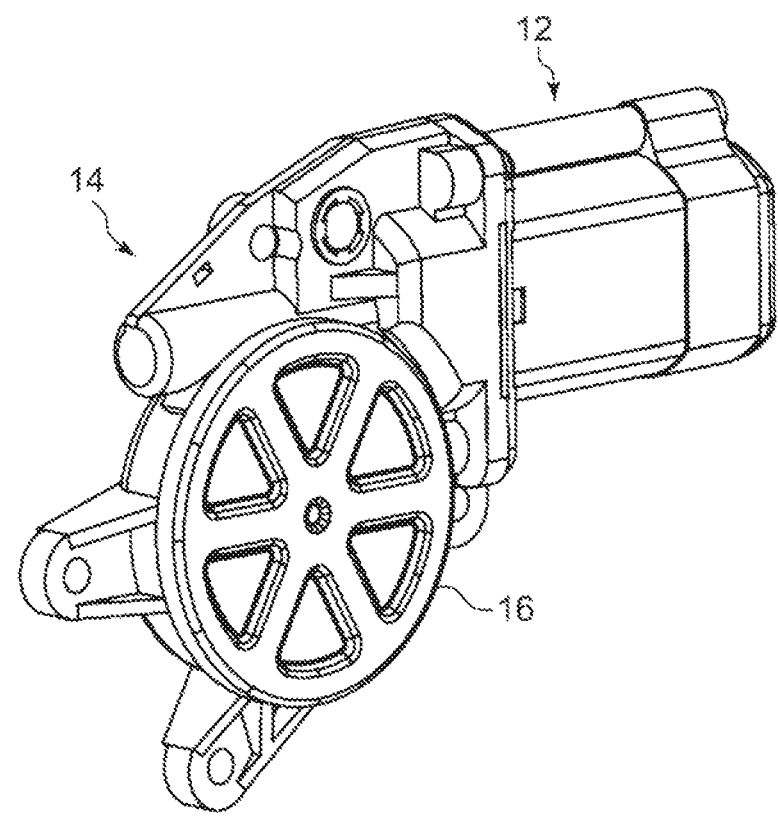
FIG. 1B is a perspective view of the motor with a reducer viewed from a direction different from that of FIG. 1A.

A description will be given of a schematic structure of the motor with a reducer. FIG. 1A is a perspective view of a motor with a reducer, and FIG. 1B is a perspective view of the motor with a reducer viewed from a direction different from that of FIG. 1A.

A DC motor 10 with a reducer includes a motor 12 (DC motor) and a reducer 14 coupled to the shaft of the motor 12. The reducer 14 includes a cylindrical housing 16 that houses a worm wheel described later. An output shaft 18 projects from one of the surfaces of the housing 16 of the reducer 14.

First Embodiment

Figure 2:
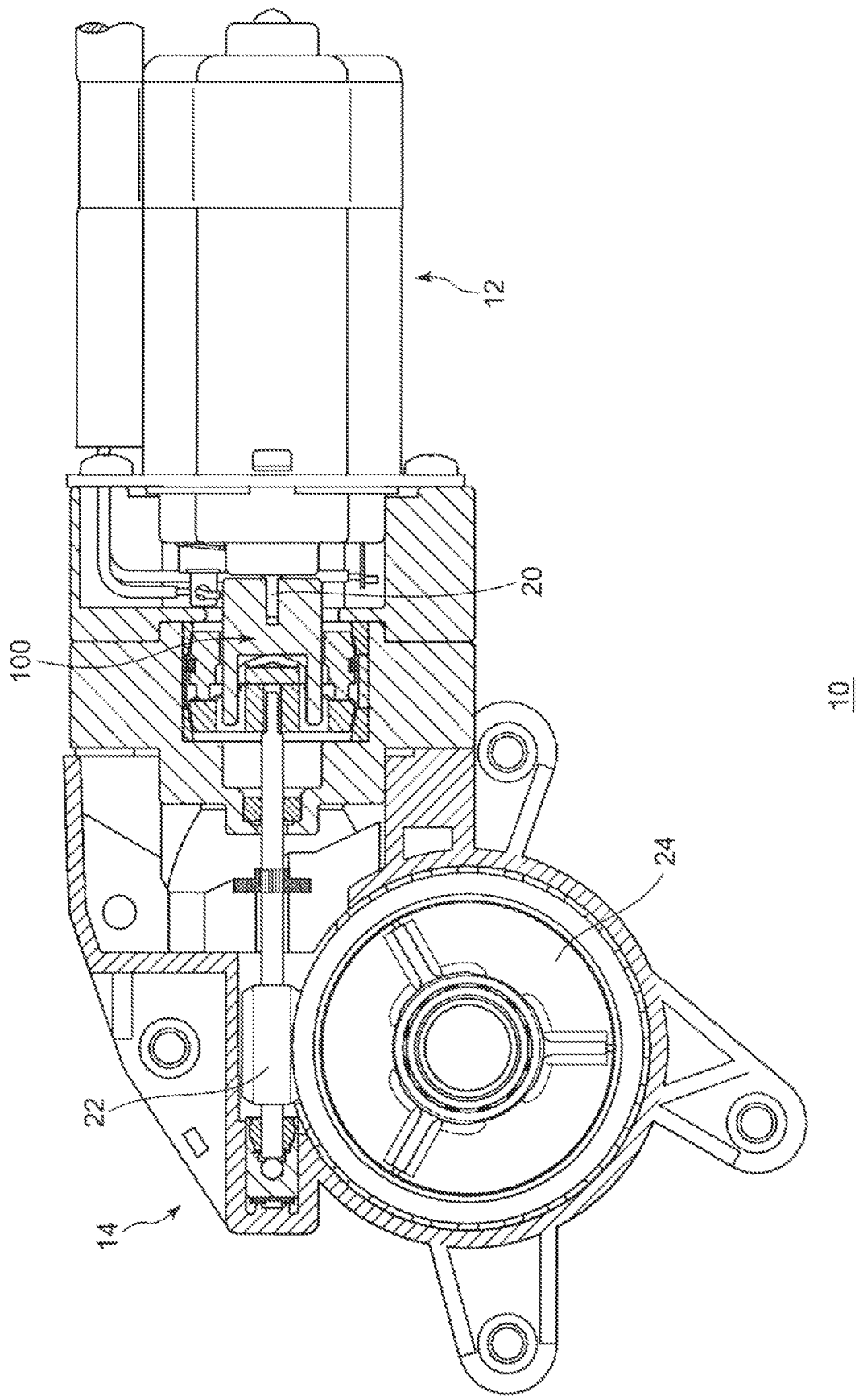
FIG. 2 is a fragmentary sectional view of the motor with a reducer according to the first embodiment.

FIG. 2 is a fragmentary sectional view of the motor with a reducer according to the first embodiment. The reducer 14 of the motor 10 includes a worm 22, a worm wheel 24 configured to be in mesh with the worm 22, an output shaft 18 (see FIG. 1A), and a reverse rotation prevention mechanism 100. The rotational force of a driving shaft 20 of the motor 12 is transmitted to the worm 22, and the rotational force exerted on the worm wheel 24 is transmitted to the output shaft 18. The reverse rotation prevention mechanism 100 is provided on a torque transmission path between the driving shaft 20 of the motor 12 and the worm 22.

Figure 3:
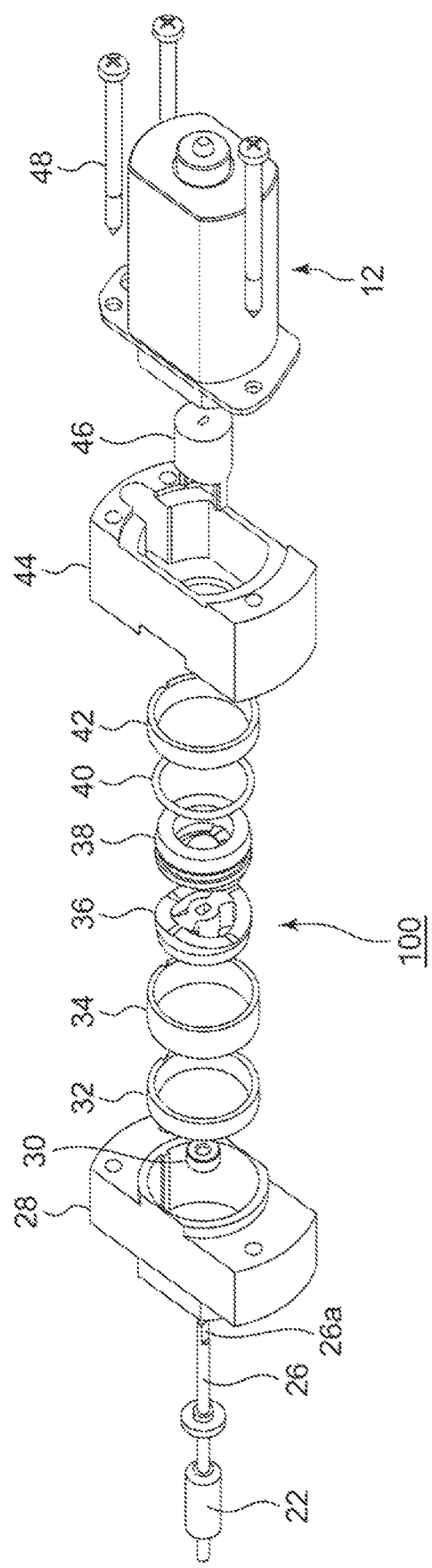
FIG. 3 is an exploded perspective view of the reverse rotation prevention mechanism according to the first embodiment.
Figure 4:
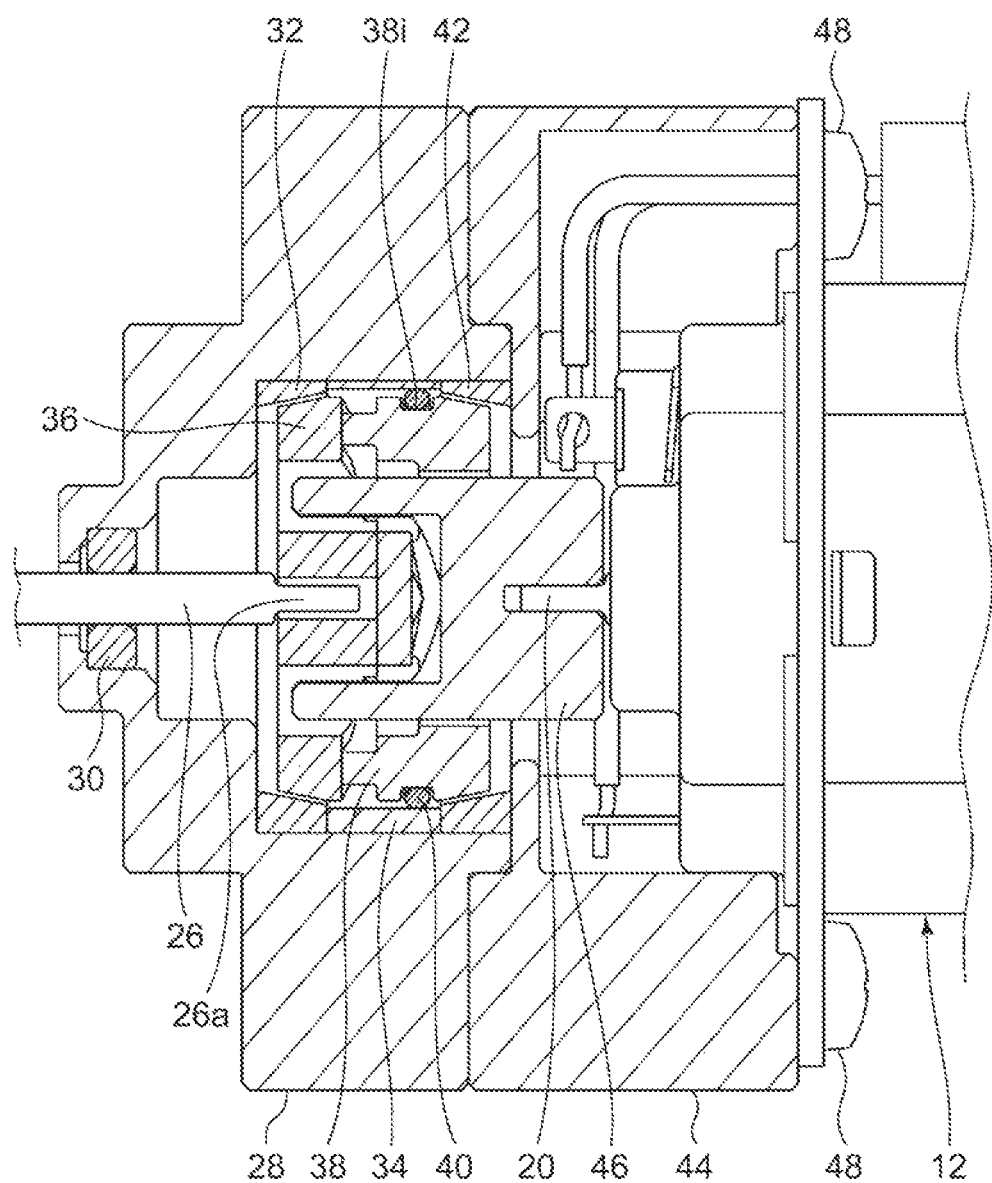
FIG. 4 is an enlarged sectional view of the neighborhood of the reverse rotation prevention mechanism shown in FIG. 2.

FIG. 3 is an exploded perspective view of the reverse rotation prevention mechanism 100. FIG. 4 is an enlarged sectional view of the neighborhood of the reverse rotation prevention mechanism shown in FIG. 2.

The reverse rotation prevention mechanism 100 is provided on a torque transmission path between the driving shaft 20 of the motor 12 and a gear side shaft 26 to which the worm 22 is fixed. The reverse rotation prevention mechanism 100 includes a first casing 28, a sintered bearing 30, an output plate side brake member 32, a sleeve 34, an output plate 36, a lock plate 38, an O-ring 40, a lock plate side brake member 42, a second casing 44, and an output pin 46. The first casing 28 and the second casing 44 are integrated with the motor 12 by tapping screws 48.

[First Casing]

Figure 5A:
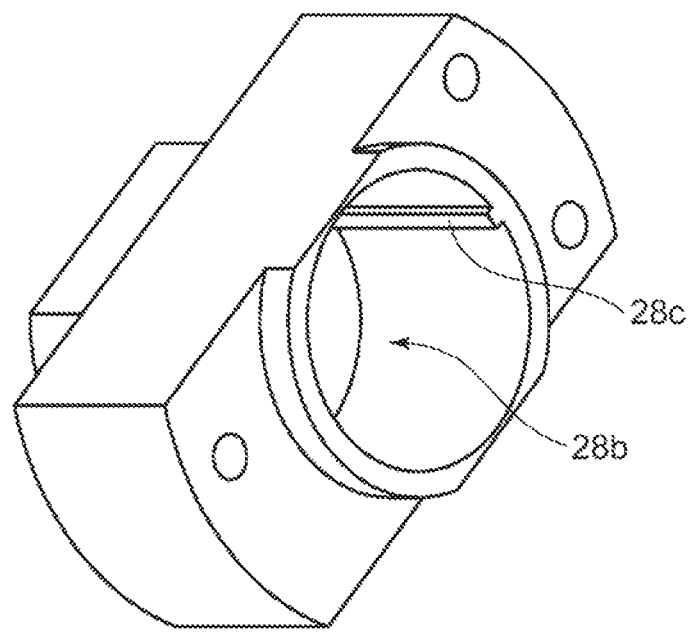
FIG. 5A is a perspective view of the first casing.
Figure 5B:
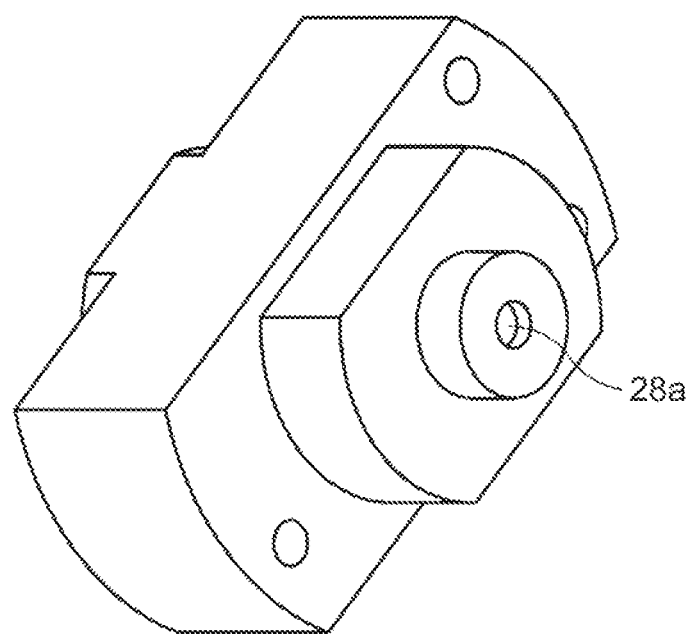
FIG. 5B is a perspective view of the first casing viewed from a direction different from that of FIG. 5A.
Figure 6:
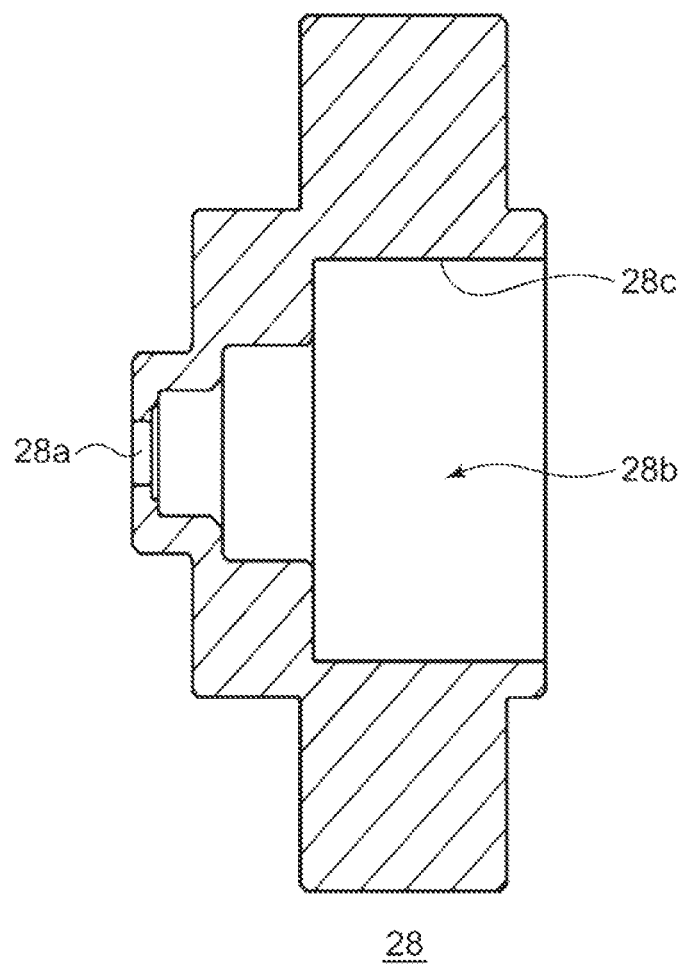
FIG. 6 is a sectional view of the first casing.

FIG. 5A is a perspective view of the first casing 28, and FIG. 5B is a perspective view of the first casing 28 viewed from a direction different from that of FIG. 5A. FIG. 6 is a sectional view of the first casing 28. The first casing 28 is formed with a through hole 28a through which the gear side shaft 26 is inserted and a cylindrical recess 28b that accommodates the output plate side brake member 32, the sleeve 34, and the lock plate side brake member 42. The inner circumferential portion of the recess 28b is formed with a convex anchoring portion 28c parallel to the axial direction of the gear side shaft 26 that prevents the output plate side brake member 32, the sleeve 34, and the lock plate side brake member 42 from being rotated in the recess 28b.

[Output Plate Side Brake Member]

Figure 7:
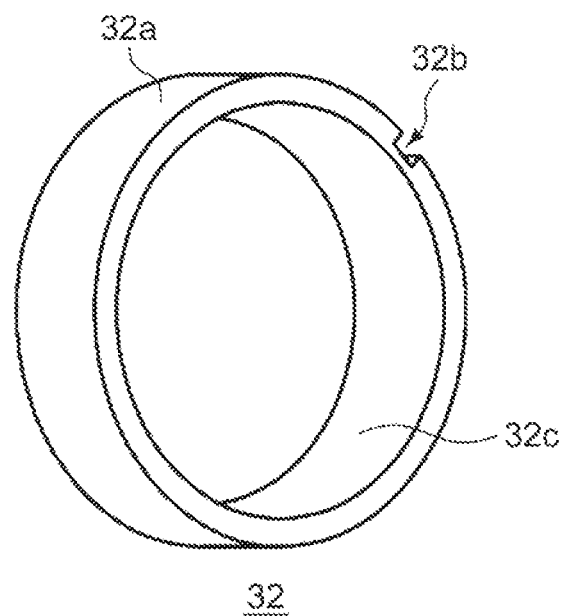
FIG. 7 is a perspective view of the output plate side brake member.
Figure 8:
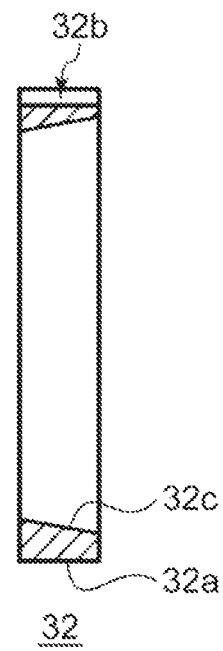
FIG. 8 is a sectional view of the output plate side brake member.

FIG. 7 is a perspective view of the output plate side brake member 32. FIG. 8 is a sectional view of the output plate side brake member 32. The output plate side brake member 32 is an annular member having a uniform diameter. An outer circumferential surface 32a is formed with a groove-like anchoring recess 32b parallel to the axial direction. The output plate side brake member 32 has a sloped brake surface 32c having an inner diameter that varies in the axial direction. The output plate side brake member 32 is inserted into the recess 28b of the first casing 28 such that the anchoring recess 32b is aligned with the convex anchoring portion 28c of the first casing 28.

[Sleeve]

Figure 9:
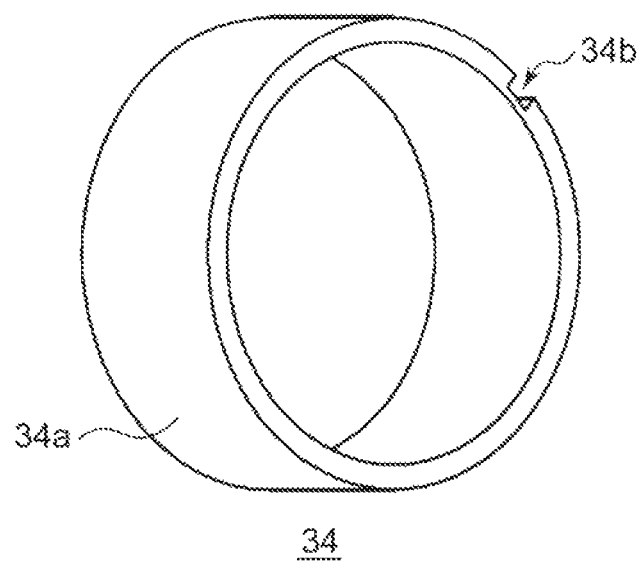
FIG. 9 is a perspective view of the sleeve.
Figure 10:
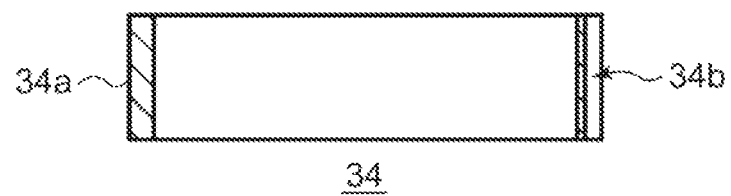
FIG. 10 is a sectional view of the sleeve.

FIG. 9 is a perspective view of the sleeve 34. FIG. 10 is a sectional view of the sleeve 34. The sleeve 34 is an annular member and a groove-like anchoring recess 34b parallel to the axial direction is formed on an outer circumferential surface 34a. The sleeve 34 is inserted into the recess 28b of the first casing 28 such that the anchoring recess 34b is aligned with the convex anchoring portion 28c of the first casing 28.

[Output Plate]

Figure 11A:
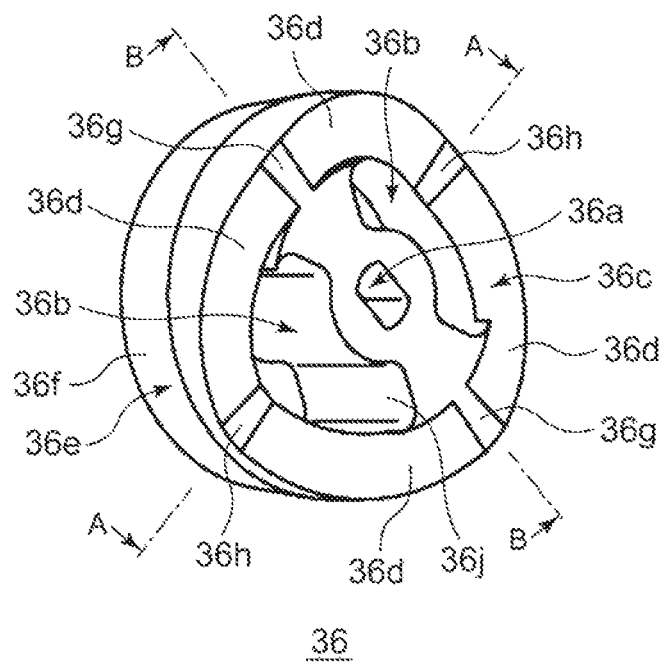
FIG. 11A is a perspective view of the output plate.
Figure 11B:
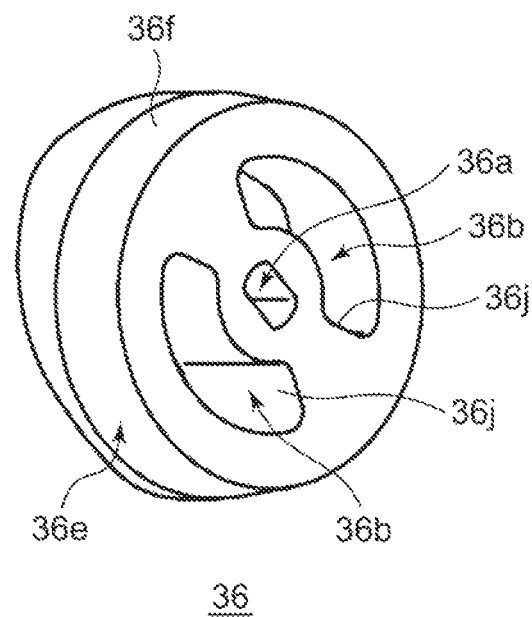
FIG. 11B is a perspective view of the output plate viewed from a direction different from that of FIG. 11A.
Figure 12A:
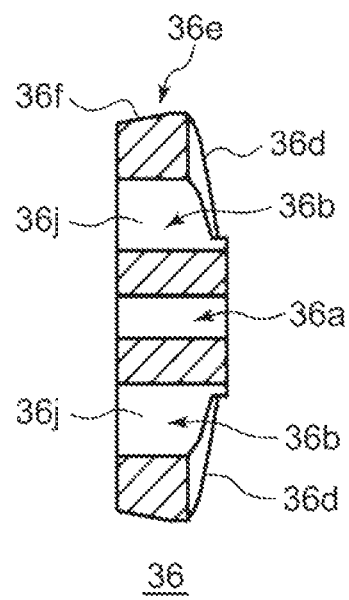
FIG. 12A is a sectional view along A-A of the output plate shown in FIG. 11A.
Figure 12B:
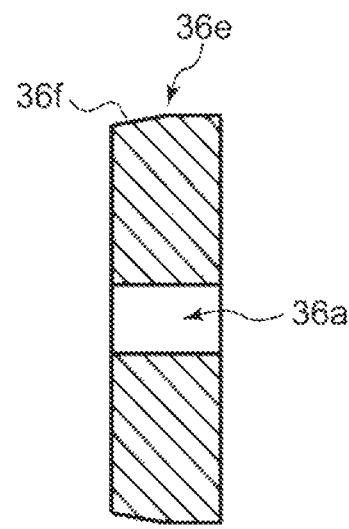
FIG. 12B is a sectional view along B-B of the output plate shown in FIG. 11A.

FIG. 11A is a perspective view of the output plate 36, and FIG. 11B is a perspective view of the output plate 36 viewed from a direction different from that of FIG. 11A. FIG. 12A is a sectional view along A-A of the output plate 36 shown in FIG. 11A, and FIG. 12B is a sectional view along B-B of the output plate 36 shown in FIG. 11A.

The output plate 36 is a cylindrical member and is formed at the center with a through hole 36a in which the gear side shaft 26 is inserted. Further, the neighborhood of the center formed with the through hole 36a is formed with two arc-like through holes 36b configured to be rotatable in both directions around the rotational axis when portions of the output pin 46 advance into the through holes 36b. The through hole 36b has an inner wall 36j that comes into contact with a portion of the output pin 46 when the output pin 46 is rotated. An end face 36c of the output plate 36 that faces the lock plate 38 has four arc-like sloped portions 36d formed on the outer circumference of the output plate 36 in the circumferential direction. The sloped portion 36d is configured such that the height thereof in the axial direction gradually increases or decreases depending on the position in the circumferential direction. A peak 36g or a trough 36h is formed between two adjacent sloped portions 36d so as to alternate.

The through hole 36a is configured to permit the axial movement of the gear side shaft 26 inserted into the through hole 36a. A portion of an outer circumferential surface 36e of the output plate 36 functions as a brake surface 36f. The brake surface 36f according to the embodiment is a tapered surface.

[Lock Plate]

Figure 13A:
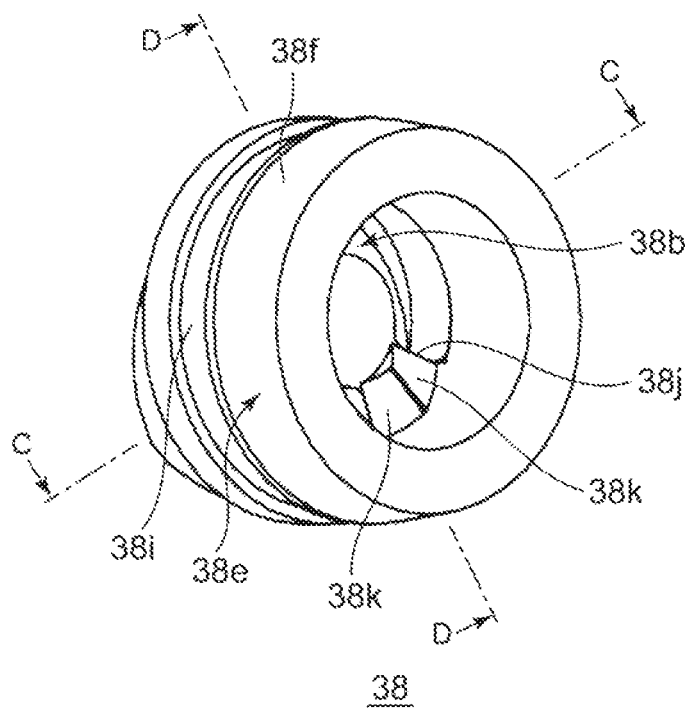
FIG. 13A is a perspective view of the lock plate.
Figure 13B:
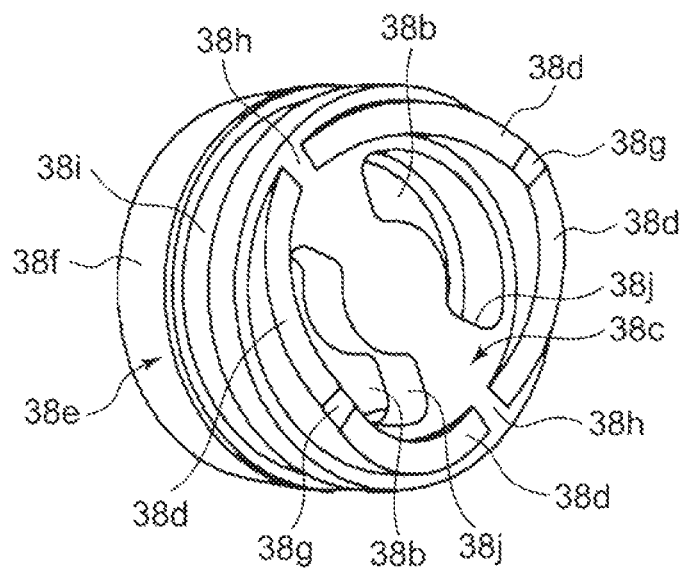
FIG. 13B is a perspective view of the lock plate viewed from a direction different from that of FIG. 13A.
Figure 14A:
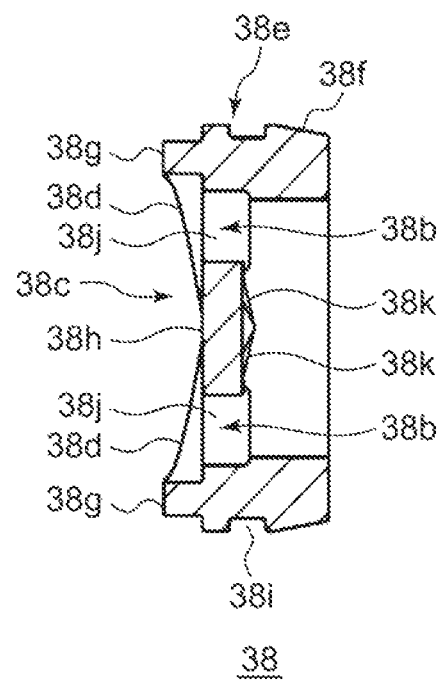
FIG. 14A is a sectional view along C-C of the lock plate shown in FIG. 13A.
Figure 14B:
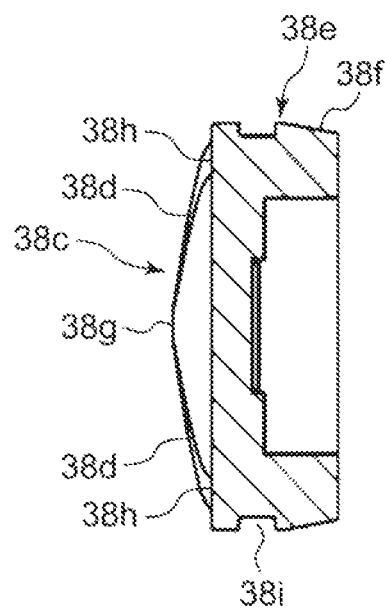
FIG. 14B is a sectional view along D-D of the lock plate shown in FIG. 13A.

FIG. 13A is a perspective view of the lock plate 38, and FIG. 13B is a perspective view of the lock plate 38 viewed from a direction different from that of FIG. 13A. FIG. 14A is a sectional view along C-C of the lock plate 38 shown in FIG. 13A, and FIG. 14B is a sectional view along D-D of the lock plate 38 shown in FIG. 13A.

The lock plate 38 is a cylindrical member. The neighborhood of the center thereof is formed with two arc-like through holes 38b configured to be rotatable in both directions around the rotational axis when portions of the output pin 46 advance into the through holes 38b. The through hole 36b has an inner wall 38j that comes into contact with a portion of the output pin 46 when the output pin 46 is rotated. Four sloped portions 38k that form a spacing mechanism for causing the lock plate 38 to be spaced apart from the lock plate side brake member 42 are formed between two through holes 38b. An end face 38c of the lock plate 38 that faces the output plate 36 has four sloped portions 38d formed on the outer circumference of the lock plate 38 in the circumferential direction. The sloped portion 38d is configured such that the height thereof in the axial direction gradually increases or decreases depending on the position in the circumferential direction. A peak 38g or a trough 38h is formed between two adjacent sloped portions 38d.

A portion of an outer circumferential surface 38e of the lock plate 38 functions as a brake surface 38f. The brake surface 38f according to the embodiment is a tapered surface. The outer circumferential surface 38e of the lock plate 38 is formed with a groove 38i to which the O-ring 40 is fitted.

[Lock Plate Side Brake Member]

Figure 15:
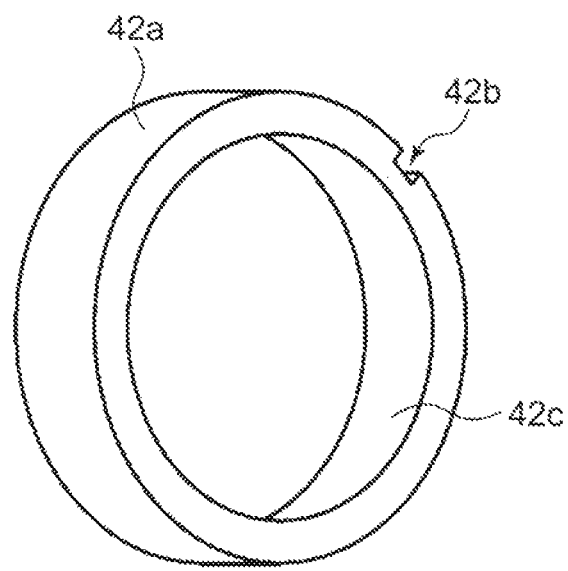
FIG. 15 is a perspective view of the lock plate side brake member.
Figure 16:
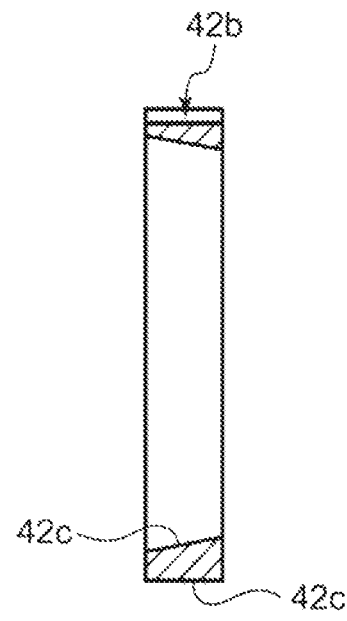
FIG. 16 is a sectional view of the lock plate side brake member.

FIG. 15 is a perspective view of the lock plate side brake member 42. FIG. 16 is a sectional view of the lock plate side brake member 42. The lock plate side brake member 42 is an annular member having a uniform outer diameter. A groove-like anchoring recess 42b parallel to the axial direction is formed in an outer circumference 42a of the lock plate side brake member 42. The lock plate side brake member 42 has a sloped brake surface 42c having an inner diameter that varies in the axial direction. The lock plate side brake member 42 is inserted into the recess 28b of the first casing 28 such that the anchoring recess 42b is aligned with the convex anchoring portion 28c of the first casing 28.

[Output Pin]

Figure 17A:
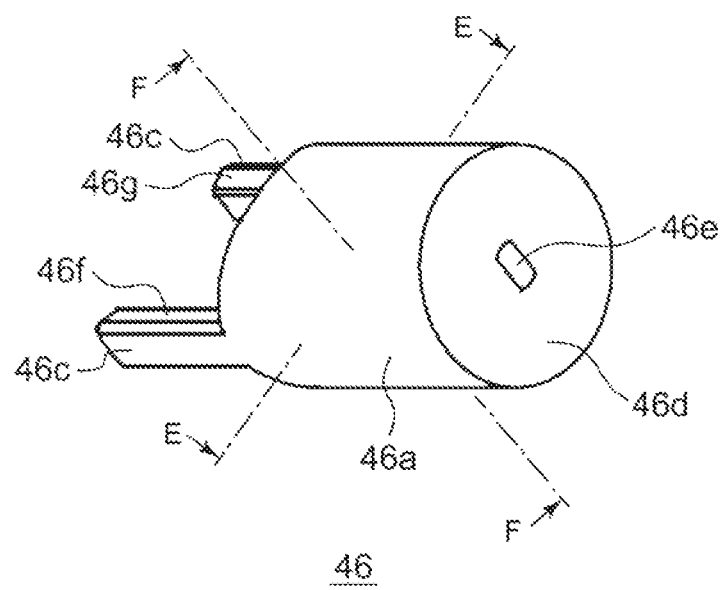
FIG. 17A is a perspective view of the output pin.
Figure 17B:
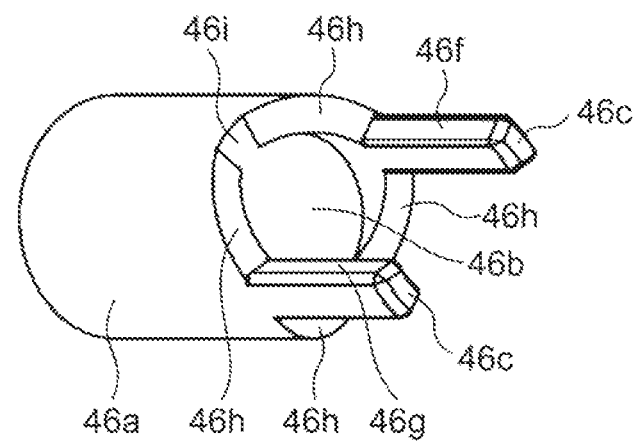
FIG. 17B is a perspective view of the output pin viewed from a direction different from that of FIG. 17A.
Figure 18A:
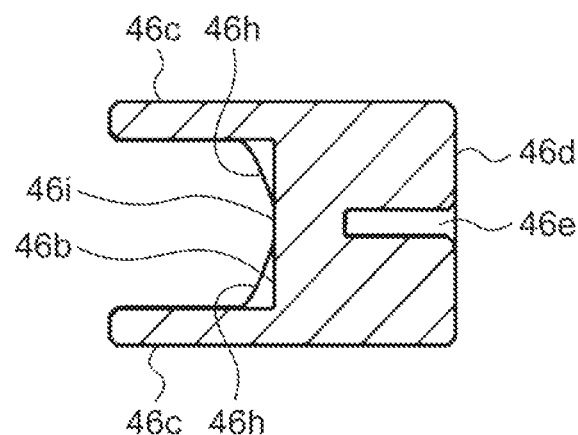
FIG. 18A is a sectional view along E-E of the output pin shown in FIG. 17A.
Figure 18B:
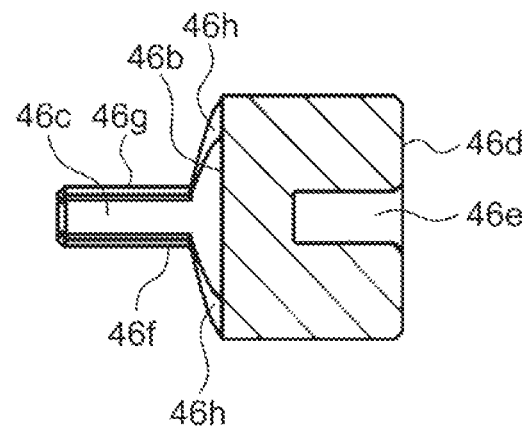
FIG. 18B is a sectional view along F-F of the output pin 46 shown in FIG. 17A.

FIG. 17A is a perspective view of the output pin 46, and FIG. 17B is a perspective view of the output pin 46 viewed from a direction different from that of FIG. 17A. FIG. 18A is a sectional view along E-E of the output pin 46 shown in FIG. 17A, and FIG. 18B is a sectional view along F-F of the output pin 46 shown in FIG. 17A.

The output pin 46 has a cylindrical main portion 46a and two convex engaging portions 46c provided to project from one end face 46b of the main portion 46a in the axial direction. Another end face 46d of the main portion 46a is formed with a press fitting hole 46e in which the driving shaft 20 is press fitted. The convex engaging portions 46c are of a form rotatable when the engaging portions 46c advance into the through hole 38b of the lock plate 38 and the through hole 36b of the output plate 36. Further, the convex engaging portions 46c have engaging surfaces 46f and 46g, respectively, that are engaged with the inner wall of the through hole 38b of the lock plate 38 and the inner wall of the through hole 36b of the output plate 36 when the motor is driven.

An end face 46b of the output pin 46 has four arc-like sloped portions 46h formed on the outer circumference of the output pin 46 in the circumferential direction. The sloped portion 46h is configured such that the height thereof in the axial direction gradually increases or decreases depending on the position in the circumferential direction. A convex engaging portion 46c or a trough 46i is formed between two adjacent sloped portions 46h so as to alternate.

[Reverse Rotation Prevention Mechanism]

Figure 19:
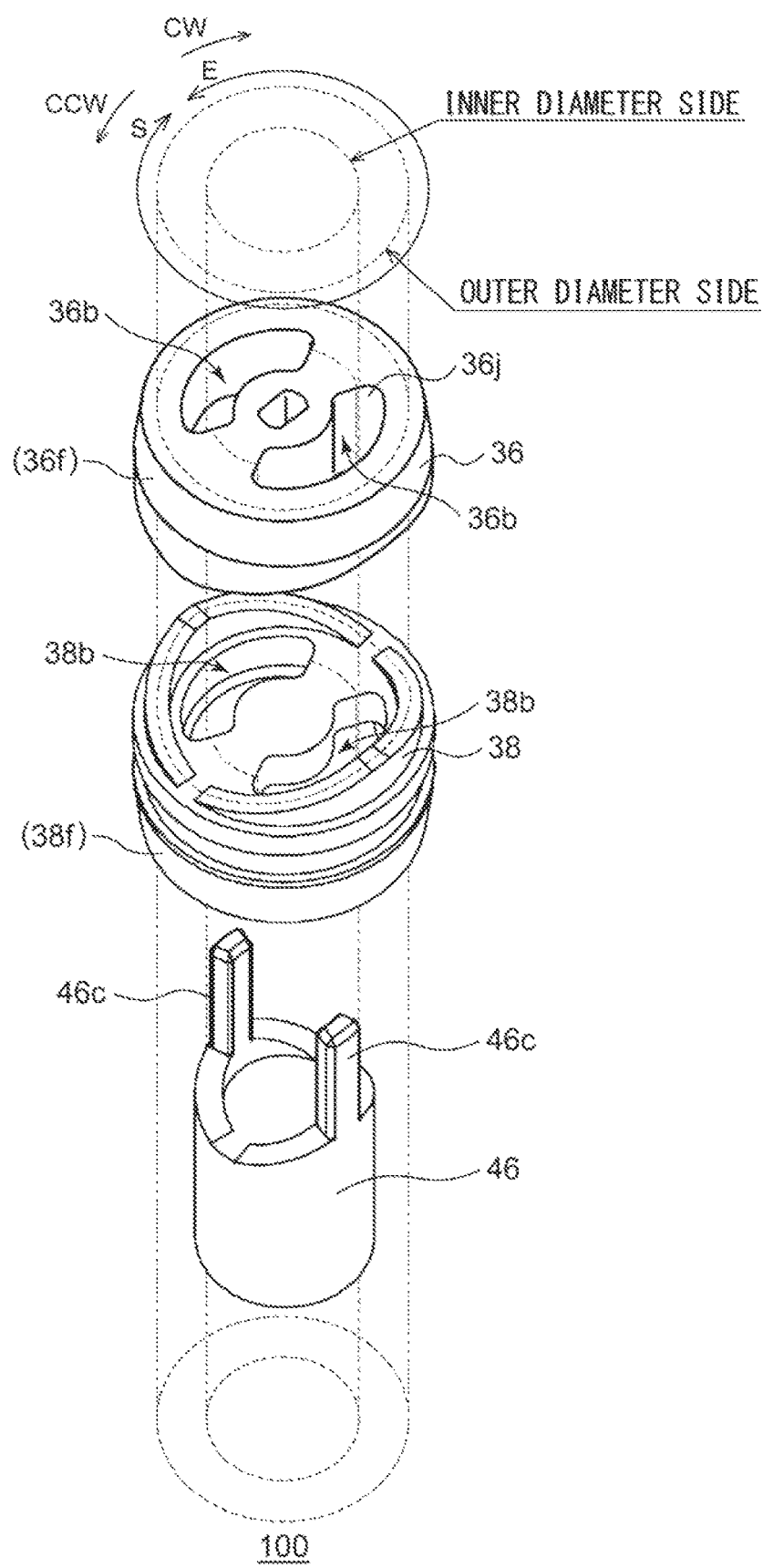
FIG. 19 is an exploded perspective view of an important part of the reverse rotation prevention mechanism according to the first embodiment.

FIG. 19 is an exploded perspective view of an important part of the reverse rotation prevention mechanism according to the first embodiment. FIG. 20 is a schematic diagram illustrating how the components work when an external force is exerted on the output shaft. FIG. 20 is a schematic development view of the inner diameter side and outer diameter side of the reverse rotation prevention mechanism of FIG. 19.

As shown in FIG. 20, when the motor 10 with a reducer is stationary, the convex engaging portion 46c of the output pin 46 is not in contact with the output plate 36 or the lock plate 38 in the through hole 36b of the output plate 36 and in the through hole 38b of the lock plate 38. In this case, no large forces are exerted between the components.

A description will now be given of a case where an external force is exerted on the output shaft in the stationary state like this and the output plate 36 is rotated in, for example, the counterclockwise direction (CCW). When the output plate 36 is rotated in the counterclockwise direction, the inner wall 36j of the through hole 36b of the output plate 36 approaches the convex engaging portion 46c of the output pin 46 on the inner diameter side. In other words, the output plate 36 could be rotated on the outer diameter side until a force that causes the output plate 36 and the lock plate 38 to be spaced apart from each other in the axial direction is generated. Meanwhile, the sloped portion 36d of the output plate 36 and the sloped portion 38d of the lock plate 38 come into contact with each other on the outer diameter side in association with the rotation of the output plate 36, generating a force that causes the output plate 36 and the lock plate 38 to be spaced apart from each other in the axial direction.

Figure 21:
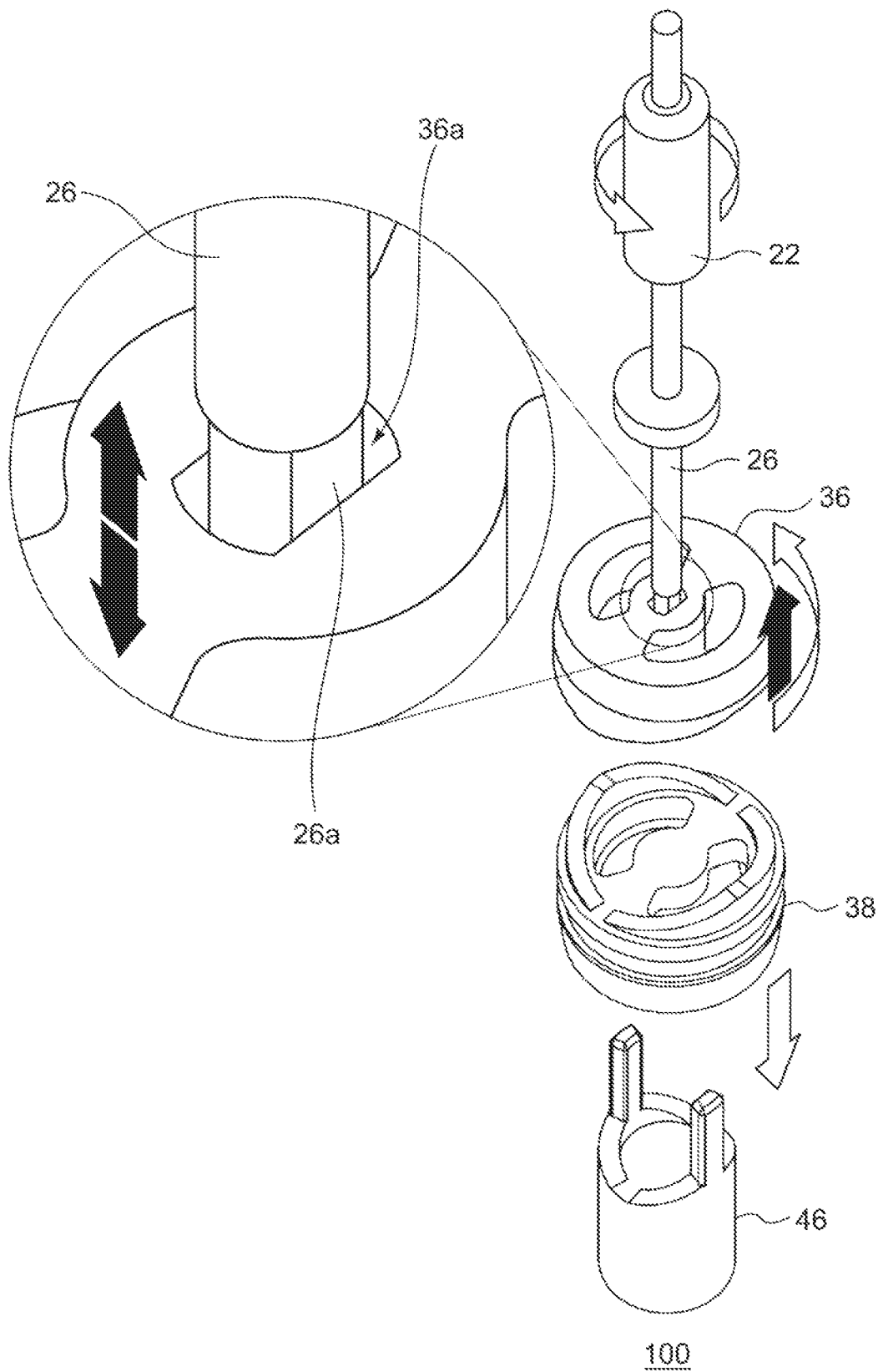
FIG. 21 is a schematic diagram illustrating how the reverse rotation prevention mechanism works when an external force is exerted on the output shaft.

FIG. 21 is a schematic diagram illustrating how the reverse rotation prevention mechanism works when an external force is exerted on the output shaft. The through hole 36a of the output plate 36 and a D cut portion 26a at the end of the gear side shaft 26 in the reverse rotation prevention mechanism 100 are shaped so as to permit the axial movement of the output plate 36 relative to the gear side shaft 26 and restrict the rotational movement of the output plate 36 (prevent relative rotation).

As described with reference to FIG. 20, when a force that causes the output plate 36 and the lock plate 38 to be spaced apart from each other in the axial direction is generated in the reverse rotation prevention mechanism 100 configured as described above, the output plate 36 moves toward the worm 22 and the lock plate 38 moves toward the output pin 46. The brake surface 36f (see FIG. 11) of the output plate 36 is pressed by the brake surface 32c (see FIG. 7) of the output plate side brake member 32 so as to generate a frictional braking force. Further, the brake surface 38f (see FIG. 13) of the lock plate 38 is pressed by the brake surface 42c (see FIG. 15) of the lock plate side brake member 42 so as to generate a frictional braking force. In this way, stable anti-reverse-rotation performance is realized. Consequently, the output shaft 18 is prevented from being rotated in an unintended manner even if an external force is exerted on the output shaft 18.

[Motor Driving]

Figure 22:
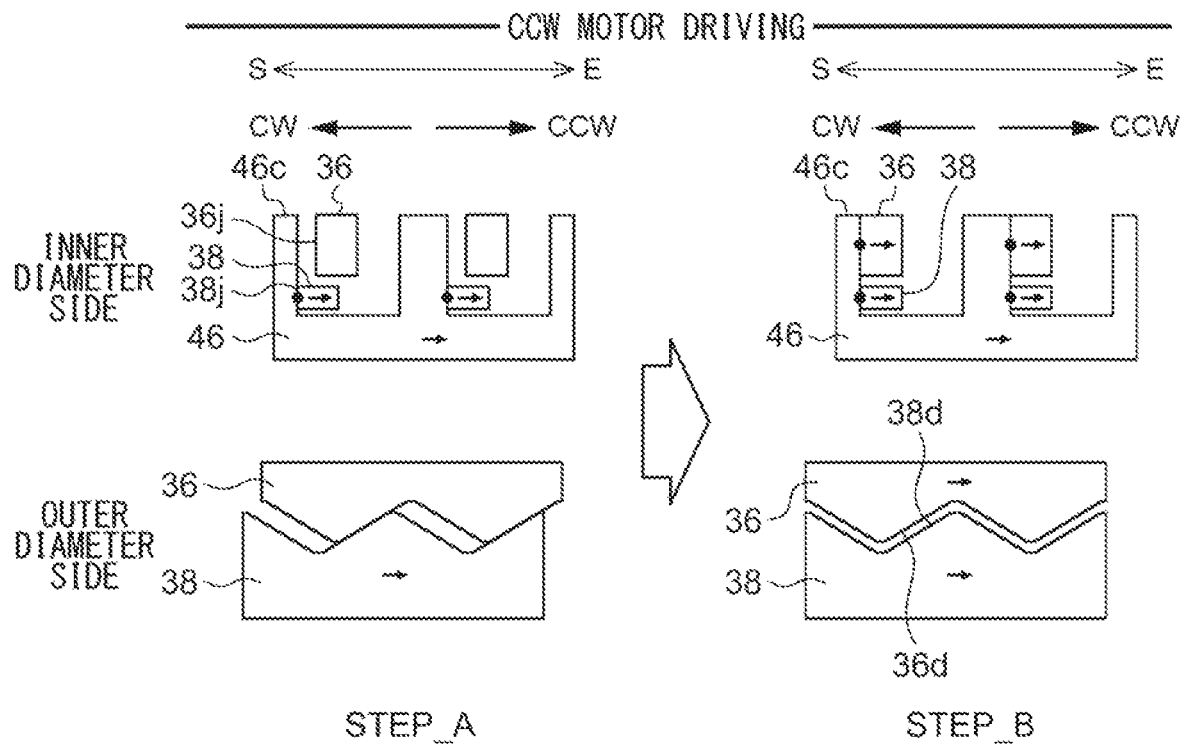
FIG. 22 is a schematic diagram illustrating the action performed when the motor in the state shown in FIG. 20 where the reverse rotation prevention mechanism is functioning is driven in the counterclockwise direction (CCW)
Figure 23:
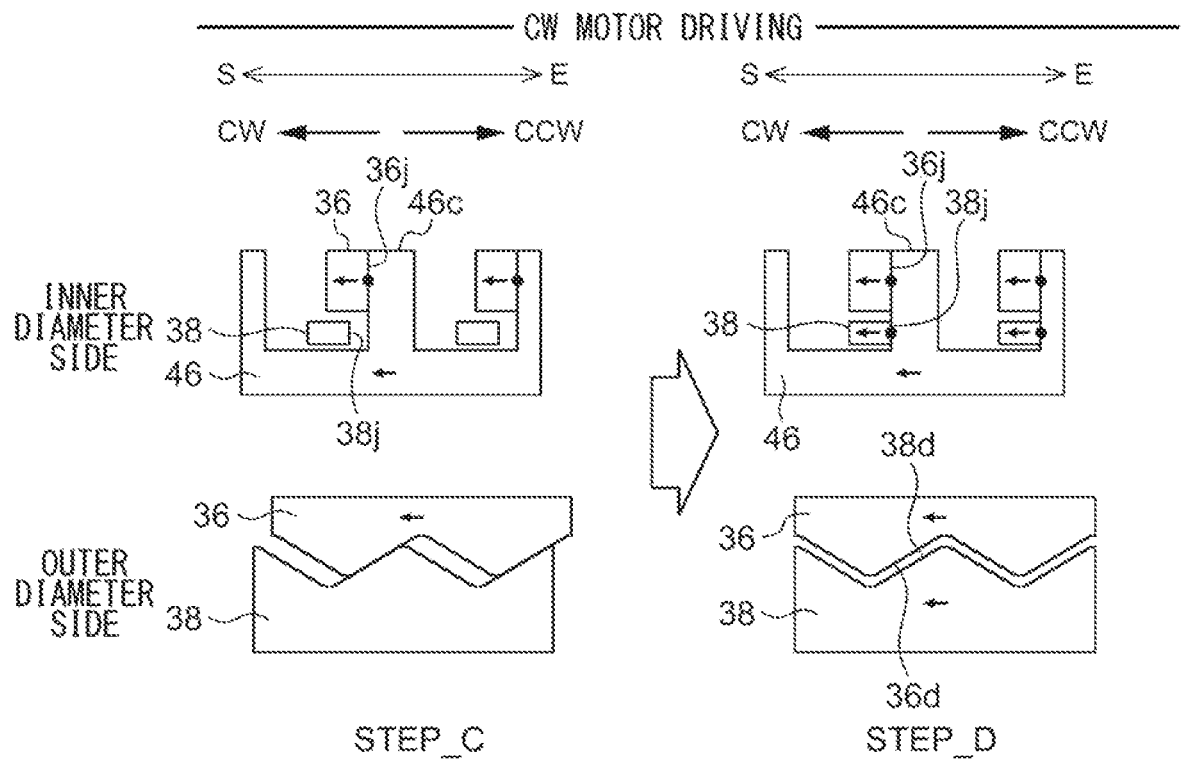
FIG. 23 is a schematic diagram illustrating the action performed when the motor in the state shown in FIG. 20 where the reverse rotation prevention mechanism is functioning is driven in the clockwise direction (CW)

FIG. 22 is a schematic diagram illustrating the action performed when the motor in the state shown in FIG. 20 where the reverse rotation prevention mechanism is functioning is driven in the counterclockwise direction (CCW). FIG. 23 is a schematic diagram illustrating the action performed when the motor in the state shown in FIG. 20 where the reverse rotation prevention mechanism is functioning is driven in the clockwise direction (CW).

When the motor is driven in the counterclockwise direction, the output pin 46 starts rotating and the convex engaging portion 46c of the output pin 46 comes into contact with the inner wall 38j of the through hole 38b of the lock plate 38 as shown in FIG. 22, causing the lock plate 38 to start rotating along with the output pin 46 (STEP_A). As the output pin 46 is rotated further, the convex engaging portion 46c of the output pin 46 comes into contact with the inner wall 36j of the through hole 36b of the output plate 36, causing the output plate 36, as well as the lock plate 38, to be rotated along with the output pin 46 (STEP_B). As a result, the sloped portion 36d of the output plate 36 and the sloped portion 38d of the lock plate 38 are disengaged from each other, reducing the frictional braking force generated between the output plate 36 and the brake surface 32c and between the lock plate 38 and the brake surface 42c.

Similarly, when the motor is driven in the clockwise direction, the output pin 46 starts rotating and the convex engaging portion 46c of the output pin 46 comes into contact with the inner wall 36j of the through hole 36b of the output plate 36 as shown in FIG. 23, causing the output plate 36 to start rotating along with the output pin 46 (STEP_C). As the output pin 46 is rotated further, the convex engaging portion 46c of the output pin 46 comes into contact with the inner wall 38j of the through hole 38b of the lock plate 38, causing the lock plate 38, as well as the output plate 36, to be rotated along with the output pin 46 (STEP_D). As a result, the sloped portion 36d of the output plate 36 and the sloped portion 38d of the lock plate 38 are disengaged from each other, reducing the frictional braking force generated between the output plate 36 and the brake surface 32c and between the lock plate 38 and the brake surface 42c.

As shown in FIGS. 22 and 23, the reverse rotation prevention mechanism according to the embodiment is configured such that the frictional braking force generated when an external force is exerted on the output shaft is reduced during ordinary motor operation so that reduction in the transmission efficiency of motor torque due to frictional resistance is inhibited.

[Prevention of Co-Rotation in Anti-Reverse-Rotation Mode]

As described with reference to FIG. 20, when an external force is exerted on the output shaft, the output plate 36 is rotated in, for example, the counterclockwise direction and displaced in rotational phase from the lock plate 38, causing the sloped portion 36d of the output plate 36 to come into contact with the sloped portion 38d of the lock plate 38 and generating a force that causes the output plate 36 and the lock plate 38 to be spaced apart from each other in the axial direction. However, if the lock plate 38 is co-rotated when the output plate 36 is rotated in the counterclockwise direction, the output plate 36 and the lock plate 38 are not displaced relative to each other in rotational phase, making it difficult for the sloped portion 36d of the output plate 36 and the sloped portion 38d of the lock plate 38 to come into contact with each other. As a matter of course, a force that causes the output plate 36 and the lock plate 38 to be spaced apart from each other in the axial direction is not generated and generation of a frictional braking force is delayed.

To address the issue, the reverse rotation prevention mechanism 100 according to the first embodiment is configured such that the O-ring 40 is fitted to the groove 38i formed in the outer circumferential surface of the lock plate 38 and inserted into the sleeve 34 (see FIG. 4, etc.). Due to the frictional resistance between the lock plate 38 and the O-ring 40 and the frictional resistance between the O-ring 40 and the sleeve 34, a force that maintains the lock plate 38 in its place is exerted, preventing the lock plate 38 from being co-rotated with the rotation of the output plate 36.

[Shape of Frictional Surface]

Figure 24:
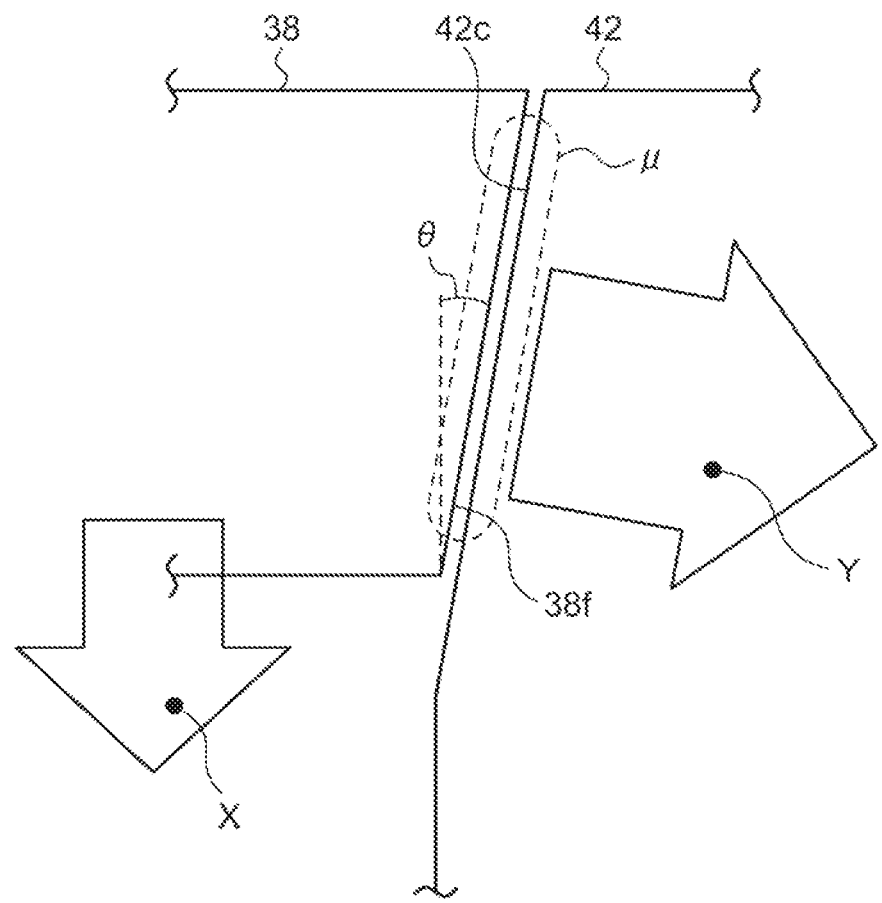
FIG. 24 is a schematic diagram illustrating a frictional force generation unit according to the first embodiment.
Figure 25:
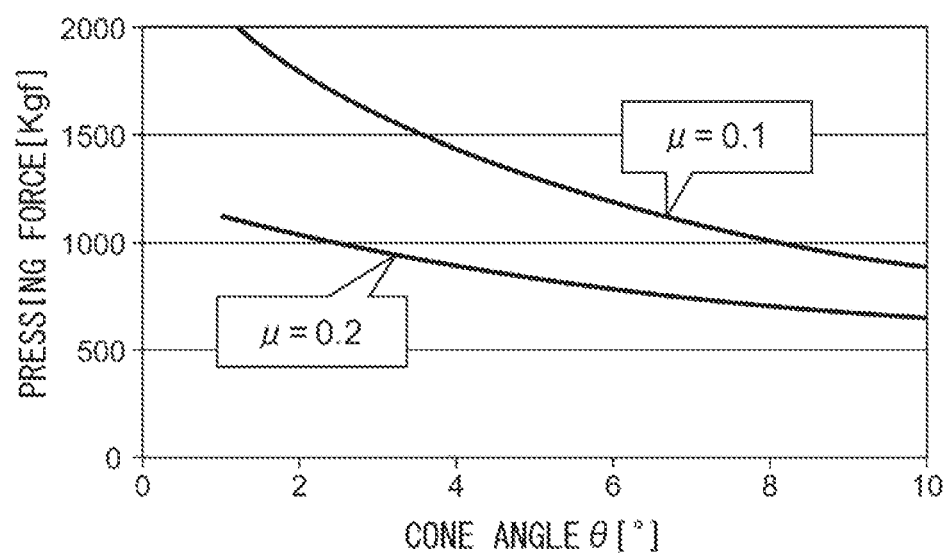
FIG. 25 shows a relationship between a cone angle θ and a pressing force Y.

FIG. 24 is a schematic diagram illustrating a frictional force generation unit according to the first embodiment. FIG. 25 shows a relationship between a cone angle $\theta$ and a pressing force Y.

The brake surface 38f of the lock plate 38 in the reverse rotation prevention mechanism 100 according to the embodiment is a surface tapered with respect to the axial direction (the direction of central axis of the lock plate 38) of the gear side shaft 26. The brake surface 42c of the lock plate side brake member 42 is also a tapered surface. The cone (gradient) angle $\theta$ shown in FIGS. 24 and 25 is an angle formed between the axial direction and the brake surface and is half as large as the taper angle formed by the opposite brake surfaces 38f of the lock plate 38.

As shown in FIG. 24, when a force in the axial direction of the gear side shaft 26 is exerted on the lock plate 38, the lock plate side brake member 42 receives the pressing force Y from the lock plate 38 in the direction indicated by the arrow. Thus, the brake surface 38f of the lock plate 38 can generate the pressing force Y in a direction different from the direction in which the lock plate 38 is pressed. Given the axial force x, cone angle $\theta$, and frictional coefficient $\mu$ described later, the pressing force Y is given by $Y=X/(\mu \cos \theta + \sin \theta)$ ... (1).

Denoting the frictional coefficient between the brake surface 38f and the brake surface 42c by $\mu$, it will be appreciated that the smaller the cone angle and the smaller the frictional coefficient $\mu$, the larger the pressing force Y and the gain (Y/X) of the pressing force Y with respect to the axial force X, as shown in FIG. 25. Accordingly, the cone angle $\theta$ is established as appropriate, allowing for the pressing force, frictional coefficient, gain, etc. to prevent reverse rotation. It is desired that the taper angle of the brake surface 38f of the lock plate 38 be not less than 1° and less than 30° (the cone angle is not less than 0.5° and less than 15°). Further, it is desired that the frictional coefficient be in a range 0.01-0.8. This ensures that a large pressing force Y is generated.

As described above, the reverse rotation prevention mechanism 100 according to the first embodiment is provided on a torque transmission path between the output shaft 18 and the driving shaft 20 of the motor. The reverse rotation prevention mechanism 100 is provided with a first frictional force generation unit configured to inhibit the rotation of the lock plate 38 (braking rotational member) provided on the torque transmission path relative to the first casing 28 when an external force is exerted on the output shaft 18 and when the motor is driven, and a second frictional force generation unit configured to generate a braking force for preventing reverse rotation as a result of the brake surface 38f of the lock plate 38 being pressed when an external force is exerted on the output shaft 18.

The first frictional force generation unit according to the embodiment is comprised of the sleeve 34 and the O-ring 40 and is provided between the first casing 28 (non-rotating fixed member) and the lock plate 38. This makes it difficult for the lock plate 38 to move relative to the first casing 28 and inhibits the lock plate 38 from co-rotating with the output plate 36 (another rotating body) when an external force is exerted on the output shaft 18. By selecting the material and shape of the first casing 28 and the O-ring 40 properly, the sleeve 34 may be omitted.

The second frictional force generation unit according to the embodiment is comprised of the brake surface 42c of the lock plate side brake member 42 and the brake surface 38f of the lock plate 38. In the reverse rotation prevention mechanism 100, the first frictional force generation unit is provided in an area different from that of the second frictional force generation unit.

This makes it possible to configure the brake surface 42c primarily to generate a braking force for preventing reverse rotation. In other words, a material capable of generating high frictional resistance can be employed. Meanwhile, the O-ring 40 of the first frictional force generation unit can be primarily configured to inhibit the rotation of the lock plate 38 relative to the first casing 28. In other words, the O-ring 40 is enabled for controlling the frictional resistance between the O-ring 40 and the lock plate 38 to a relatively small magnitude sufficient to prevent the co-rotation of the lock plate 38 with the rotation of the output plate 36. This can reduce the sliding resistance between the O-ring 40 and the sleeve 34 when the motor is driven and improve the transmission efficiency of driving torque of the motor 10. Further, because a material with low frictional resistance can be used for the O-ring 40, a material with excellent abrasion resistance can be selected.

By providing frictional force generation units with different requirements for frictional force (frictional resistance) in separate areas, optimization and flexibility of design are promoted. For this reason, stable anti-reverse-rotation performance can be maintained for a long period of time.

The reverse rotation prevention mechanism 100 is also provided with a spacing mechanism for causing the brake surface 38f of the lock plate 38 to be spaced apart from the brake surface 42c of the lock plate side brake member 42 when the motor 12 is driven. More specifically, as the sloped portion 46h of the output pin 46 comes into contact with the sloped portion 38k of the lock plate 38 in association with the rotation of the output pin 46, the lock plate 38 is displaced in a direction away from the output pin 46. Accordingly, the brake surface 38f of the lock plate 38 is spaced apart from the brake surface 42c of the lock plate side brake member 42.

As shown in FIGS. 22 and 23, as the output plate 36 and the lock plate 38 are aligned in phase rotation in association with the further rotation of the output pin 46 (see STEP_B of FIG. 22 and STEP_D of FIG. 23), the sloped portion 36d and the sloped portion 38d hitherto in contact with each other are disengaged. As a result, the force that causes the output plate 36 and the lock plate 38 from being spaced apart from each other in the axial direction is removed, causing the brake surface 38f of the lock plate 38 to be spaced apart from the brake surface 42c of the lock plate side brake member 42 and causing the brake surface 36f of the output plate 36 to be spaced apart from the brake surface 32c of the output plate side brake member 32. This reduces the braking force (frictional friction) from the output plate side brake member 32 and the lock plate side brake member 42 when the motor is driven.

Further, the reverse rotation prevention mechanism 100 is provided with the output plate 36 (braking and pressing member) configured to be spaced apart from the lock plate 38 due to a reactive force responsive to the force that presses the lock plate 38 against the brake surface 42c of the lock plate side brake member 42 when an external force is exerted on the output shaft 18, and with a third frictional force generation unit configured to generate a braking force for preventing reverse rotation by causing the brake surface 36f of the output plate 36 to be pressed when an external force is exerted on the output shaft 18. The third frictional force generation unit is comprised of the brake surface 36f of the output plate 36 and the brake surface 32c of the output plate side brake member 32. Because a braking force is generated in a plurality of frictional force generation units, a larger frictional braking force is obtained than otherwise and stable anti-reverse-rotation performance is realized.

Second Embodiment

Figure 26:
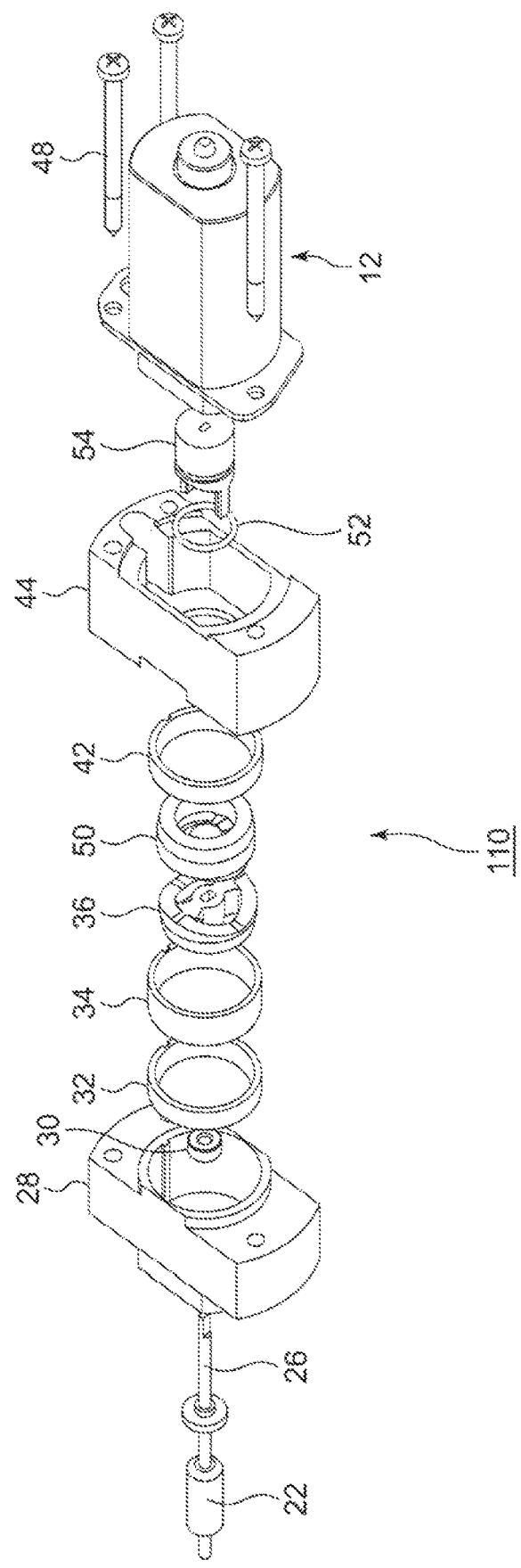
FIG. 26 is an exploded perspective view of a reverse rotation prevention mechanism according to a second embodiment.
Figure 27:
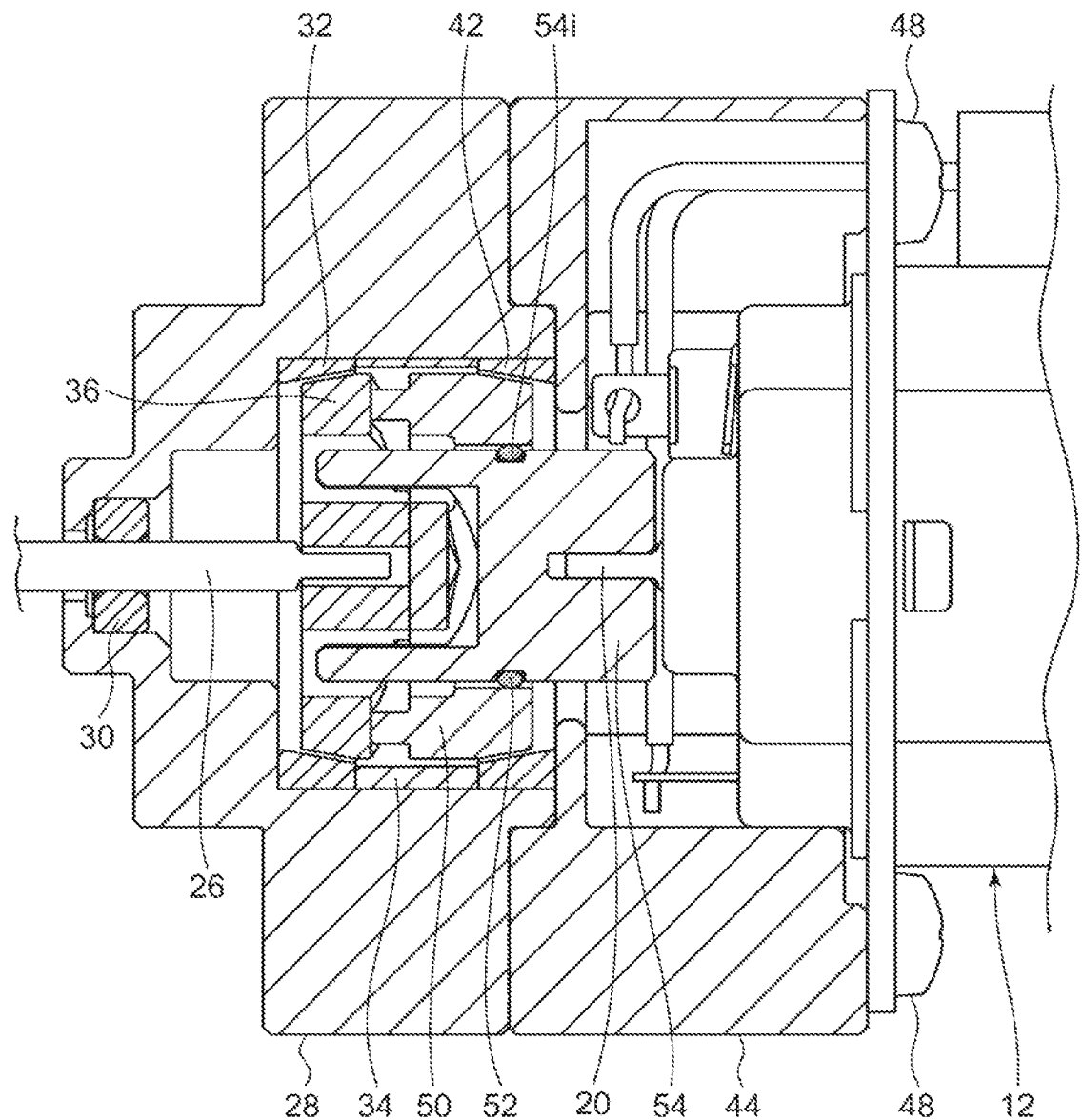
FIG. 27 is an enlarged sectional view of the neighborhood of the reverse rotation prevention mechanism according to the second embodiment.

FIG. 26 is an exploded perspective view of a reverse rotation prevention mechanism 110 according to a second embodiment. FIG. 27 is an enlarged sectional view of the neighborhood of the reverse rotation prevention mechanism according to the second embodiment.

The reverse rotation prevention mechanism 110 according to the second embodiment differs from the reverse rotation prevention mechanism 100 according to the first embodiment in respect of the position of the first frictional force generation unit. More specifically, an O-ring is not fitted on the outer circumferential surface of the lock plate 38. Instead, an O-ring 52 is fitted to the outer circumferential surface (a groove 54i) of an output pin 54.

Figure 28A:
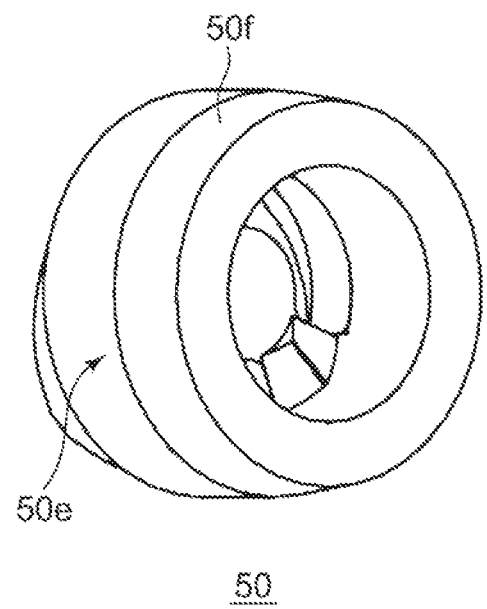
FIG. 28A is a perspective view of a lock plate according to the second embodiment.
Figure 28B:
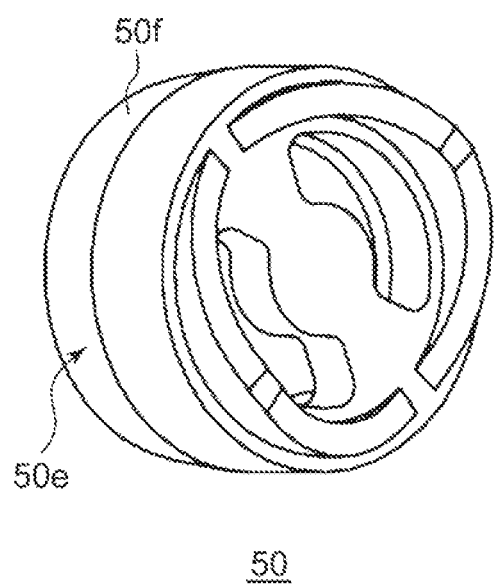
FIG. 28B is a perspective view of the lock plate viewed from a direction different from that of FIG. 28A.

FIG. 28A is a perspective view of a lock plate 50 according to the second embodiment, and FIG. 28B is a perspective view of the lock plate 50 viewed from a direction different from that of FIG. 28A. A portion of an outer circumferential surface 50e of the lock plate 50 functions as a brake surface 50f. The outer circumferential surface 50e is not formed with a groove to which an O-ring is fitted. In the other respects, the lock plate 50 and the lock plate 38 of the first embodiment are identically shaped.

Figure 29A:
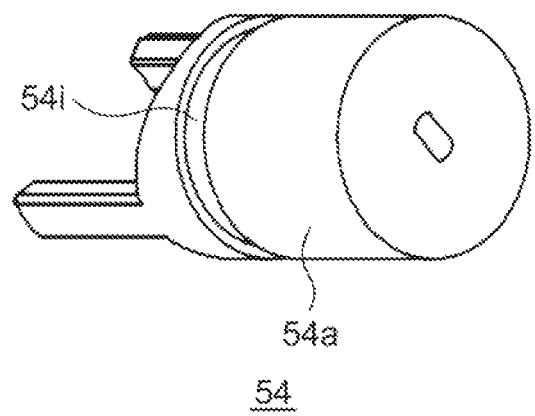
FIG. 29A is a perspective view of the output pin according to the second embodiment.
Figure 29B:
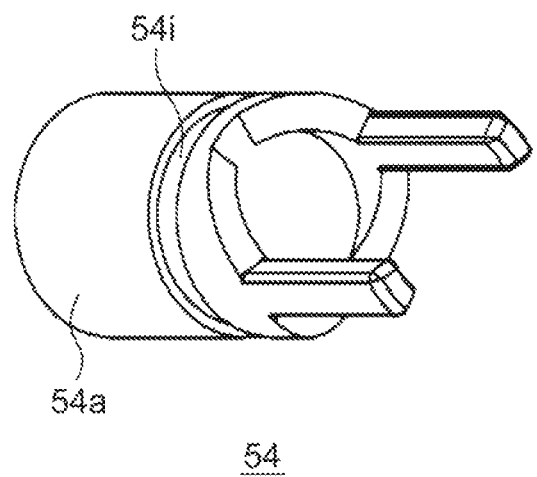
FIG. 29B is a perspective view of the output pin viewed from a direction different from that of FIG. 29A.

FIG. 29A is a perspective view of the output pin 54 according to the second embodiment, and FIG. 29B is a perspective view of the output pin 54 viewed from a direction different from that of FIG. 29A. The groove 54i to which the O-ring 52 is fitted is formed on the outer circumferential surface of a cylindrical main unit 54a of the output pin 54. In the other respects, the output pin 54 and the output pin 46 of the first embodiment are identically shaped. The output pin 54 is a driving shaft side rotational member provided on the torque transmission path more toward the driving shaft 20 of the motor than the lock plate 50.

In the reverse rotation prevention mechanism 110 according to the second embodiment, the output pin 54 is engaged with the lock plate 50 and rotated together when the motor is driven. As shown in FIGS. 26 and 27, the first frictional force generation unit in the reverse rotation prevention mechanism 110 is comprised of the O-ring 52 provided between the lock plate 50 and the output pin 54. This makes it difficult for the lock plate 50 to move relative to the output pin 54 and inhibits the co-rotation of the lock plate 50 and the output plate 36 when an external force is exerted on the output shaft. The frictional resistance between the members is established as appropriate, allowing for the cogging torque, frictional resistance in the gear unit, frictional resistance in the shaft, etc.

When the motor is driven, the output pin 54 and the lock plate 50 are rotated together so that no frictional resistance is generated due to the O-ring 52 and the transmission efficiency of motor driving torque is further improved.

Third Embodiment

Figure 30:
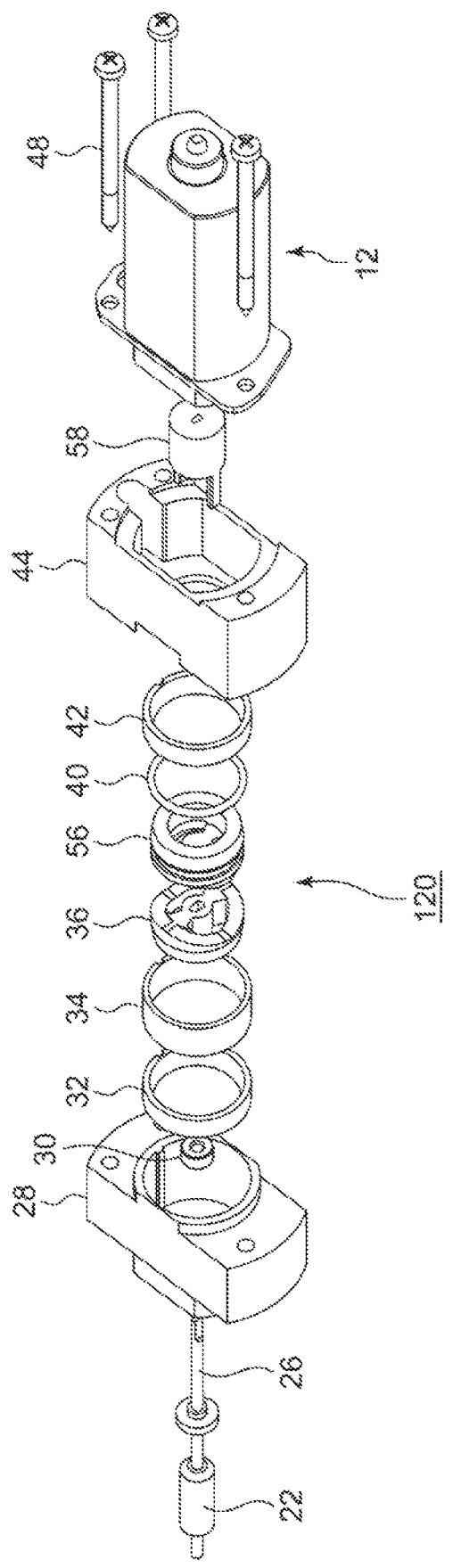
FIG. 30 is an exploded perspective view of a reverse rotation prevention mechanism according to a third embodiment.
Figure 31:
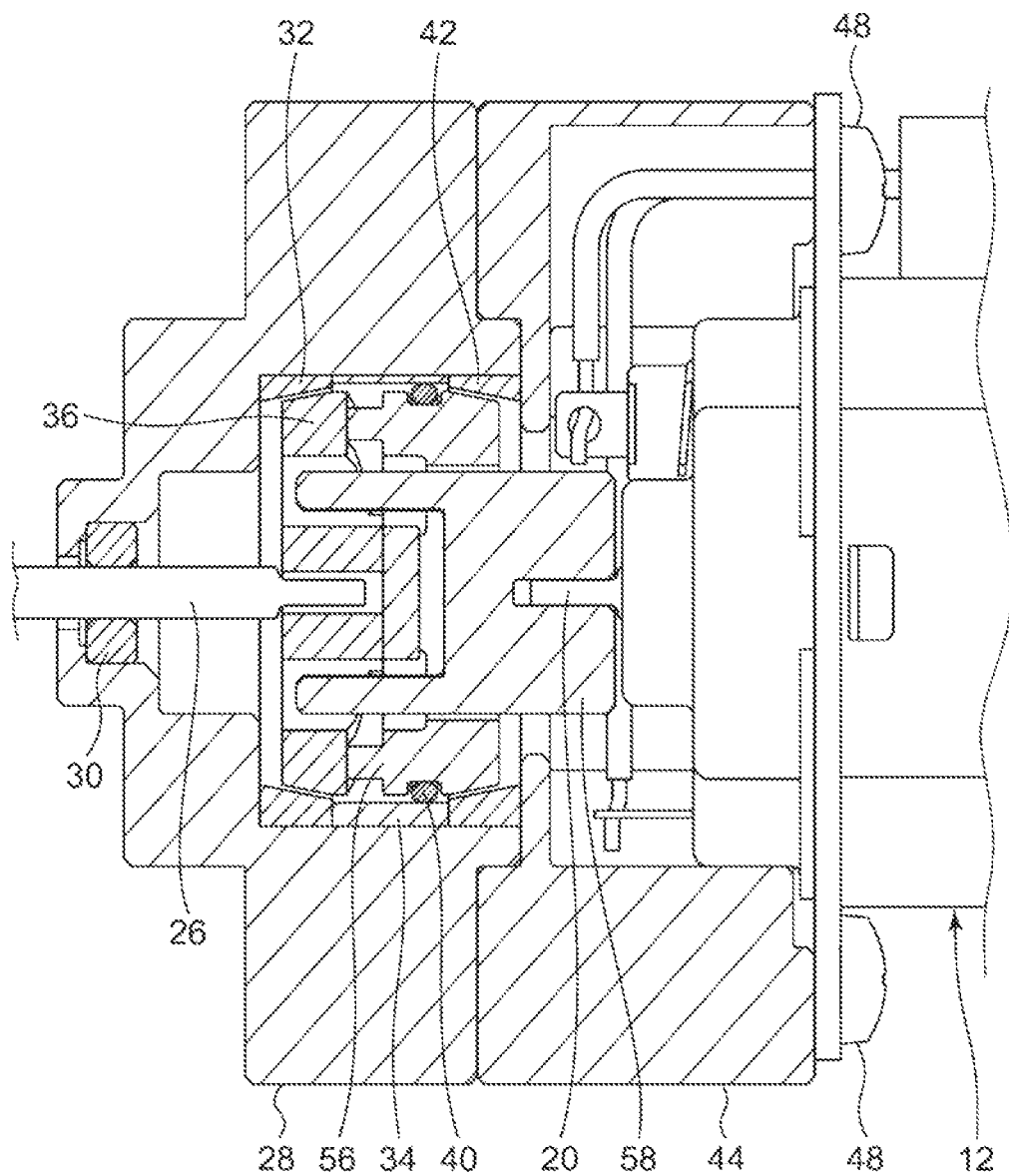
FIG. 31 is an enlarged sectional view of the neighborhood of the reverse rotation prevention mechanism according to the third embodiment.

FIG. 30 is an exploded perspective view of a reverse rotation prevention mechanism 120 according to a third embodiment. FIG. 31 is an enlarged sectional view of the neighborhood of the reverse rotation prevention mechanism according to the third embodiment.

Compared with the reverse rotation prevention mechanism 100 according to the first embodiment, the reverse rotation prevention mechanism 120 according to the third embodiment is not provided with a spacing mechanism for causing the brake surface 56f of the lock plate 56 to be spaced apart from the brake surface 42c of the lock plate side brake member 42 when the motor 12 is rotated. More specifically, the lock plate 56 is not provided with a sloped portion 38k found in the lock plate 38 according to the first embodiment. In the other respects, the lock plate 56 and the lock plate 38 are identically shaped. Further, an output pin 58 is not provided with the sloped portion 46h found in the output pin 46 according to the first embodiment. In the other respects, the output pin 58 and the output pin 46 are identically shaped.

Fourth Embodiment

Figure 32:
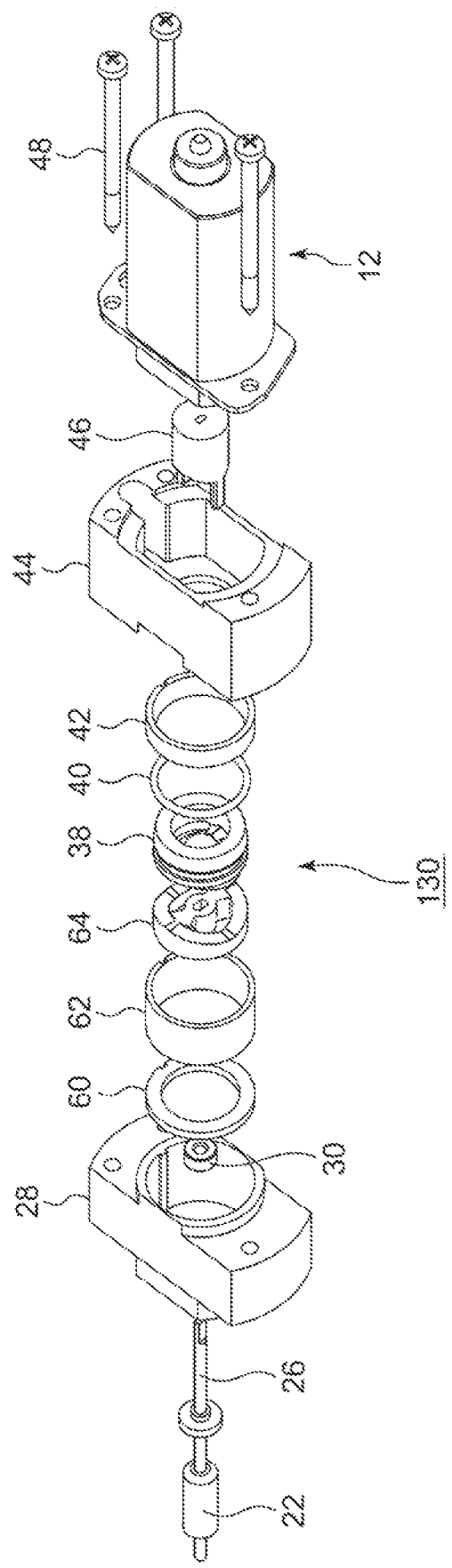
FIG. 32 is an exploded perspective view of a reverse rotation prevention mechanism according to a fourth embodiment.
Figure 33:
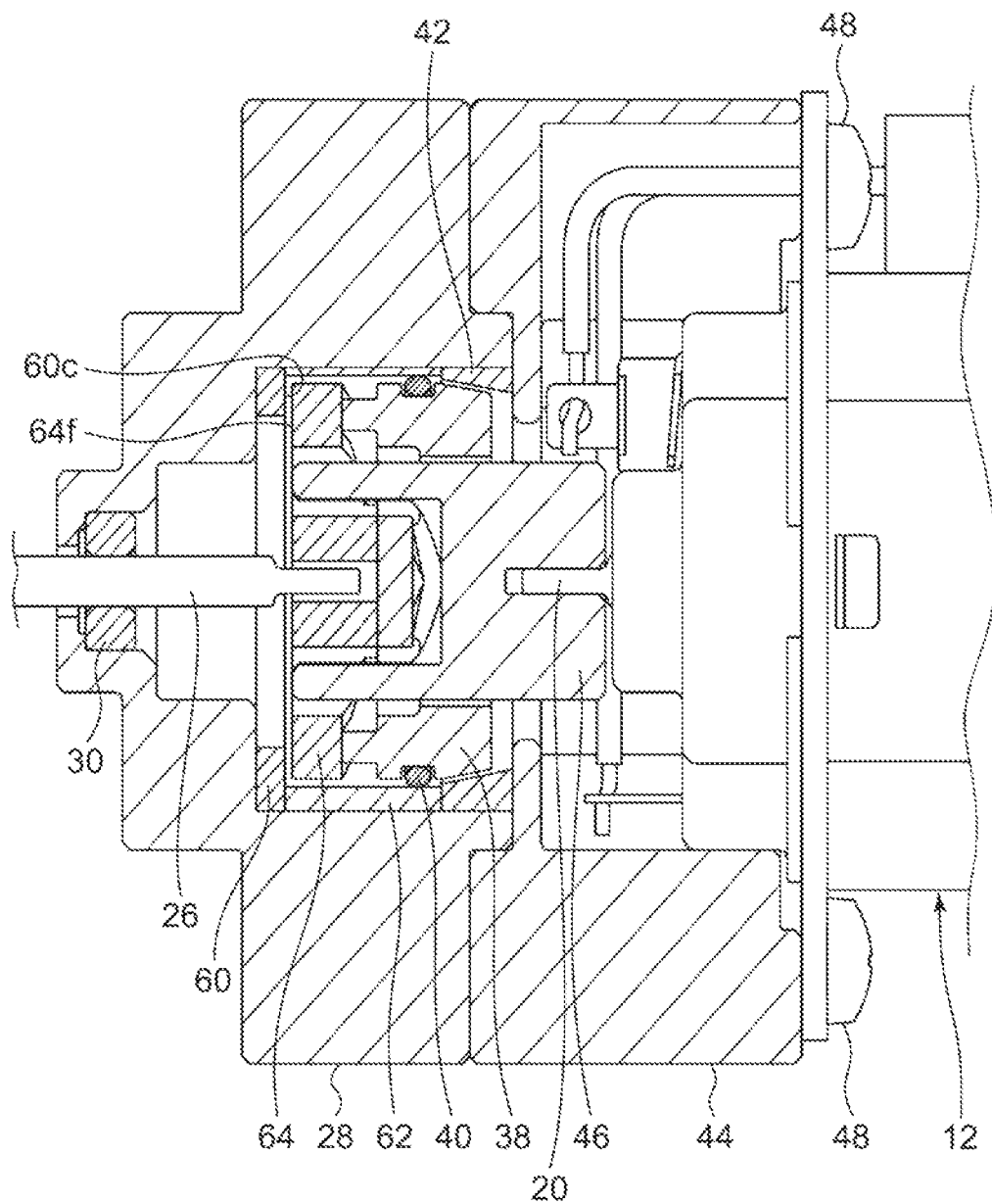
FIG. 33 is an enlarged sectional view of the neighborhood of the reverse rotation prevention mechanism according to the fourth embodiment.

FIG. 32 is an exploded perspective view of a reverse rotation prevention mechanism 130 according to a fourth embodiment. FIG. 33 is an enlarged sectional view of the neighborhood of the reverse rotation prevention mechanism according to the fourth embodiment.

The reverse rotation prevention mechanism 130 according to the fourth embodiment differs from the reverse rotation prevention mechanism 100 according to the first embodiment in respect of the configuration of the third frictional force generation unit. More specifically, the shapes of an output plate side brake member 60, sleeve 62, and output plate 64 are different from those of the reverse rotation prevention mechanism 100. The sleeve 62 is identical to the sleeve 34 according to the first embodiment except for the thickness in the axial direction.

Figure 34:
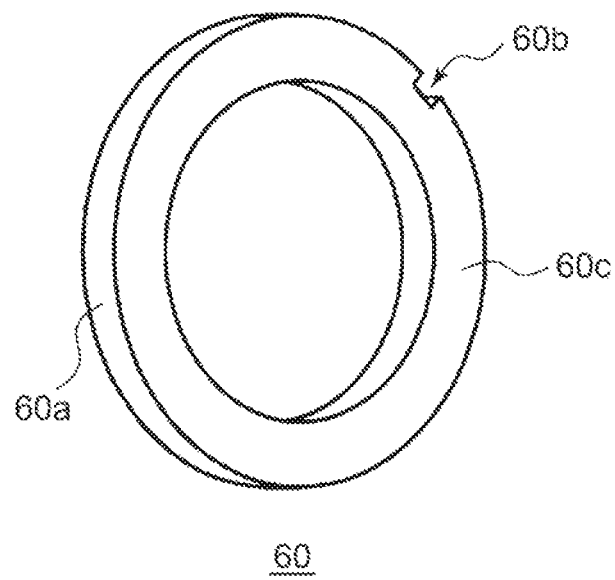
FIG. 34 is a perspective view of the output plate side brake member according to the fourth embodiment.
Figure 35:
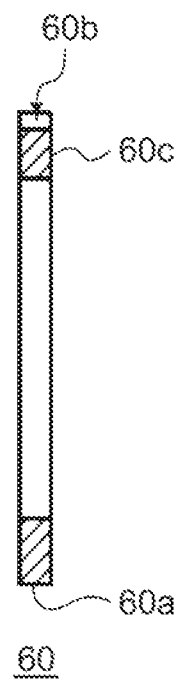
FIG. 35 is a sectional view of the output plate side brake member according to the fourth embodiment.

FIG. 34 is a perspective view of the output plate side brake member 60 according to the fourth embodiment. FIG. 35 is a sectional view of the output plate side brake member 60 according to the fourth embodiment. The output plate side brake member 60 is an annular member and the inner and outer diameters thereof are uniform. An outer circumferential surface 60a is formed with a groove-like anchoring recess 60b parallel to the axial direction. One end face of the output plate side brake member 60 is a brake surface 60c.

Figure 36A:
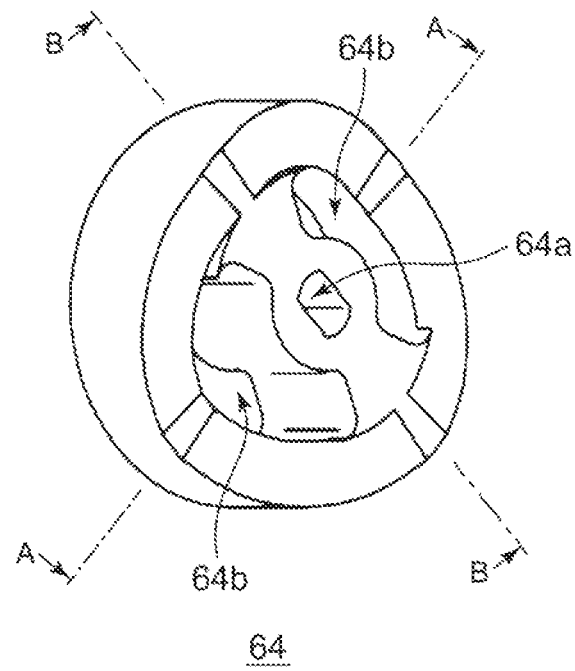
FIG. 36A is a perspective view of the output plate according to the fourth embodiment.
Figure 36B:
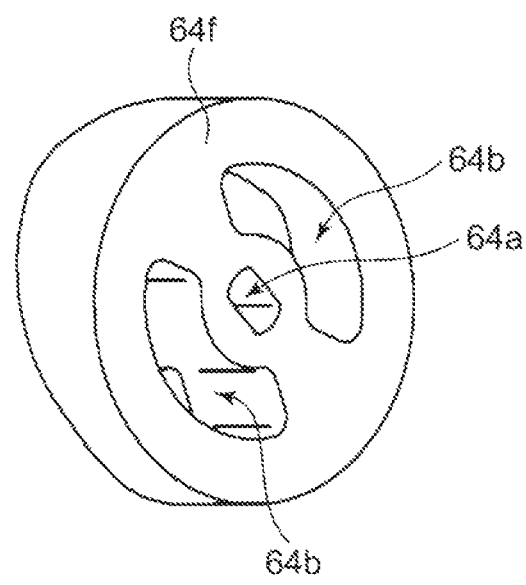
FIG. 36B is a perspective view of the output plate viewed from a direction different from that of FIG. 36A.
Figure 37A:
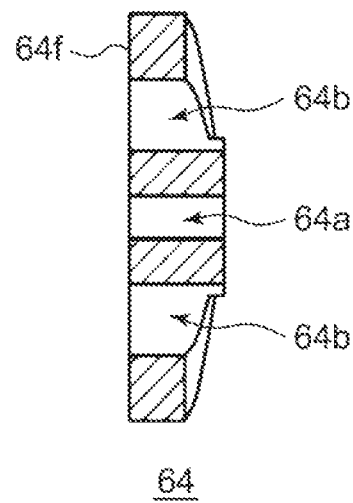
FIG. 37A is a sectional view along A-A of the output plate shown in FIG. 36A.
Figure 37B:
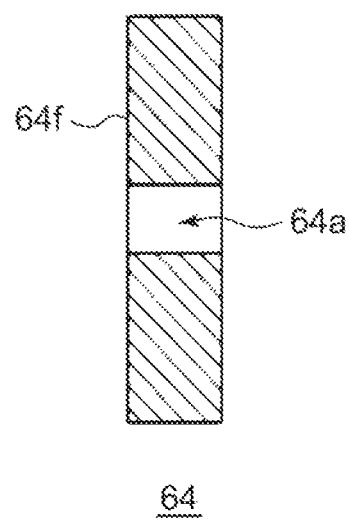
FIG. 37B is a sectional view along B-B of the output plate shown in FIG. 36A.

FIG. 36A is a perspective view of the output plate 64 according to the fourth embodiment, and FIG. 36B is a perspective view of the output plate 64 viewed from a direction different from that of FIG. 36A. FIG. 37A is a sectional view along A-A of the output plate 64 shown in FIG. 36A, and FIG. 37B is a sectional view along B-B of the output plate 64 shown in FIG. 36A.

The output plate 64 is a cylindrical member and differs from the output plate 36 according to the first embodiment in the shape of the brake surface. The output plate 64 is formed at the center with a through hole 64a in which the gear side shaft 26 is inserted. Further, the neighborhood of the center formed with the through hole 64a is formed with two arc-like through holes 64b configured to be rotatable in both directions around the rotational axis when portions of the output pin 46 advance into the through holes 64b. The flat surface of the output plate 64 facing the output plate side brake member 60 is a brake surface 64f. In the other respects, the output plate 64 and the output plate 36 are identically shaped.

The third frictional force generation unit in the reverse rotation prevention mechanism 130 according to the fourth embodiment is implemented by the brake surface 60c of the output plate side brake member 60 pressed by the brake surface 64f of the output plate 64 when an external force is exerted on the output shaft 18. This generates a frictional braking force for preventing reverse rotation.

Fifth Embodiment

Figure 38:
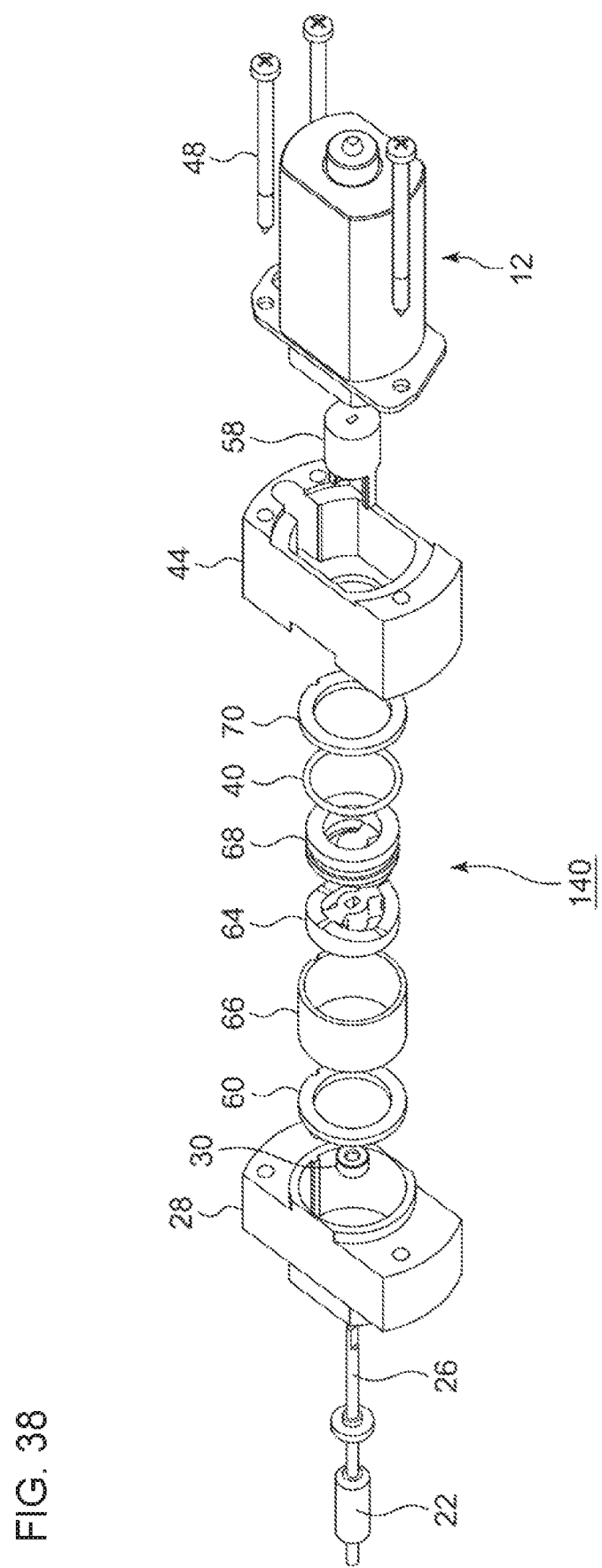
FIG. 38 is an exploded perspective view of a reverse rotation prevention mechanism according to a fifth embodiment.
Figure 39:
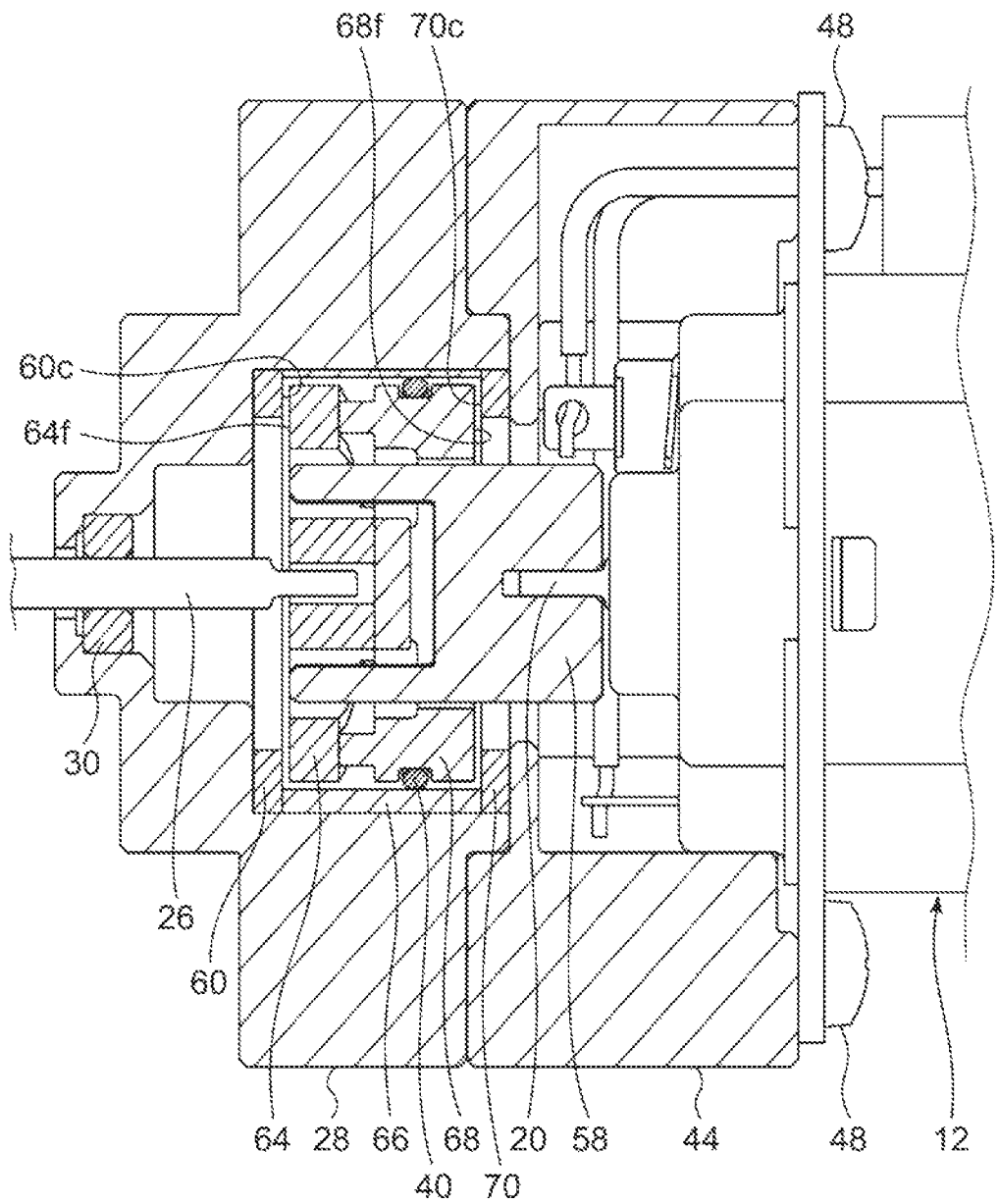
FIG. 39 is an enlarged sectional view of the neighborhood of the reverse rotation prevention mechanism according to the fifth embodiment.

FIG. 38 is an exploded perspective view of a reverse rotation prevention mechanism 140 according to a fifth embodiment. FIG. 39 is an enlarged sectional view of the neighborhood of the reverse rotation prevention mechanism according to the fifth embodiment.

The reverse rotation prevention mechanism 140 according to the fifth embodiment differs from the reverse rotation prevention mechanism 130 according to the fourth embodiment in respect of the configuration of the second frictional force generation unit. More specifically, the shapes of a sleeve 66, lock plate 68, and lock plate side brake member 70 are different from those of the reverse rotation prevention mechanism 130. The sleeve 66 is identical to the sleeve 62 according to the fourth embodiment except for the thickness in the axial direction. The output pin 58 is not provided with the sloped portion 46h found in the output pin 46 according to the fourth embodiment.

Figure 40A:
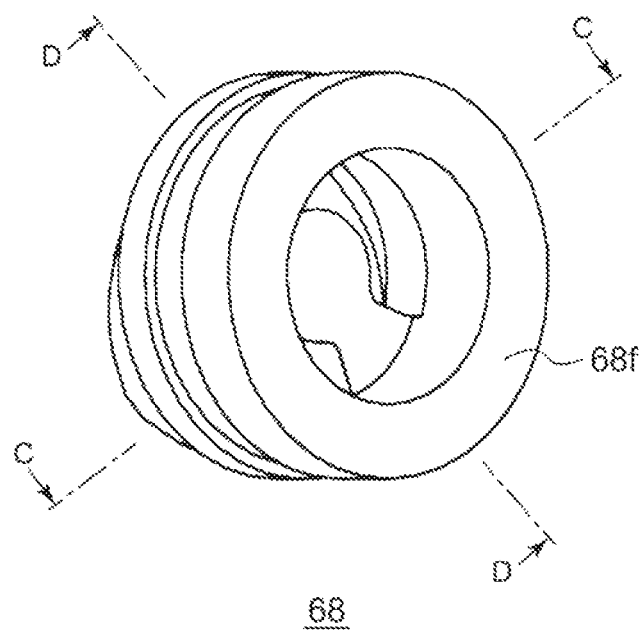
FIG. 40A is a perspective view of the lock plate according to the fifth embodiment.
Figure 40B:
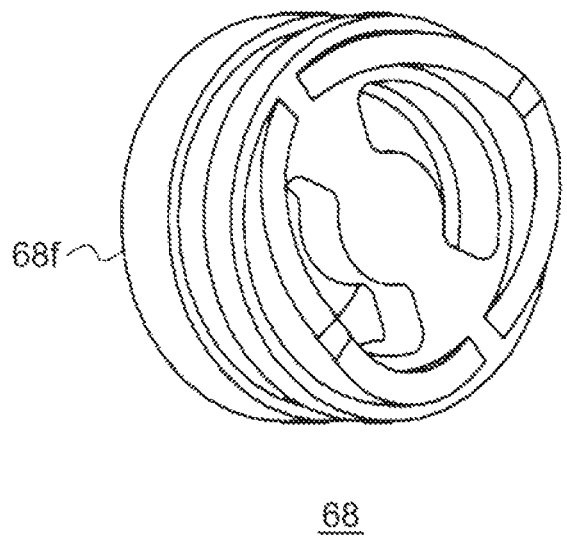
FIG. 40B is a perspective view of the lock plate viewed from a direction different from that of FIG. 40A.
Figure 41A:
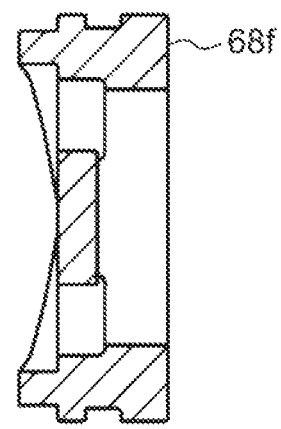
FIG. 41A is a sectional view along C-C of the lock plate shown in FIG. 40A.
Figure 41B:
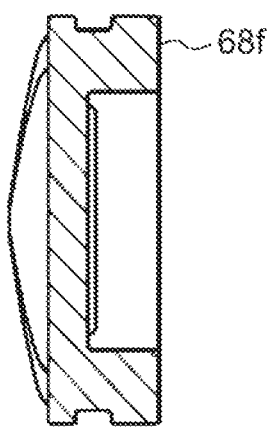
FIG. 41B is a sectional view along D-D of the lock plate shown in FIG. 40A.

FIG. 40A is a perspective view of the lock plate 68 according to the fifth embodiment, and FIG. 40B is a perspective view of the lock plate 68 viewed from a direction different from that of FIG. 40A. FIG. 41A is a sectional view along C-C of the lock plate 68 shown in FIG. 40A, and FIG. 41B is a sectional view along D-D of the lock plate 68 shown in FIG. 40A.

Figure 42:
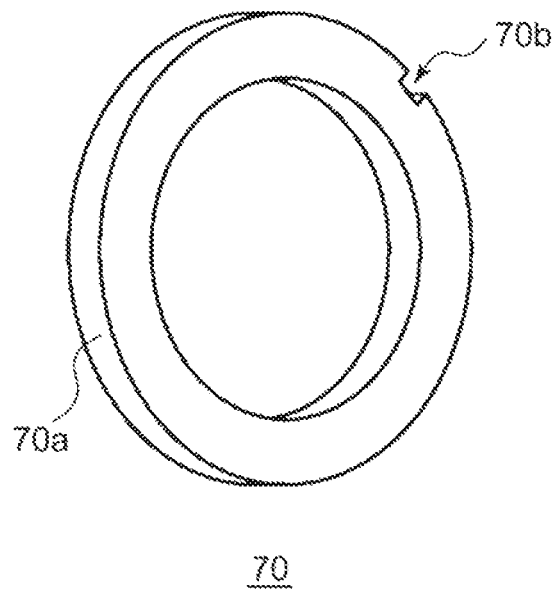
FIG. 42 is a perspective view of the lock plate side brake member according to the fifth embodiment.
Figure 43:
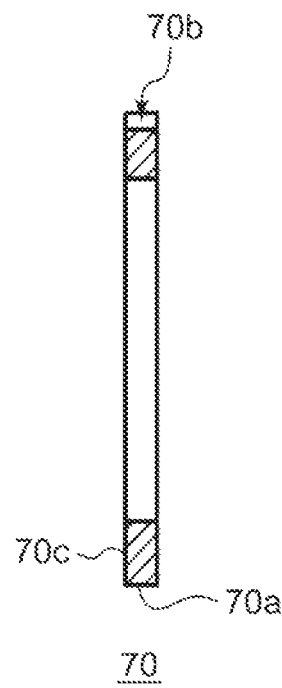
FIG. 43 is sectional view of the lock plate side brake member according to the fifth embodiment.

The lock plate 68 is a cylindrical member and differs from the lock plate 38 according to the first embodiment (fourth embodiment) in the shape of the brake surface. The flat surface of the lock plate 68 facing the lock plate side brake member 70 is a brake surface 68f. In the other respects, the lock plate 68 and the lock plate 38 are identically shaped. For this reason, a force that causes the lock plate 68 to be spaced apart from the output pin 58 is not generated in the reverse rotation prevention mechanism 140 according to the fifth embodiment even if the output pin 58 is rotated FIG. 42 is a perspective view of the lock plate side brake member 70 according to the fifth embodiment. FIG. 43 is sectional view of the lock plate side brake member 70 according to the fifth embodiment. The lock plate side brake member 70 is an annular member and the inner and outer diameters thereof are uniform. An outer circumferential surface 70a is formed with a groove-like anchoring recess 70b parallel to the axial direction. One end face of the lock plate side brake member 70 is a brake surface 70c.

The second frictional force generation unit in the reverse rotation prevention mechanism 140 according to the fifth embodiment is implemented by the brake surface 68f of the lock plate 68 pressed by the brake surface 70c of the lock plate side brake member 70 when an external force is exerted on the output shaft 18. This generates a frictional braking force for preventing reverse rotation.

Sixth Embodiment

Figure 44:
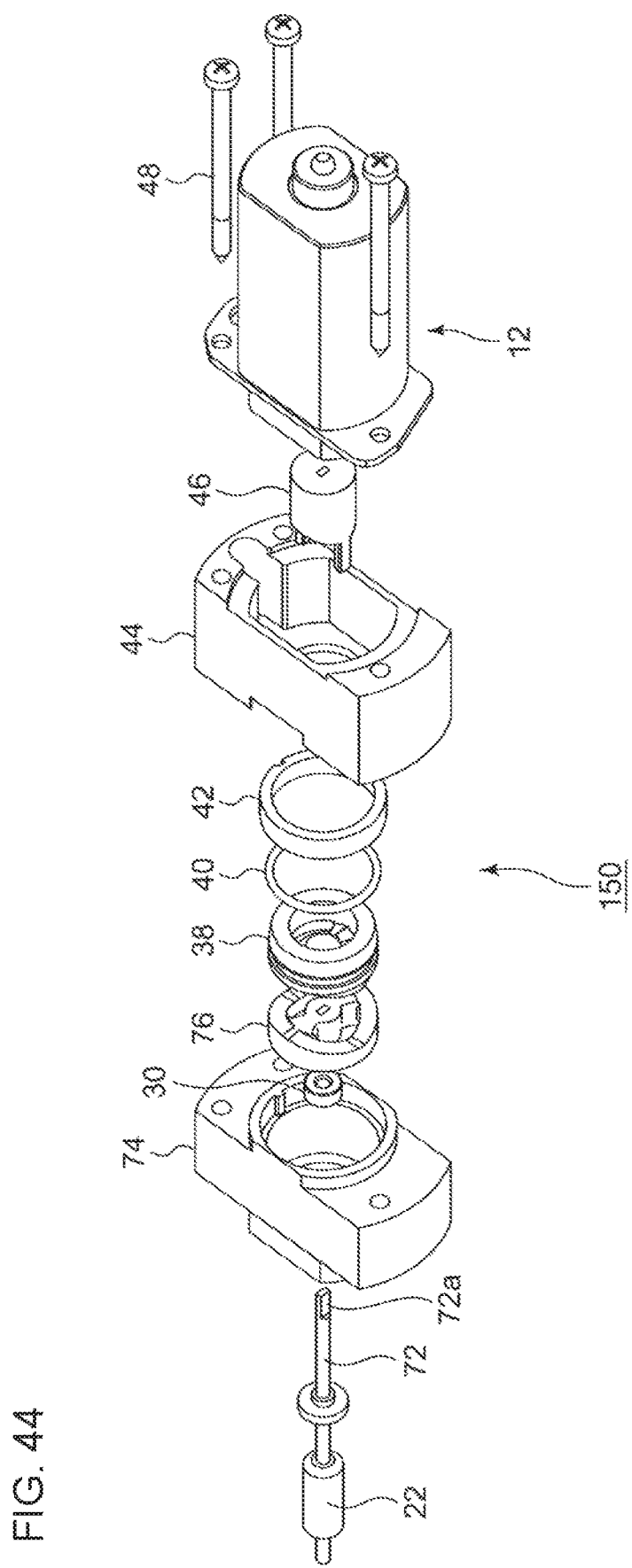
FIG. 44 is an exploded perspective view of a reverse rotation prevention mechanism according to a sixth embodiment.
Figure 45:
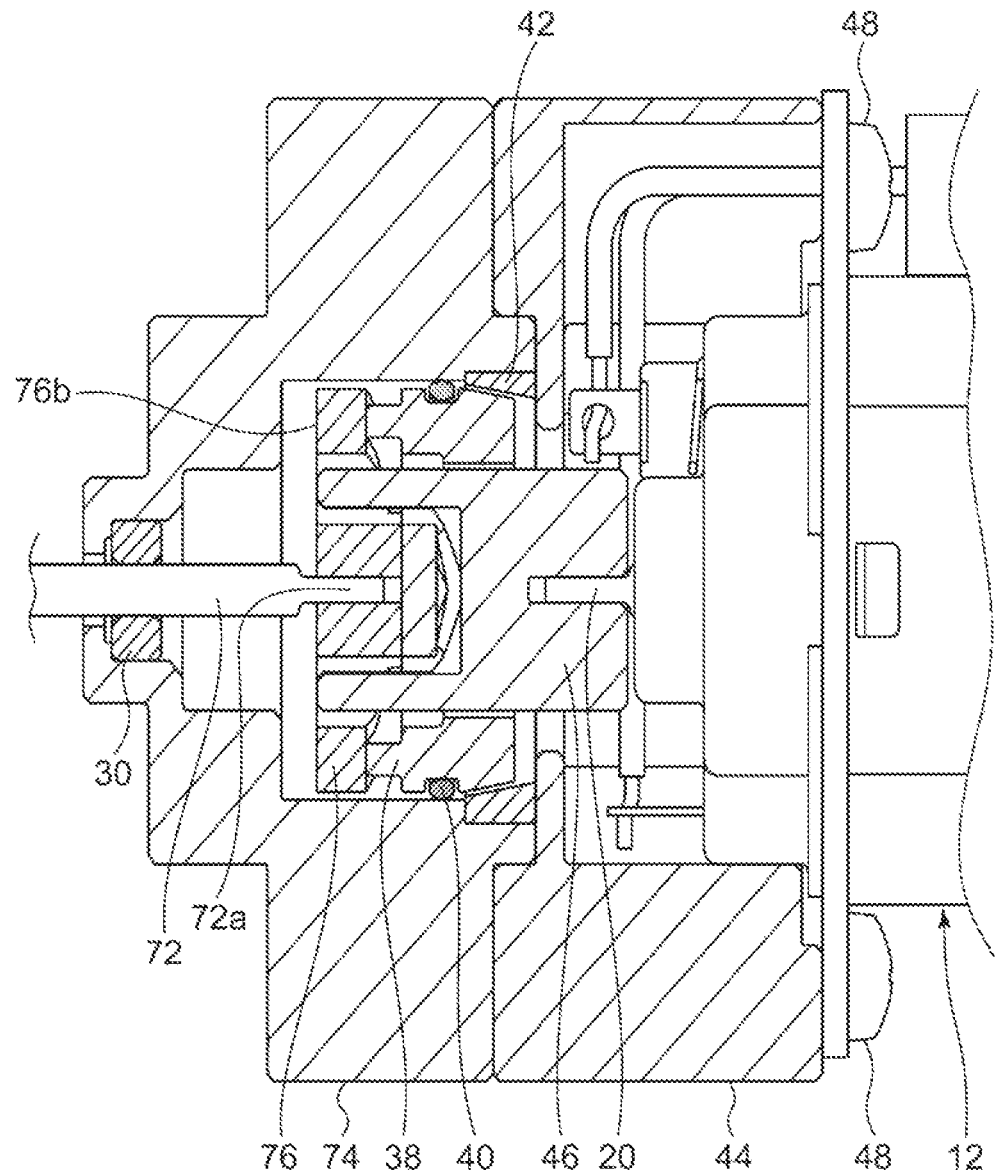
FIG. 45 is an enlarged sectional view of the neighborhood of the reverse rotation prevention mechanism according to the sixth embodiment.

FIG. 44 is an exploded perspective view of a reverse rotation prevention mechanism 150 according to a sixth embodiment. FIG. 45 is an enlarged sectional view of the neighborhood of the reverse rotation prevention mechanism according to the sixth embodiment.

The reverse rotation prevention mechanism 150 according to the sixth embodiment differs from the reverse rotation prevention mechanism 100 according to the first embodiment in that the third frictional force generation unit is not provided. More specifically, the shapes of a gear side shaft 72, first casing 74, and output plate 76 are different from those of the reverse rotation prevention mechanism 100.

Figure 46A:
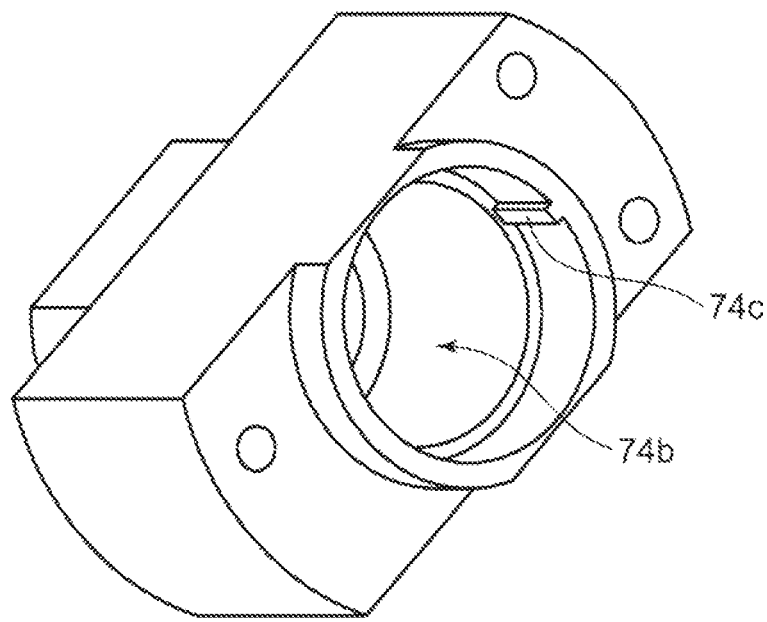
FIG. 46A is a perspective view of the first casing according to the sixth embodiment.
Figure 46B:
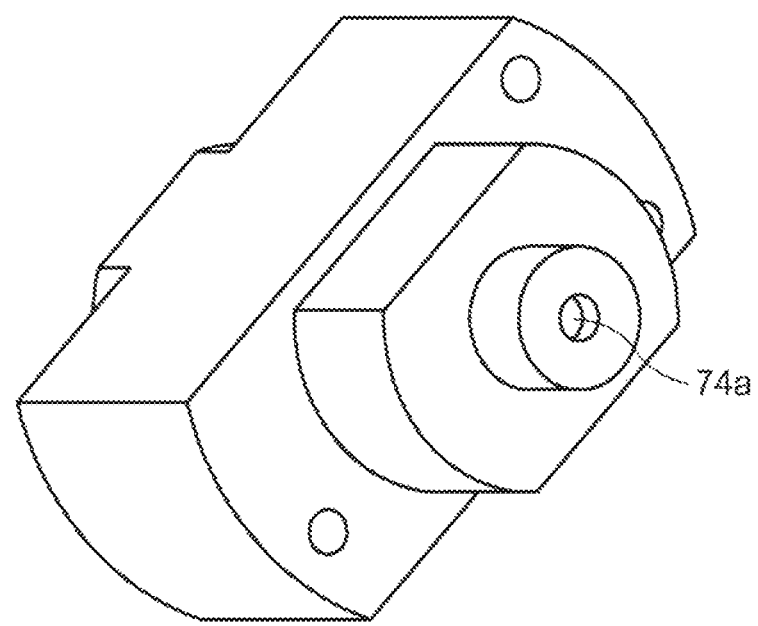
FIG. 46B is a perspective view of the first casing viewed from a direction different from that of FIG. 46A.
Figure 47:
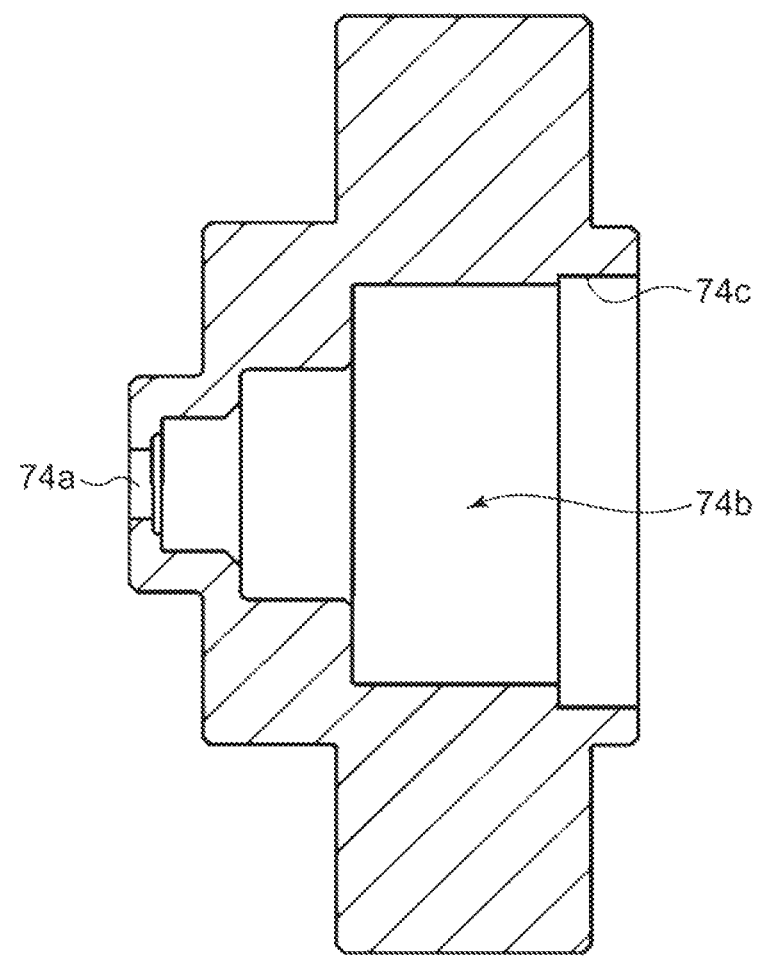
FIG. 47 is a sectional view of the first casing according to the sixth embodiment.

FIG. 46A is a perspective view of the first casing 74 according to the sixth embodiment, and FIG. 46B is a perspective view of the first casing 74 viewed from a direction different from that of FIG. 46A. FIG. 47 is a sectional view of the first casing 74 according to the sixth embodiment. The first casing 74 is formed with a through hole 74a through which a gear side shaft 72 is inserted and a cylindrical recess 74b that accommodates the output plate 76, lock plate 38, and the lock plate side brake member 42. The inner circumferential portion of the recess 74b is formed with a convex anchoring portion 74c parallel to the axial direction of the gear side shaft 72 that prevents the lock plate side brake member 42 from being rotated in the recess 74b.

Figure 48A:
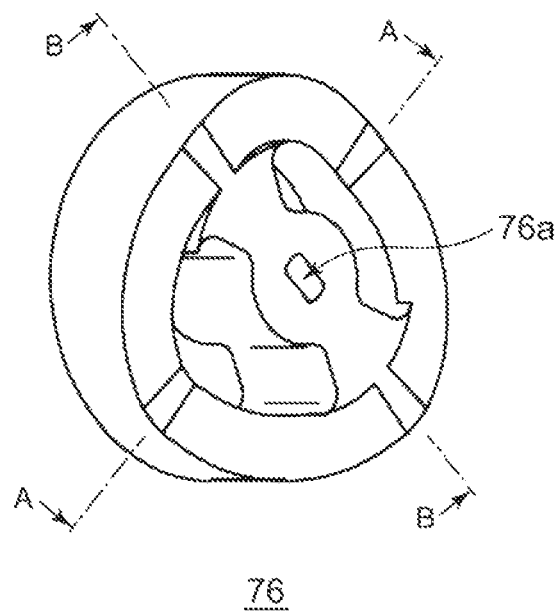
FIG. 48A is a perspective view of the output plate according to the sixth embodiment.
Figure 48B:
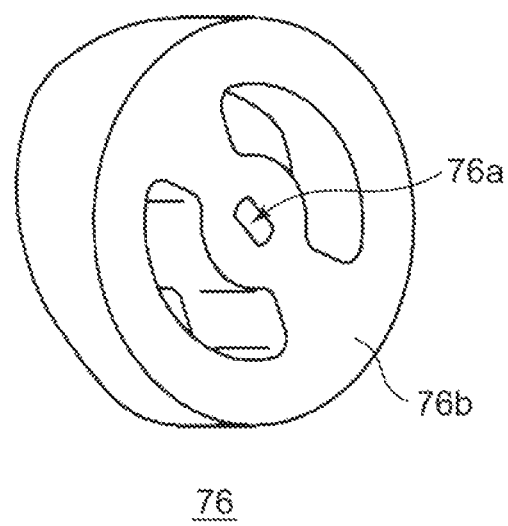
FIG. 48B is a perspective view of the output plate viewed from a direction different from that of FIG. 48A.
Figure 49A:
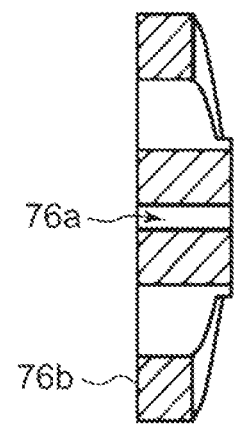
FIG. 49A is a sectional view along A-A of the output plate shown in FIG. 48A.
Figure 49B:
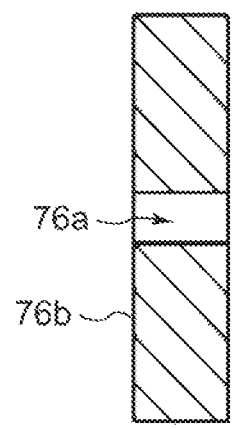
FIG. 49B is a sectional view along B-B of the output plate shown in FIG. 48A.

FIG. 48A is a perspective view of the output plate 76 according to the sixth embodiment, and FIG. 48B is a perspective view of the output plate 76 viewed from a direction different from that of FIG. 48A. FIG. 49A is a sectional view along A-A of the output plate 76 shown in FIG. 48A, and FIG. 49B is a sectional view along B-B of the output plate 76 shown in FIG. 48A.

The output plate 76 is a cylindrical member and differs from the output plate 36 according to the first embodiment in that the output plate 76 does not function as a brake surface and differs in the shape of the through hole. The output plate 76 is formed at the center with a through hole 76a in which a D cut portion 72a at the end of the gear side shaft 72 is press fitted. An end face 76b on the side of the output plate 76 in which the gear side shaft 72 is press fitted is a flat surface. In the other respects, the output plate 76 and the output plate 36 are identically shaped.

Figure 50:
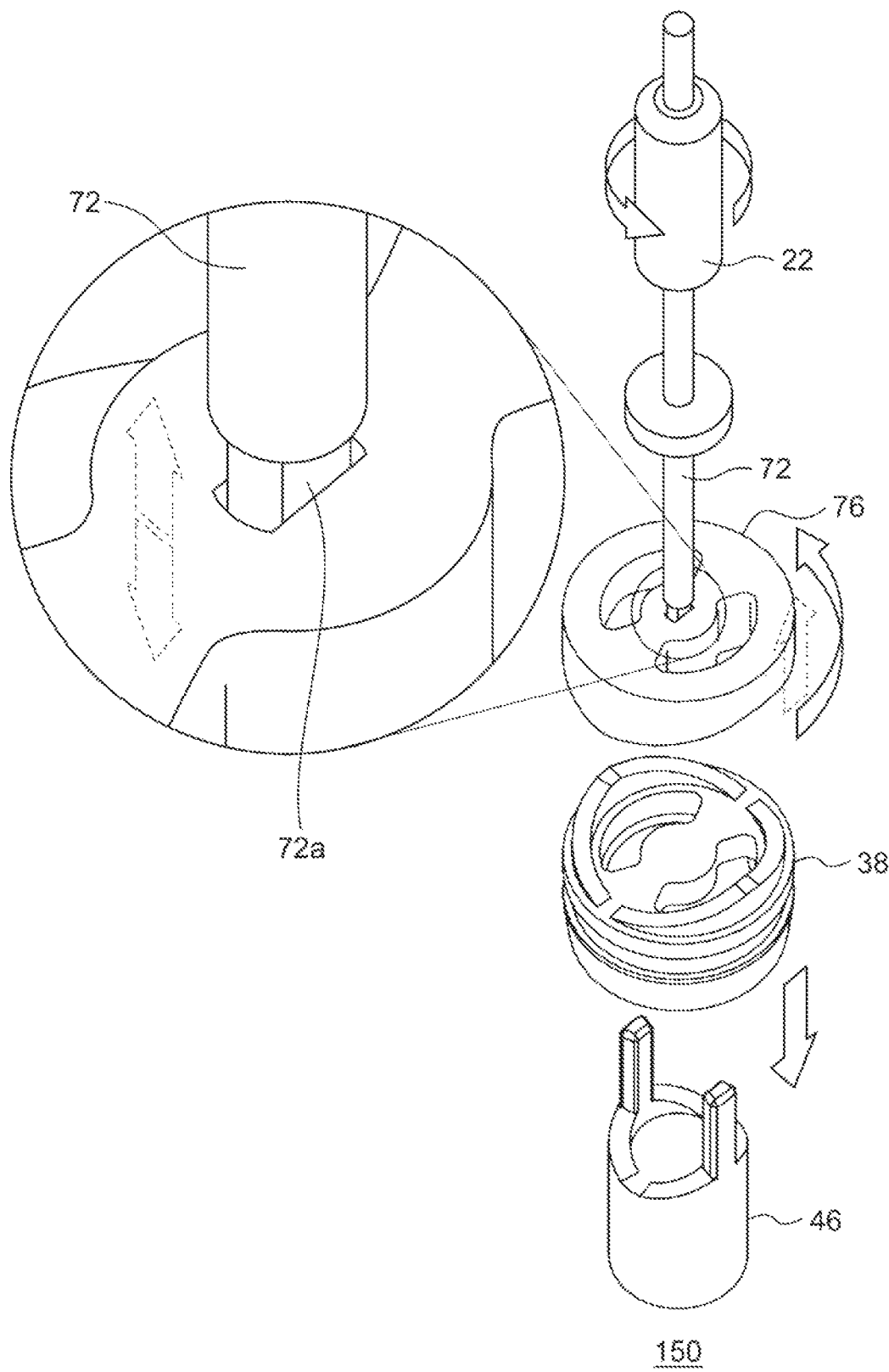
FIG. 50 is a schematic diagram illustrating how the reverse rotation prevention mechanism according to the sixth embodiment works when an external force is exerted on the output shaft.

FIG. 50 is a schematic diagram illustrating how the reverse rotation prevention mechanism 150 according to the sixth embodiment works when an external force is exerted on the output shaft. The through hole 76a of the output plate 76 and the D cut portion 72a at the end of the gear side shaft 72 in the reverse rotation prevention mechanism 150 are shaped so as to restrict the axial and rotational movement (prevent relative movement) of the output plate 76 relative to the gear side shaft 72.

As described with reference to FIG. 50, the output plate 76 cannot move toward the worm 22 and only the lock plate 38 can move toward the output pin 46 when a force that causes the output plate 76 and the lock plate 38 to be spaced apart from each other in the axial direction is generated in the reverse rotation prevention mechanism 150 configured as described above. The brake surface 38f (see FIG. 13) of the lock plate 38 is pressed by the brake surface 42c (see FIG. 15) of the lock plate side brake member 42 so as to generate a frictional braking force. In this way, stable anti-reverse-rotation performance is realized. Consequently, the output shaft 18 is prevented from being rotated in an unintended manner even if an external force is exerted on the output shaft 18.

The second frictional force generation unit in the reverse rotation prevention mechanism 150 according to the sixth embodiment is comprised of a combination of the brake surface 38f of the lock plate 38 and the brake surface 42c of the lock plate side brake member 42. Both the brake surface 38f and the brake surface 42c are tapered. Alternatively, the second frictional force generation unit of the reverse rotation prevention mechanism 150 may be comprised of a combination of the lock plate 68 with a flat brake surface 68f and the lock plate side brake member 70 with a flat brake surface 70c.

The external force exerted on the output shaft of the reverse rotation prevention mechanism according to the first through sixth embodiments is reduced by the worm and the worm wheel before being exerted on the reverse rotation prevention mechanism so that the strength of members constituting the reverse rotation prevention mechanism can be lowered.

Seventh Embodiment

Figure 51:
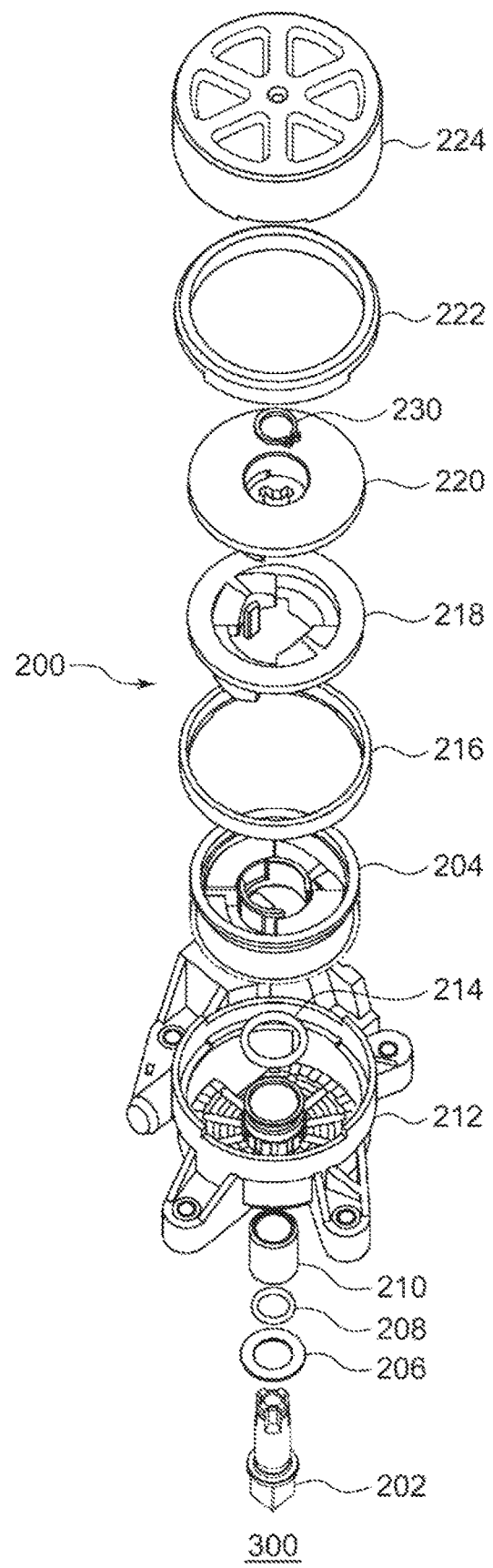
FIG. 51 is an exploded perspective view of a reducer including a reverse rotation prevention mechanism according to a seventh embodiment.
Figure 52:
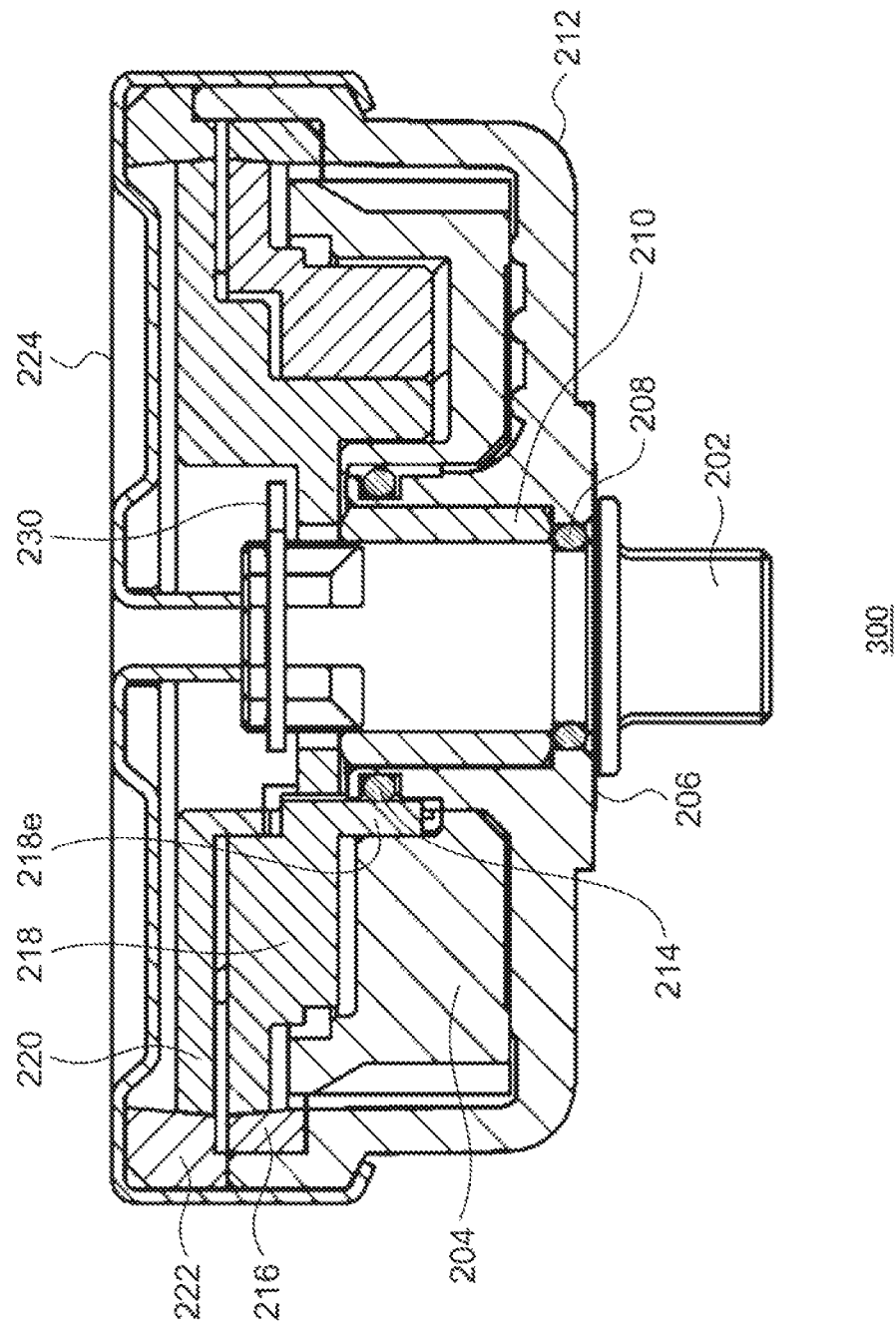
FIG. 52 is an enlarged sectional view of the reducer shown in FIG. 51.

FIG. 51 is an exploded perspective view of a reducer 300 including a reverse rotation prevention mechanism 200 according to a seventh embodiment. FIG. 52 is an enlarged sectional view of the reducer 300 shown in FIG. 51.

The reverse rotation prevention mechanism 200 is provided on a torque transmission path between a worm wheel 204 and an output shaft 202 in the reducer 300. By partly assigning the function of the reverse rotation prevention mechanism 200 to the worm wheel 204, etc. (existent components), an increase in the number of components associated with the introduction of the reverse rotation prevention mechanism 200 is inhibited.

The reducer 300 includes an output shaft 202, a washer 206, an O-ring 208 for waterproofing, a sintered bearing 210, a casing 212, an O-ring 214 for generating a frictional force, a worm wheel 204, a lock plate side brake member 216, a lock plate 218, an output plate 220, a C-shaped retaining ring 230, an output plate side brake member 222, and a cover 224. By being fitted to the groove of the output shaft 202, the C-shaped retaining ring 230 prevents the output shaft 202 from being dislocated from the casing 212. Further, the C-shaped retaining ring 230 is arranged to create a gap between the C-shaped retaining ring 230 and the output plate 220 when the C-shaped retaining ring 230 is fitted to the groove of the output shaft 202. This allows the output plate 220 to move toward the cover 224.

[Casing]

Figure 53:
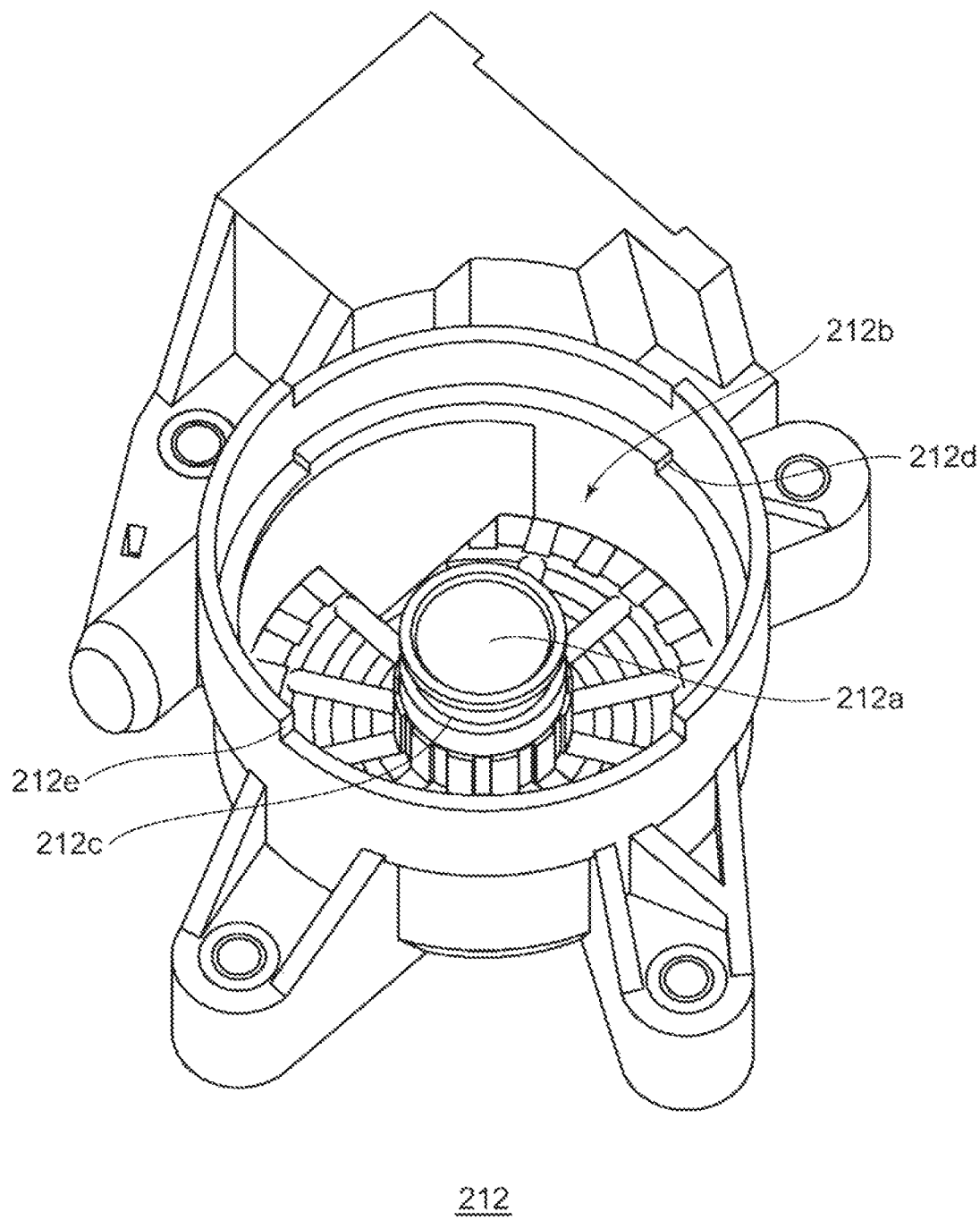
FIG. 53 is a perspective view of the casing according to the seventh embodiment.
Figure 54:
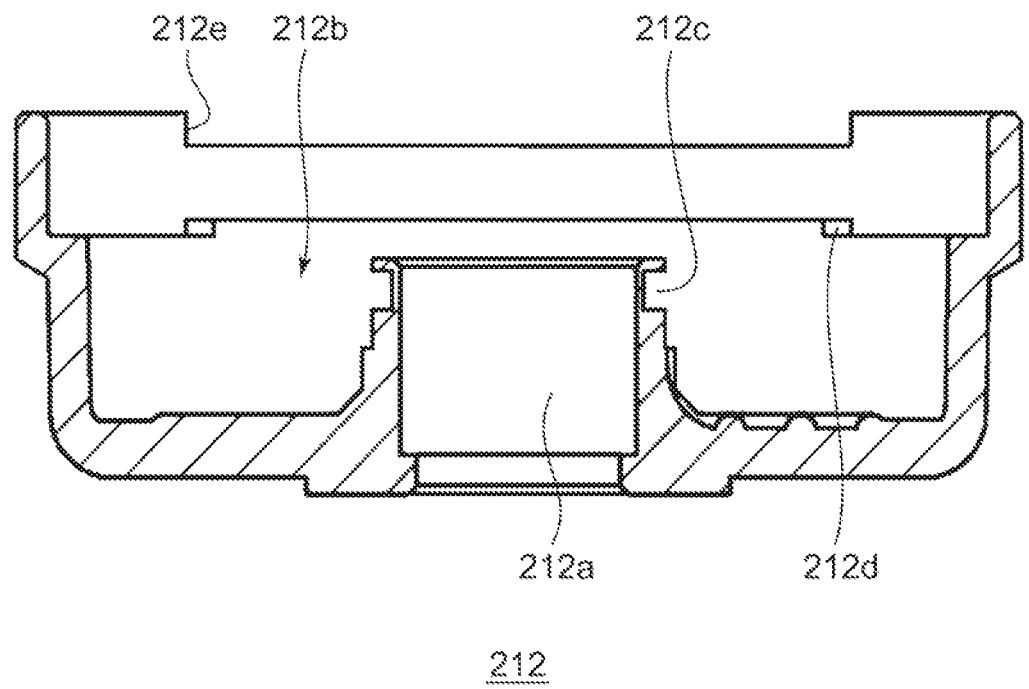
FIG. 54 is a sectional view of the casing according to the seventh embodiment.

FIG. 53 is a perspective view of the casing 212 according to the seventh embodiment. FIG. 54 is a sectional view of the casing 212 according to the seventh embodiment. The casing is formed with a through hole 212a through which the output shaft 202 is inserted, a cylindrical recess 212b that accommodates the worm wheel 204, the lock plate side brake member 216, the lock plate 218, the output plate 220, and the output plate side brake member 222, an annular groove 212c to which the O-ring 214 is fitted, a first engaging portion 212d engaged with the lock plate side brake member 216 so as to prevent the lock plate side brake member 216 from being rotated in the recess 212b, and a second engaging portion 212e engaged with the output plate side brake member 222 so as to prevent the output plate side brake member 222 from being rotated in the recess 212b.

[Output Plate Side Brake Member]

Figure 55A:
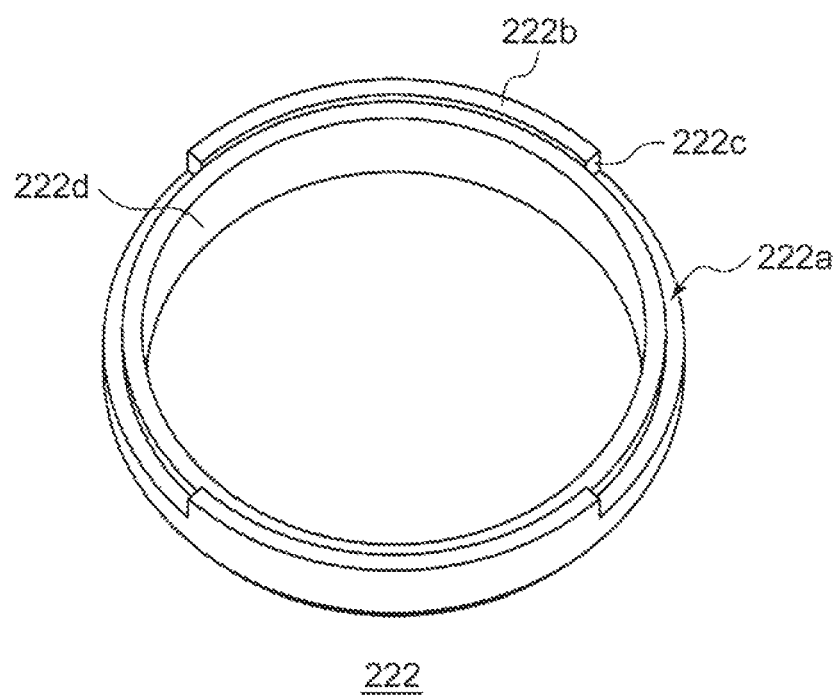
FIG. 55A is a perspective view of the output plate side brake member according to the seventh embodiment.
Figure 55B:
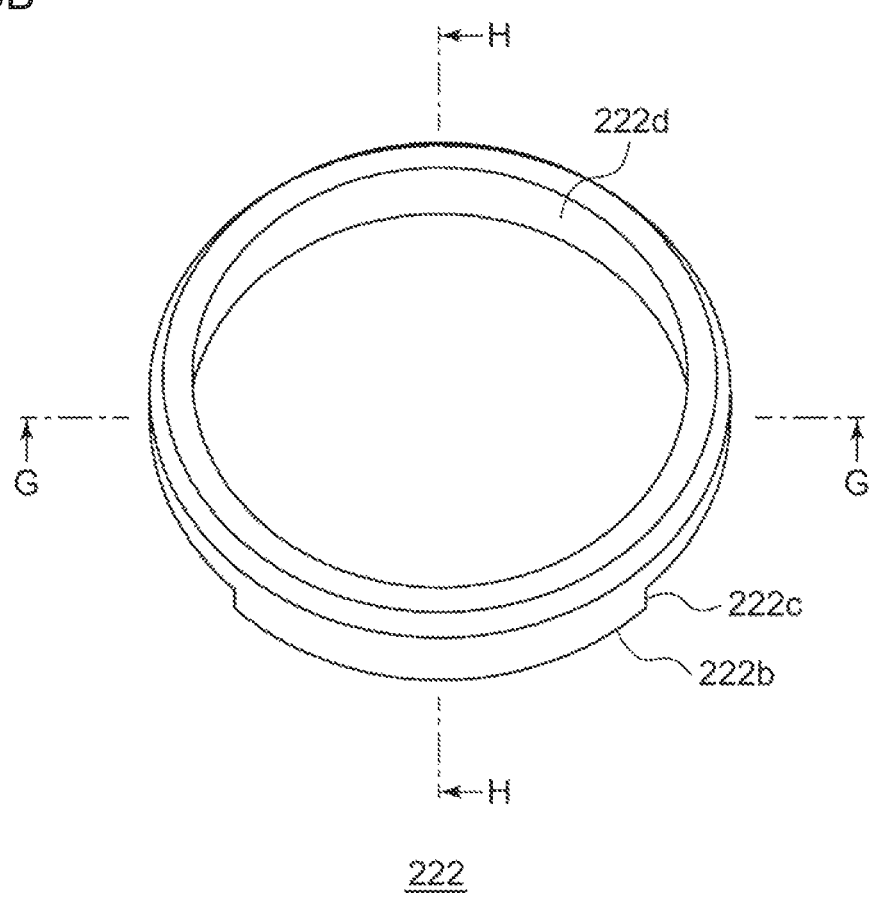
FIG. 55B is a perspective view of the output plate side brake member viewed from a direction different from that of FIG. 55A.
Figure 56A:
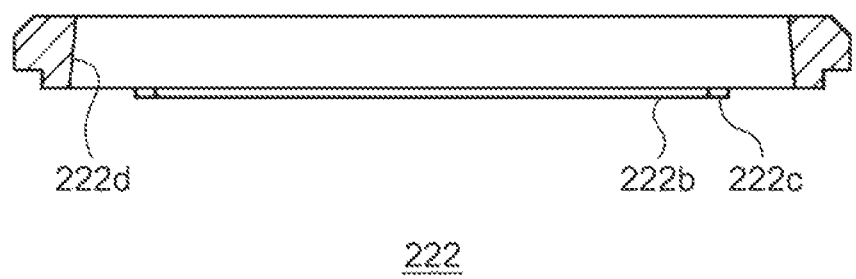
FIG. 56A is a sectional view along G-G of the output plate side brake member shown in FIG. 55B.
Figure 56B:
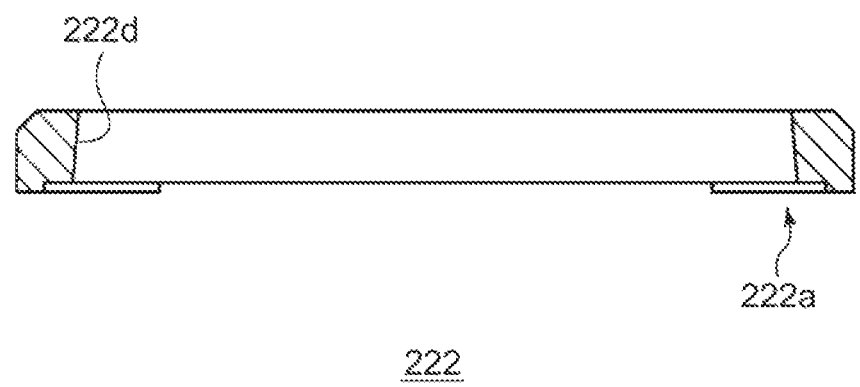
FIG. 56B is a sectional view along H-H of the output plate side brake member shown in FIG. 55B.

FIG. 55A is a perspective view of the output plate side brake member 222 according to the seventh embodiment, and FIG. 55B is a perspective view of the output plate side brake member 222 viewed from a direction different from that of FIG. 55A. FIG. 56A is a sectional view along G-G of the output plate side brake member 222 shown in FIG. 55B, and FIG. 56B is a sectional view along H-H of the output plate side brake member 222 shown in FIG. 55B. The output plate side brake member 222 is an annular member and an arc-like convex portion 222b is provided on one end face 222a of the output plate side brake member 222. As a second engaging portion 222c configured as a step in one end of the convex portion 222b is engaged with a second engaging portion 212e of the casing 212, the output plate side brake member 222 is positioned and fixed relative to the casing 212. Further, the output plate side brake member 222 has a brake surface 222d sloped such that the inner diameter thereof varies in the axial direction of the output shaft 202.

[Output Plate]

Figure 57A:
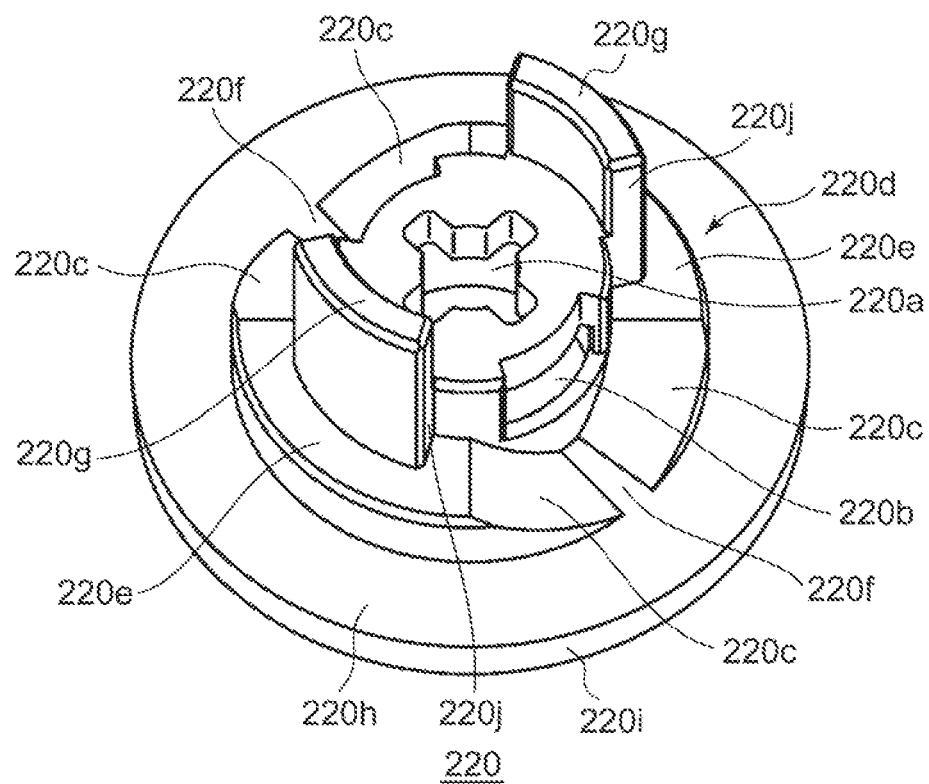
FIG. 57A is a perspective view of an output plate according to a seventh embodiment.
Figure 57B:
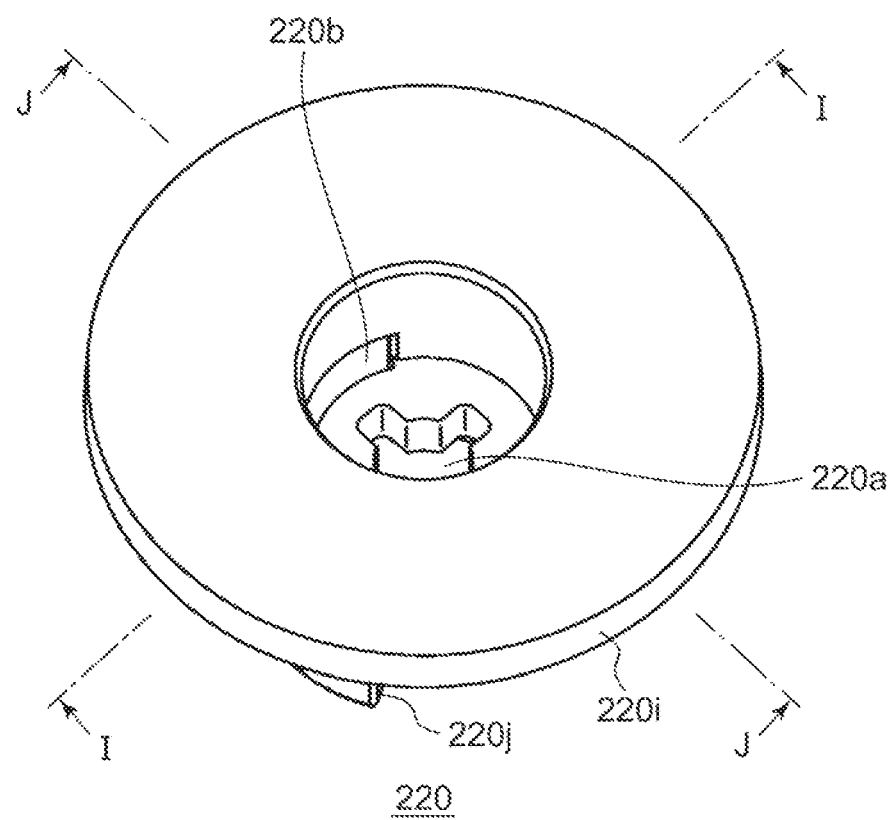
FIG. 57B is a perspective view of the output plate viewed from a direction different from that of FIG. 57A.
Figure 58A:
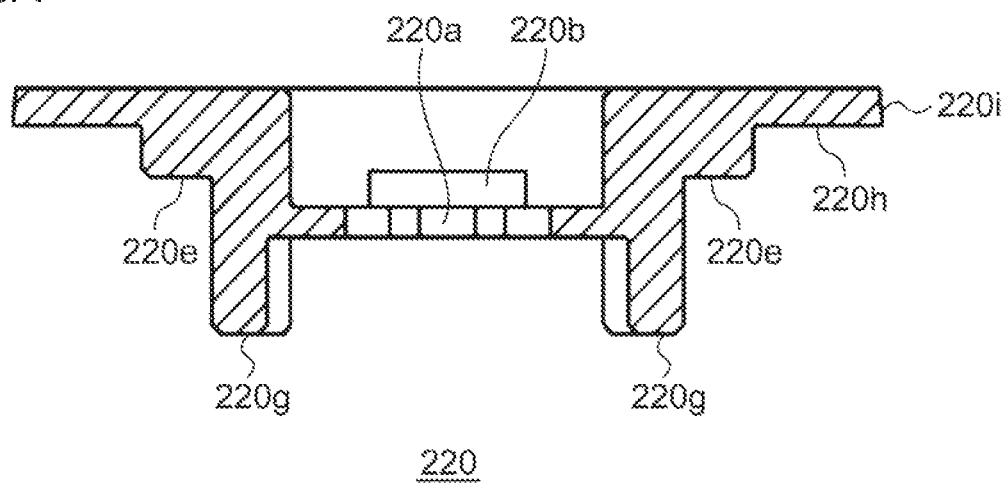
FIG. 58A is a sectional view along I-I of the output plate shown in FIG. 57B.
Figure 58B:
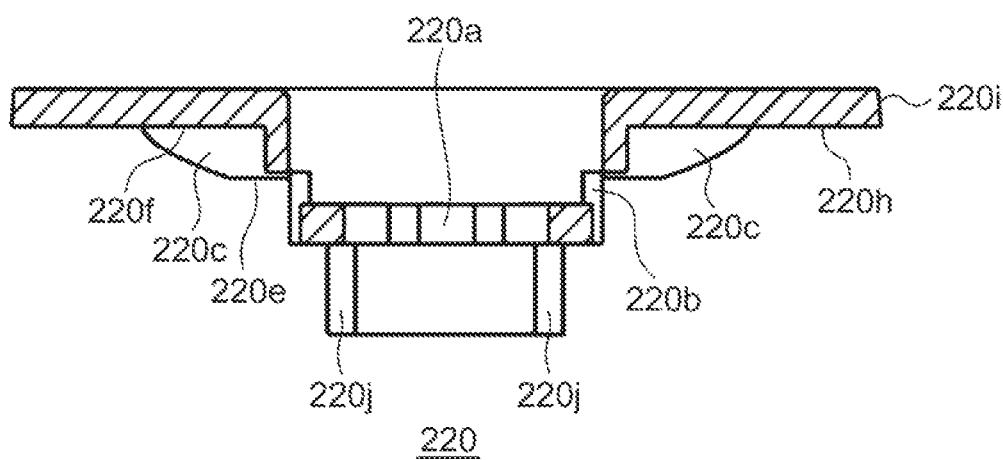
FIG. 58B is a sectional view along J-J of the output plate shown in FIG. 57B.

FIG. 57A is a perspective view of an output plate 220 according to a seventh embodiment, and FIG. 57B is a perspective view of the output plate 220 viewed from a direction different from that of FIG. 57A. FIG. 58A is a sectional view along I-I of the output plate 220 shown in FIG. 57B, and FIG. 58B is a sectional view along J-J of the output plate 220 shown in FIG. 57B.

The output plate 220 is a cylindrical member having a flange and is provided with a through hole 220a in which the output shaft 202 is inserted and an opening 220b described later in which a portion of the lock plate 218 is exposed. An end face 220d of the output plate 220 that faces the lock plate 218 has four arc-like sloped portions 220c formed in the circumferential direction around the center formed with the through hole 220a. The sloped portion 220c is configured such that the height thereof in the axial direction gradually increases or decreases depending on the position in the circumferential direction. A peak 220e or a trough 220f is formed between two adjacent sloped portions 220c so as to alternate. An arc-like convex engaging portion 220g is provided in each of the two peaks 220e so as to extend in the axial direction. The side surface of the convex engaging portion 220g is an engaging surface 220j pressed by a portion of the worm wheel 204 described later when the motor is driven.

The through hole 220a is configured to permit the axial movement of the output shaft 202 and restrict the relative rotational movement of the output shaft 202 while the output shaft 202 is being inserted into the through hole 220a. The outer circumferential surface of a flange portion 220h of the output plate 220 functions as a brake surface 220i. The brake surface 220i according to the embodiment is a tapered surface.

[Lock Plate]

Figure 59A:
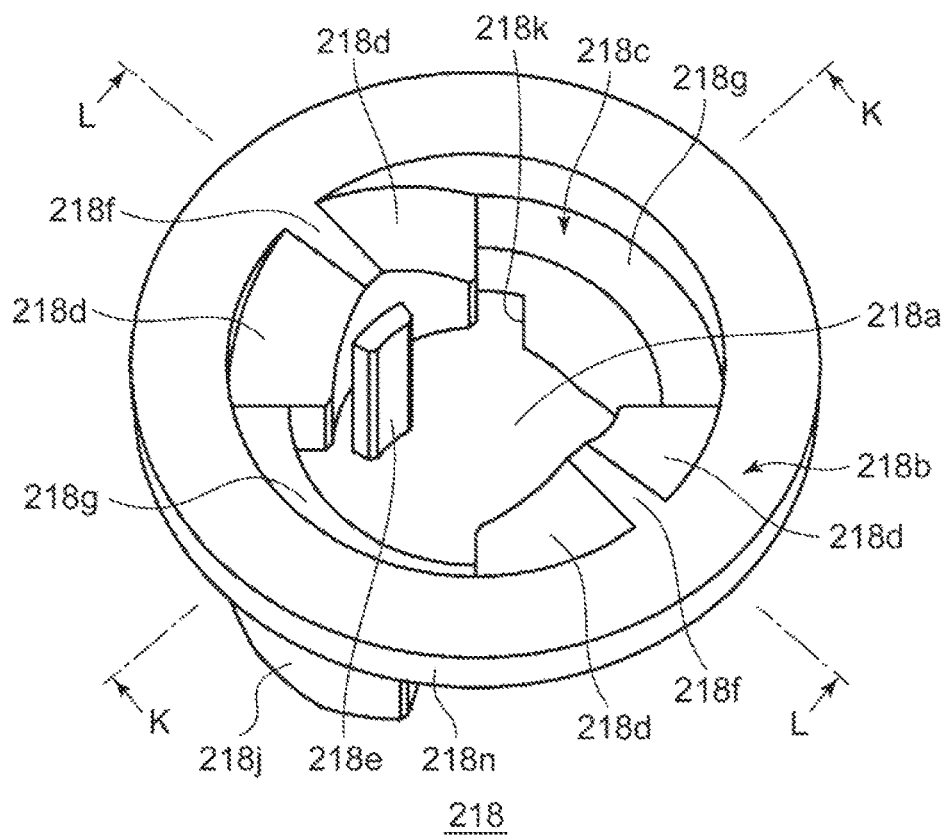
FIG. 59A is a perspective view of a lock plate according to a seventh embodiment.
Figure 59B:
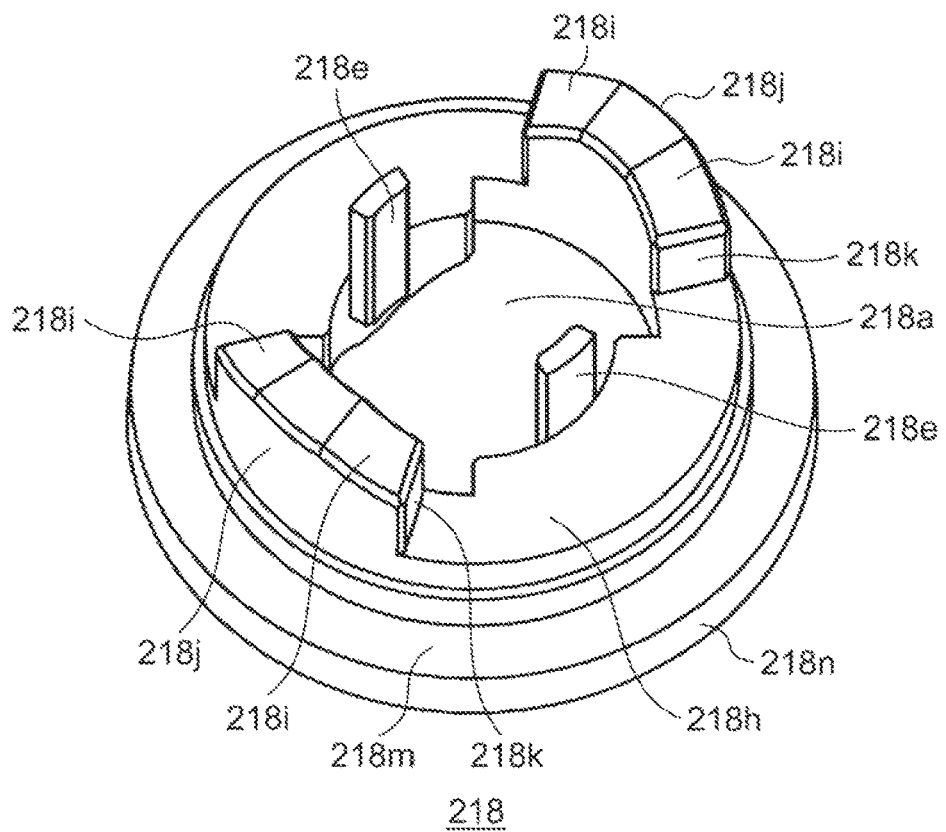
FIG. 59B is a perspective view of the lock plate viewed from a direction different from that of FIG. 59A.
Figure 60A:
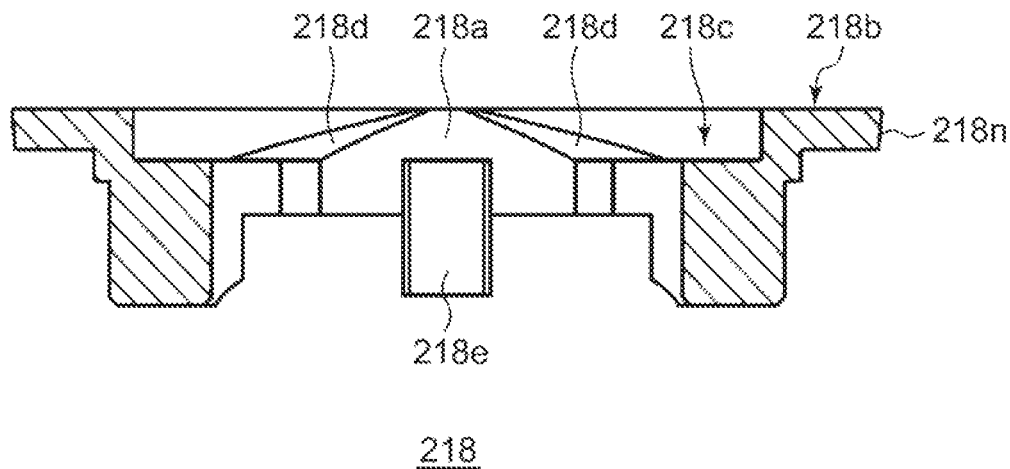
FIG. 60A is a sectional view along K-K of the lock plate shown in FIG. 59A.
Figure 60B:
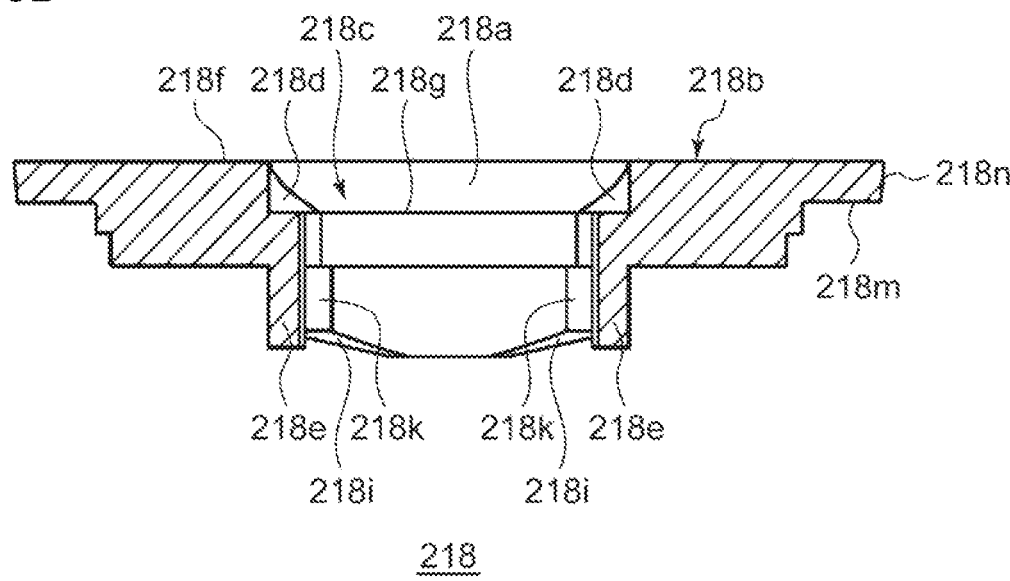
FIG. 60B is a sectional view along L-L of the lock plate shown in FIG. 59A.

FIG. 59A is a perspective view of a lock plate 218 according to a seventh embodiment, and FIG. 59B is a perspective view of the lock plate 218 viewed from a direction different from that of FIG. 59A. FIG. 60A is a sectional view along K-K of the lock plate 218 shown in FIG. 59A, and FIG. 60B is a sectional view along L-L of the lock plate 218 shown in FIG. 59A.

The lock plate 218 is a cylindrical member having a flange and has an opening 218a at the center. The neighborhood of the opening 218a is formed with an annular recess 218c one step below an end surface 218b of the lock plate 218 that faces the output plate 220. The recess 218c has four arc-like sloped portions 218d formed in the circumferential direction. The sloped portion 218d is configured such that the height thereof in the axial direction of the output shaft 202 increases or decreases gradually depending on the position in the circumferential direction. A peak 218f or a trough 218g is formed between two adjacent sloped portions 218d.

The inner circumferential portion of the opening 218a is formed with two arc-like frictional force exerting portions 218e so as to sandwich the opening 218a. The frictional force exerting portion 218e generates a frictional force by being exposed from the opening 220b of the output plate 220 and coming into contact with the O-ring 214.

An end surface 218h of the lock plate 218 that faces the worm wheel 204 is formed with a sloped portion 218i that constitutes a spacing mechanism that causes the lock plate 218 to be spaced apart from the lock plate side brake member 216. Further, the sloped portion 218i is formed on the upper surface of an arc-like convex portion 218j. The side surface of the arc-like convex portion 218j is an engaging surface 218k pressed by a portion of the worm wheel 204 described later when the motor is driven.

The outer circumferential surface of a flange portion 218m of the lock plate 218 functions as a brake surface 218n. The brake surface 218n according to this embodiment is a tapered surface.

(Lock Plate Side Brake Member)

Figure 61A:
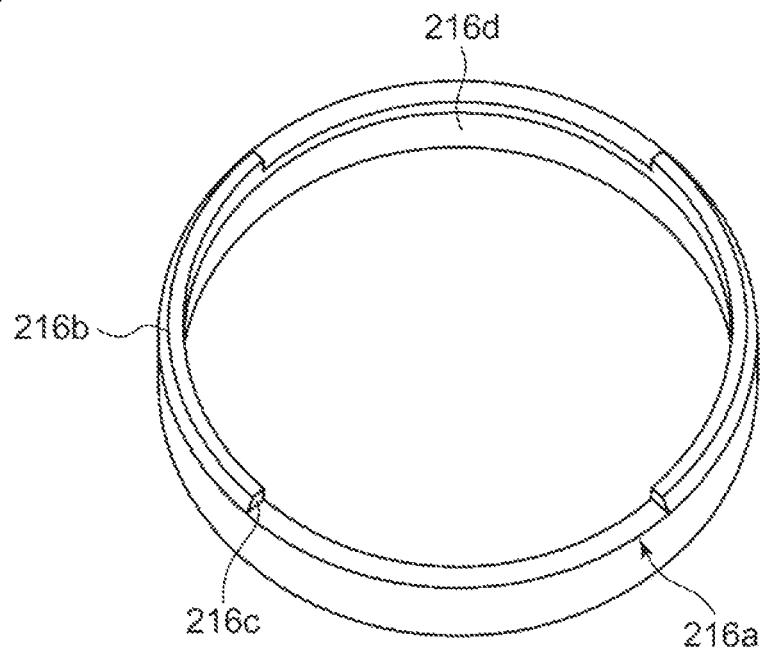
FIG. 61A is a perspective view of the lock plate side brake member according to the seventh embodiment.
Figure 61B:
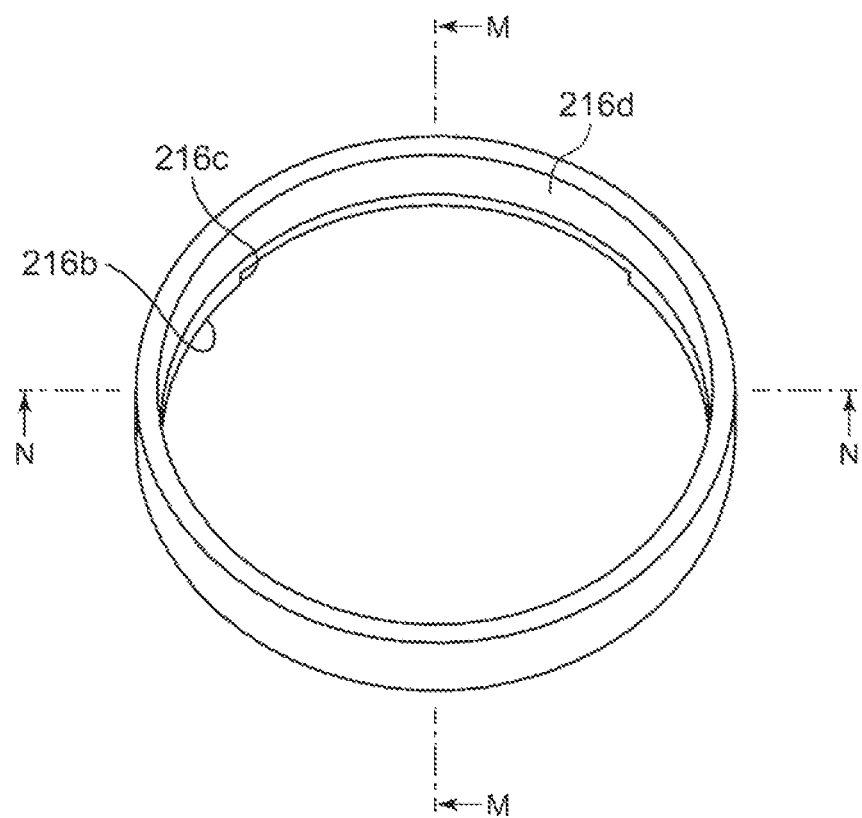
FIG. 61B is a perspective view of the lock plate side brake member viewed from a direction different from that of FIG. 61A.
Figure 62A:
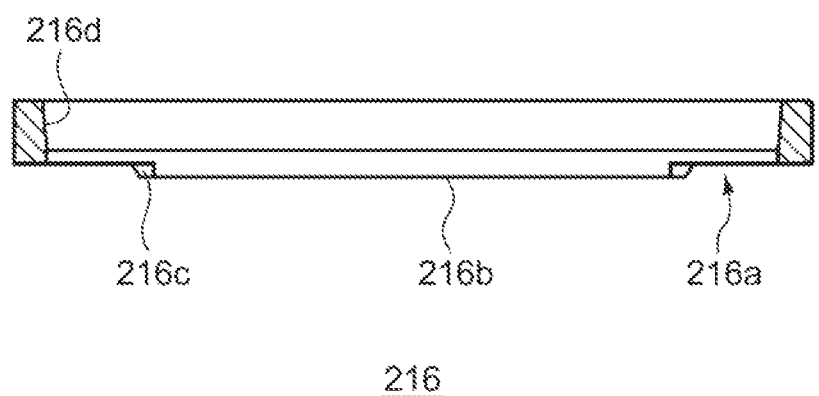
FIG. 62A is a sectional view along M-M of the lock plate side brake member shown in FIG. 61B.
Figure 62B:
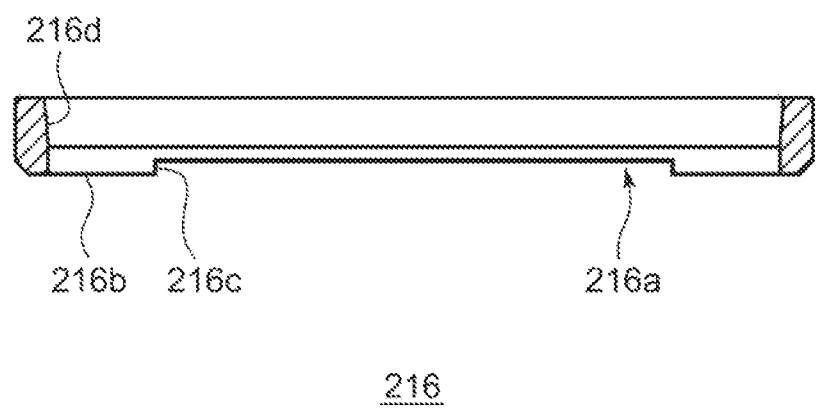
FIG. 62B is a sectional view along N-N of the lock plate side brake member shown in FIG. 61B.

FIG. 61A is a perspective view of the lock plate side brake member 216 according to the seventh embodiment, and FIG. 61B is a perspective view of the lock plate side brake member 216 viewed from a direction different from that of FIG. 61A. FIG. 62A is a sectional view along M-M of the lock plate side brake member 216 shown in FIG. 61B, and FIG. 62B is a sectional view along N-N of the lock plate side brake member 216 shown in FIG. 61B. The lock plate side brake member 216 is an annular member and an arc-like convex portion 216b is provided on one end face 216a of the lock plate side brake member 216. As a first engaging portion 216c configured as a step in one end of the convex portion 216b is engaged with a first engaging portion 212d of the casing 212, the lock plate side brake member 216 is positioned and fixed relative to the casing 212. Further, the lock plate side brake member 216 has a brake surface 216d sloped such that the inner diameter thereof varies in the axial direction.

[Worm Wheel]

Figure 63:
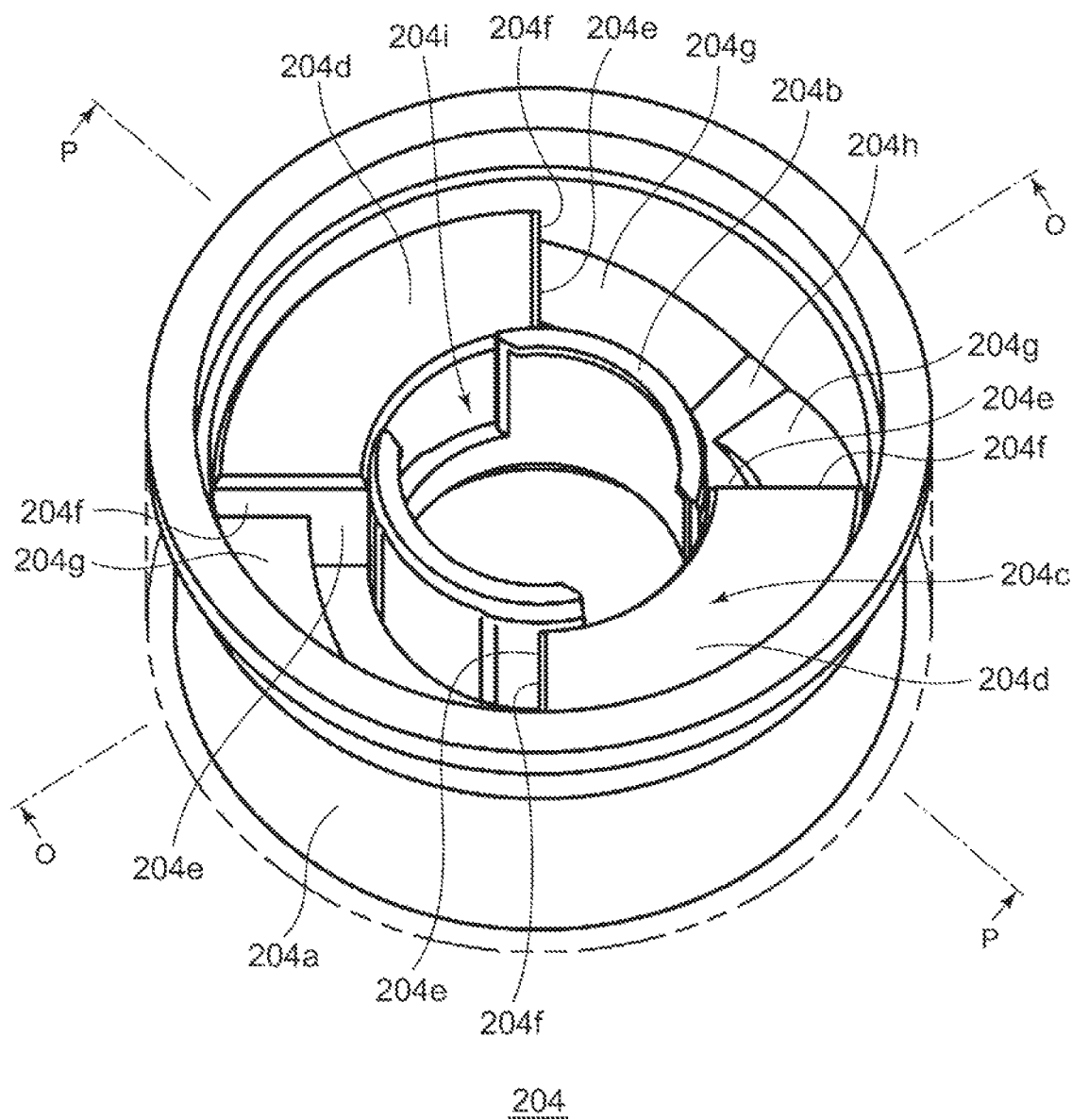
FIG. 63 is a perspective view of the worm wheel according to the seventh embodiment.
Figure 64A:
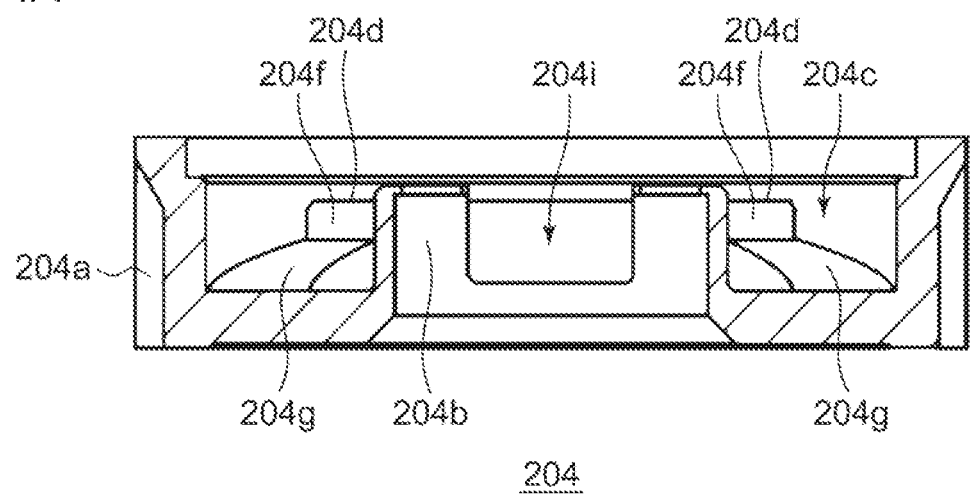
FIG. 64A is a sectional view along O-O of the worm wheel shown in FIG. 63.
Figure 64B:
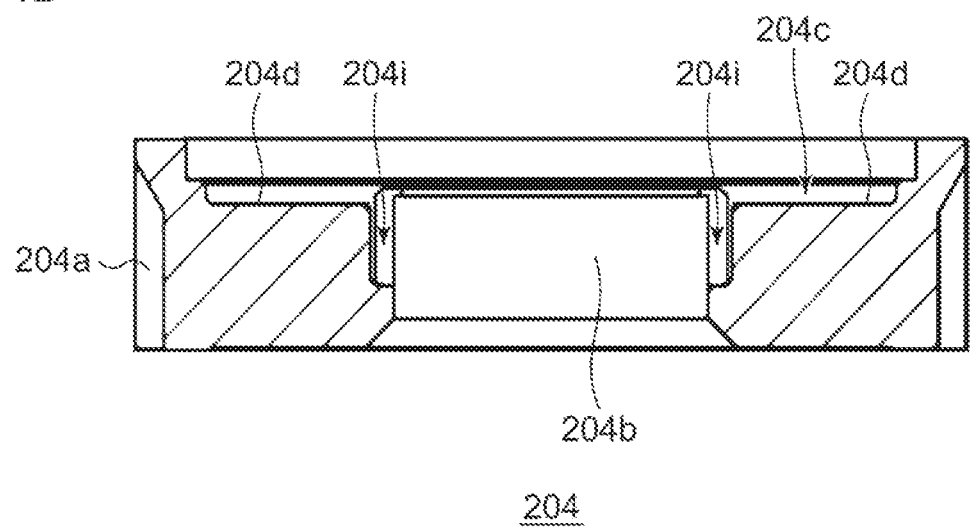
FIG. 64B is a sectional view along P-P of the worm wheel shown in FIG. 63.

FIG. 63 is a perspective view of the worm wheel 204 according to the seventh embodiment. FIG. 64A is a sectional view along O-O of the worm wheel 204 shown in FIG. 63, and FIG. 64B is a sectional view along P-P of the worm wheel 204 shown in FIG. 63.

The worm wheel 204 is a cylindrical member and a gear portion 204a is formed on the outer circumferential surface. A cylindrical portion 204b in which the shaft portion of the casing 212 is inserted is formed at the center of the worm wheel 204. The cylindrical portion 204b is formed with a recess 204i into which the frictional force exerting portion 218e of the lock plate 218 advances. The outer circumferential portion of the cylindrical portion 204b is configured as an annular recess 204c and is provided with two convex engaging portions 204d projecting in the axial direction. The convex engaging portion 204d is provided with an engaging surface 204e (inner diameter side) and an engaging surface 204f (outer diameter side) engaged with the engaging surface 220j of the output plate 220 and the engaging surface 218k of the lock plate 218 when the motor is driven.

The annular recess 204c of the worm wheel 204 has four arc-like sloped portions 204g formed in the circumferential direction. The sloped portion 204g is configured such that the height thereof in the axial direction increases or decreases gradually depending on the position in the circumferential direction. A convex engaging portion 204d or a trough 204h is formed between two adjacent sloped portions 204g so as to alternate.

[Reverse Rotation Prevention Mechanism]

Figure 65:
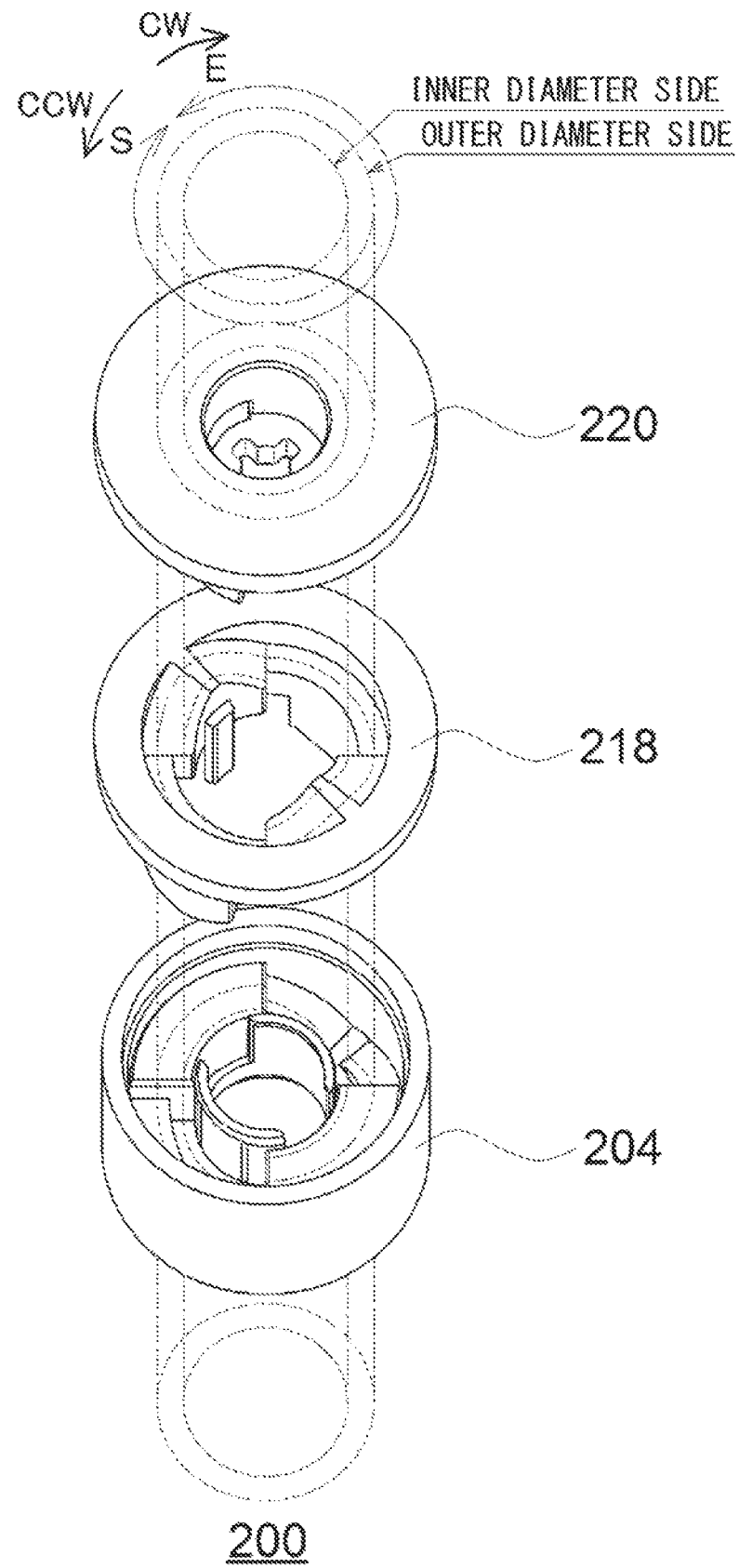
FIG. 65 is an exploded perspective view of an important part of the reverse rotation prevention mechanism according to the seventh embodiment.
Figure 66:
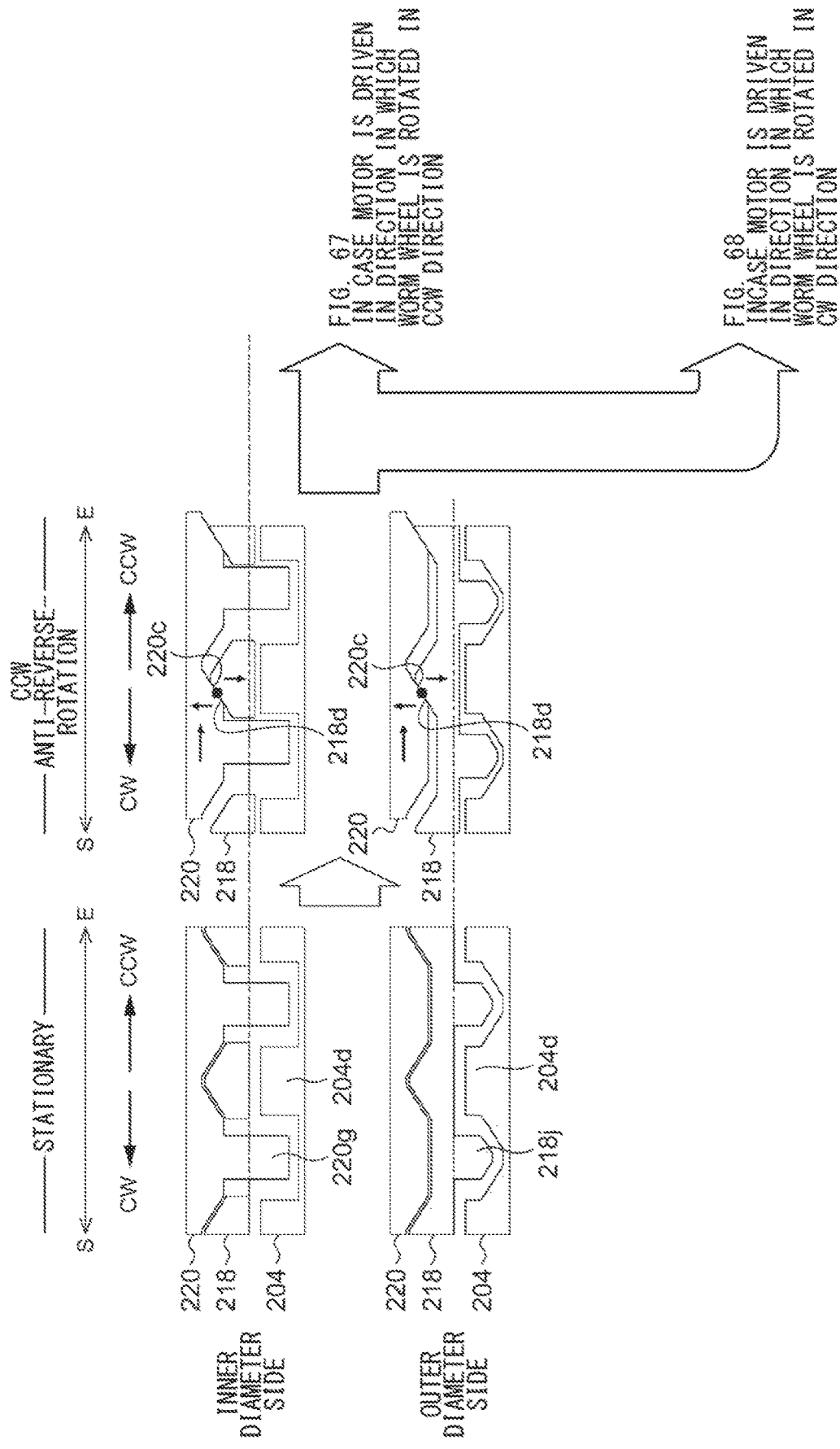
FIG. 66 is a schematic diagram illustrating how the components work when an external force is exerted on the output shaft.

FIG. 65 is an exploded perspective view of an important part of the reverse rotation prevention mechanism 200 according to the seventh embodiment. FIG. 66 is a schematic diagram illustrating how the components work when an external force is exerted on the output shaft. FIG. 66 is a schematic development view of the inner diameter side and outer diameter side of the reverse rotation prevention mechanism of FIG. 65.

As shown in FIG. 66, when the motor with a reducer is stationary, the convex engaging portion 204d of the worm wheel 204 is not in contact with the convex engaging portion 220g of the output plate 220 and the convex portion 218j of the lock plate 218. In this case, no large forces are exerted between the components.

A description will now be given of a case where an external force is exerted on the output shaft in the stationary state like this and the output plate 220 is rotated in, for example, the counterclockwise direction (CCW). When the output plate 220 is rotated in the counterclockwise direction, the sloped portion 220c of the output plate 220 and the sloped portion 218d of the lock plate 218 come into contact with each other on the inner diameter side, generating a force that causes the output plate 220 and the lock plate 218 to be spaced apart from each other in the axial direction. Similarly, the sloped portion 220c of the output plate 220 and the sloped portion 218d of the lock plate 218 come into contact with each other on the outer diameter side in association with the rotation of the output plate 220, generating a force that causes the output plate 220 and the lock plate 218 to be spaced apart from each other in the axial direction.

The through hole 220a of the output plate 220 and the end of the output shaft 202 in the reverse rotation prevention mechanism 200 according to the seventh embodiment are shaped so as to permit the axial movement of the output plate 220 relative to the output shaft 202 and restrict the relative rotational movement of the output plate 220 (prevent relative rotation).

When a force that causes the output plate 220 and the lock plate 218 to be spaced apart from each other in the axial direction is generated in the reverse rotation prevention mechanism 200 configured as described above, the output plate 220 moves toward the output plate side brake member 222 and the lock plate 218 moves toward the lock plate side brake member 216. The brake surface 220i of the output plate 220 is pressed by the brake surface 222d of the output plate side brake member 222 so as to generate a frictional braking force, and the brake surface 218n of the lock plate 218 is pressed by the brake surface 216d of the lock plate side brake member 216 so as to generate a frictional braking force. In this way, stable anti-reverse-rotation performance is realized. Consequently, the output shaft 202 is prevented from being rotated in an unintended manner even if an external force is exerted on the output shaft 202.

[Motor Driving]

Figure 67:
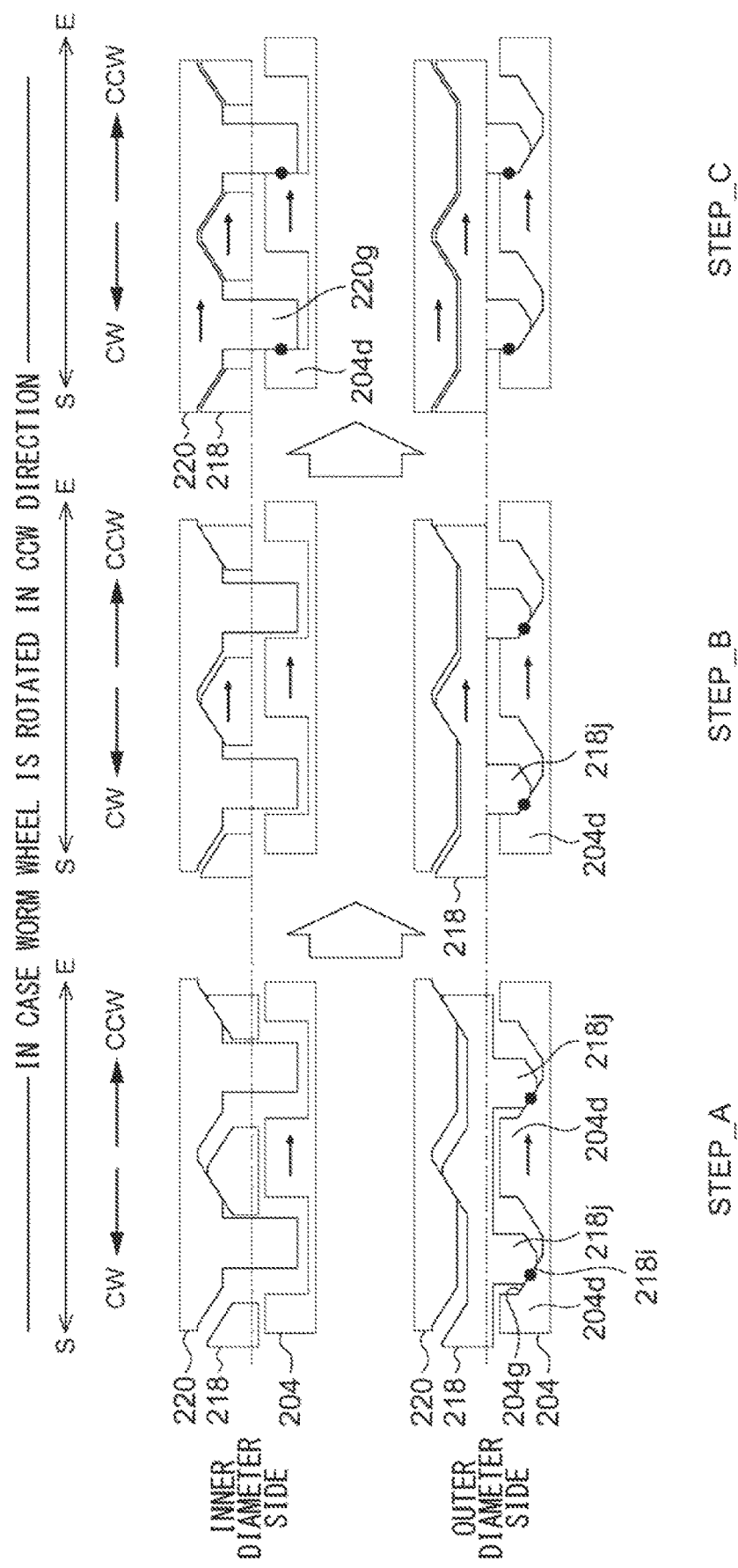
FIG. 67 is a schematic diagram illustrating the action performed when the motor in the state shown in FIG. 66 where the reverse rotation prevention mechanism is functioning is driven in a direction in which the worm wheel is rotated in the counterclockwise direction (CCW)
Figure 68:
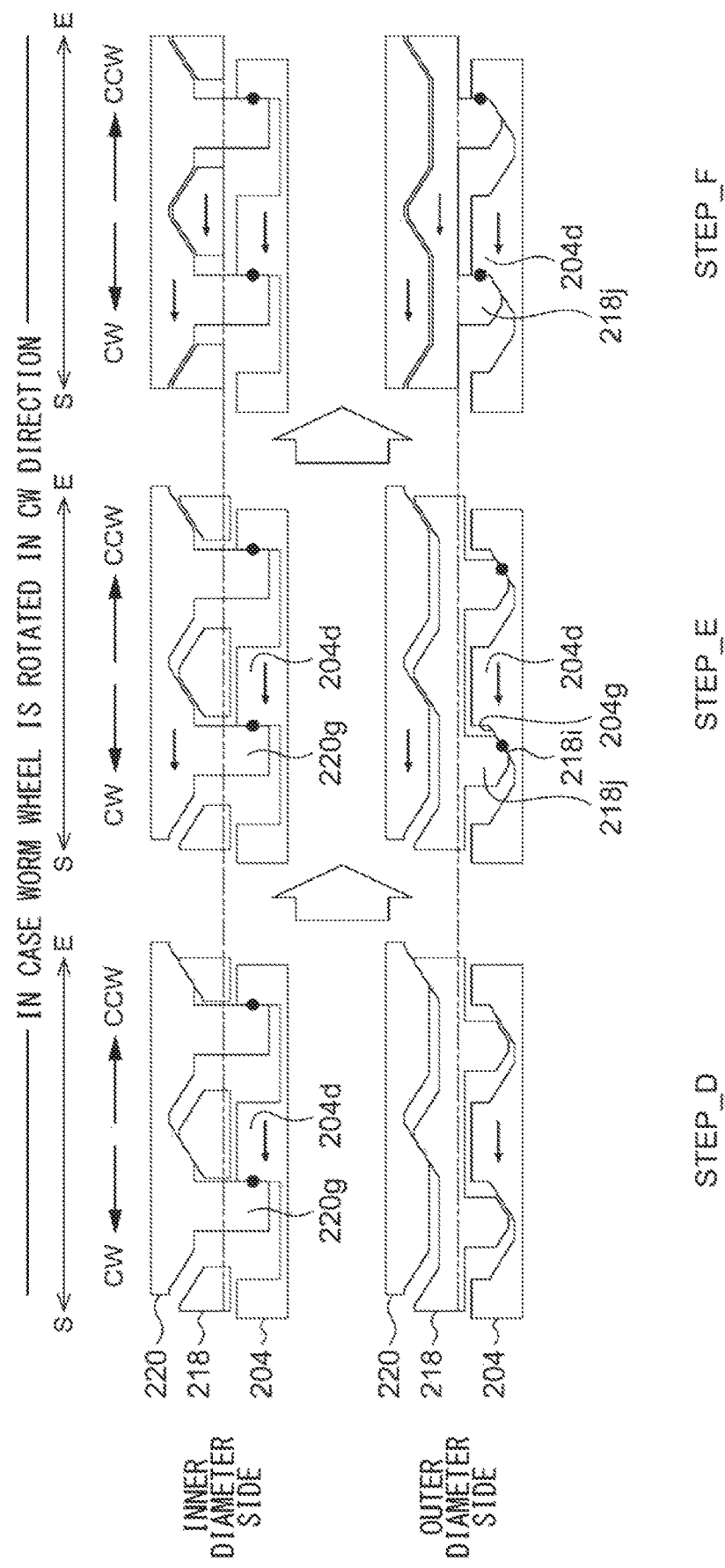
FIG. 68 is a schematic diagram illustrating the action performed when the motor in the state shown in FIG. 66 where the reverse rotation prevention mechanism is functioning is driven in a direction in which the worm wheel is rotated in the clockwise direction (CW)

FIG. 67 is a schematic diagram illustrating the action performed when the motor in the state shown in FIG. 66 where the reverse rotation prevention mechanism is functioning is driven in a direction in which the worm wheel is rotated in the counterclockwise direction (CCW). FIG. 68 is a schematic diagram illustrating the action performed when the motor in the state shown in FIG. 66 where the reverse rotation prevention mechanism is functioning is driven in a direction in which the worm wheel is rotated in the clockwise direction (CW).

When the motor is driven in a direction in which the worm wheel 204 is rotated in the counterclockwise direction, the worm wheel 204 starts rotating and the sloped portion 204g of the worm wheel 204 comes into contact with the sloped portion 218i of the lock plate 218 as shown in FIG. 67 (STEP_A). As the worm wheel 204 is rotated further, the convex engaging portion 204d of the worm wheel 204 comes into contact with the convex portion 218j of the lock plate 218 (STEP_B). This moves the lock plate 218 in a direction away from the worm wheel 204 so that the braking force generated between the lock plate 218 and the lock plate side brake member 216 is removed.

As the worm wheel 204 is further rotated, the convex engaging portion 220g of the output plate 220 is engaged with the convex engaging portion 204d of the worm wheel 204, causing the output plate 220, as well as the lock plate 218, to be rotated along with the worm wheel 204 (STEP_C). In other words, the lock plate 218 and the output plate 220 are rotated concurrently in the absence of a force in the respective sloped portions so that the output plate 220 is rotated in the absence of a braking force. As a result, the rotational force exerted on the worm wheel 204 is transmitted to the output shaft 202.

Similarly, when the motor is driven in a direction in which the worm wheel 204 is rotated in the clockwise direction, the worm wheel 204 starts rotating and the convex engaging portion 220g of the output plate 220 comes into contact with the convex engaging portion 204d of the worm wheel 204, causing the output plate 220 to start rotating along with the worm wheel 204 (STEP_D). As the worm wheel 204 is rotated further, the sloped portion 218i of the convex portion 218j of the lock plate 218 comes into contact with the sloped portion 204g of the convex engaging portion 204d of the worm wheel 204 (STEP_E). This moves the lock plate 218 in a direction away from the worm wheel 204 so that the braking force generated between the lock plate 218 and the lock plate side brake member 216 is removed.

As the worm wheel 204 is further rotated, the convex portion 218j of the lock plate 218 is engaged with the convex engaging portion 204d of the worm wheel 204, causing the lock plate 218, as well as the output plate 220, to be rotated along with the worm wheel 204 (STEP_F). In other words, the lock plate 218 and the output plate 220 are rotated concurrently in the absence of a force in the respective sloped portions so that the output plate 220 is rotated in the absence of a braking force. As a result, the rotational force of the worm wheel 204 is transmitted to the output shaft 202.

As shown in FIGS. 67 and 68, when the motor is driven normally, the reverse rotation prevention mechanism 200 according to the seventh embodiment is configured such that the frictional braking force generated when an external force is exerted on the output shaft 202 can be mitigated during ordinary motor operation so that reduction in the transmission efficiency of motor torque due to frictional resistance is inhibited.

[Prevention of Co-Rotation in Anti-Reverse-Rotation Mode]

As described with reference to FIG. 66, when an external force is exerted on the output shaft, the output plate 220 is rotated in, for example, the counterclockwise direction and displaced in rotational phase from the lock plate 218, causing the sloped portion 220c of the output plate 220 to come into contact with the sloped portion 218d of the lock plate 218 and generating a force that causes the output plate 220 and the lock plate 218 to be spaced apart from each other in the axial direction. However, if the lock plate 218 is co-rotated when the output plate 220 is rotated in the counterclockwise direction, the output plate 220 and the lock plate 218 are not displaced relative to each other in rotational phase, making it difficult for the sloped portion 220c of the output plate 220 and the sloped portion 218d of the lock plate 218 to come into contact with each other. As a matter of course, a force that causes the output plate 220 and the lock plate 218 to be spaced apart from each other in the axial direction is not generated and generation of a frictional braking force is delayed.

To address this, the reverse rotation prevention mechanism 200 according to the seventh embodiment is configured such that the O-ring 214 is fitted to the annular groove 212c of the casing 212 and the frictional force exerting portion 218e of the lock plate 218 is brought into contact with the O-ring 214 (see FIG. 52, etc.). Due to the frictional resistance between the frictional force exerting portion 218e and the O-ring 40, a force that maintains the lock plate 218 in its place is exerted, preventing the lock plate 218 from being co-rotated with the rotation of the output plate 220. The frictional resistance between the members is established as appropriate, allowing for the cogging torque, frictional resistance in the gear unit, frictional resistance in the shaft, etc.

Eighth Embodiment

Figure 69:
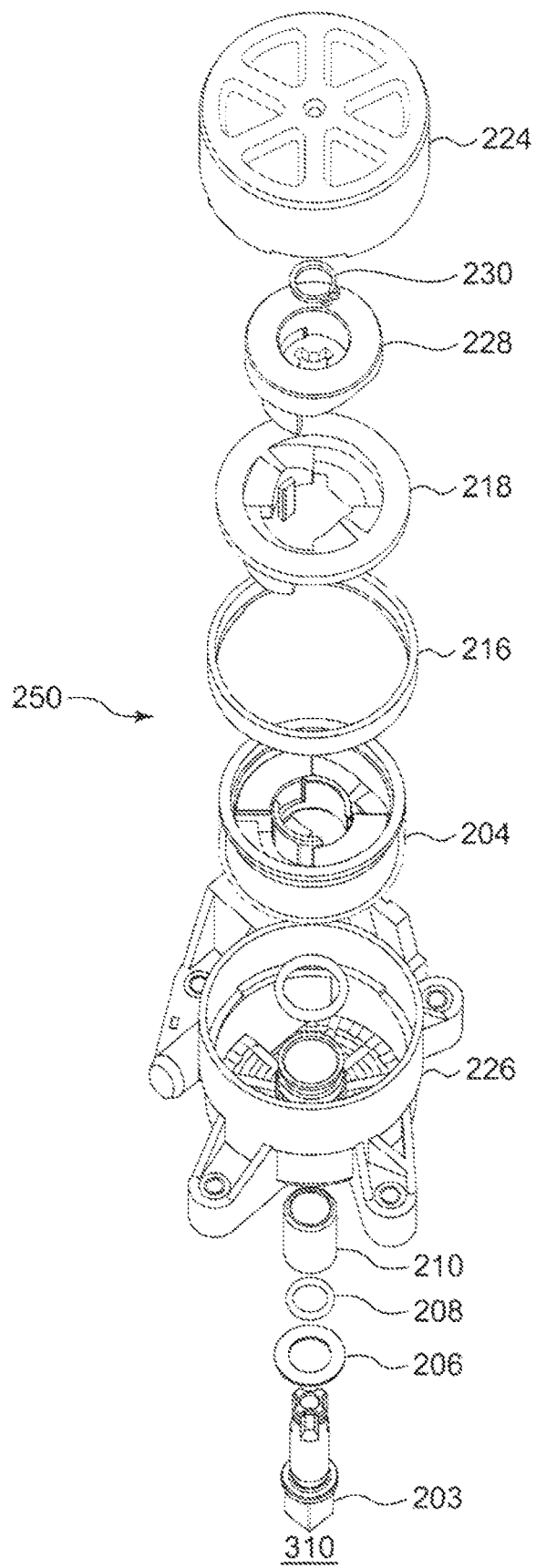
FIG. 69 is an exploded perspective view of a reducer including a reverse rotation prevention mechanism according to an eighth embodiment.
Figure 70:
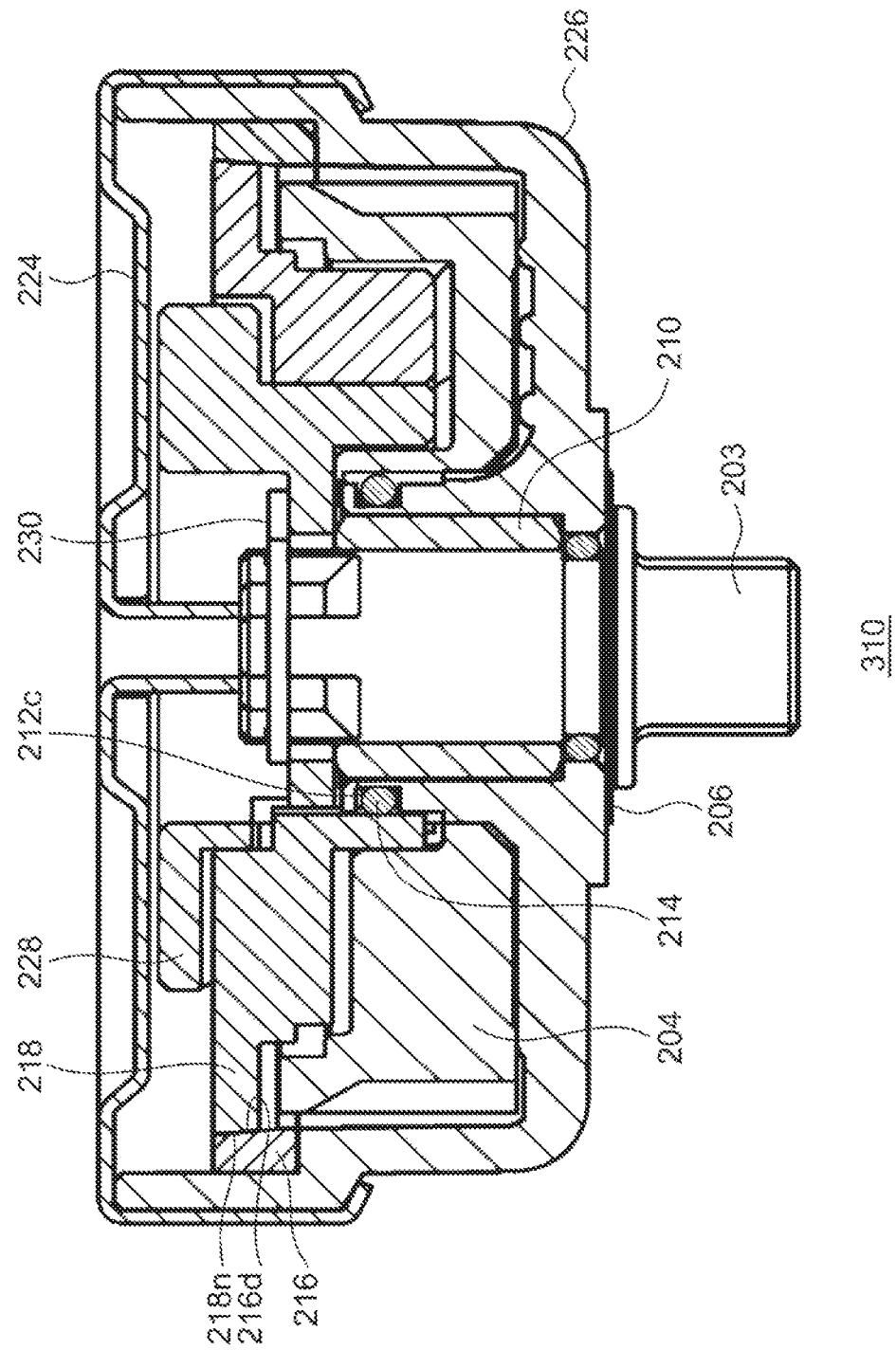
FIG. 70 is an enlarged sectional view of the reducer shown in FIG. 69.

FIG. 69 is an exploded perspective view of a reducer 310 including a reverse rotation prevention mechanism 250 according to an eighth embodiment. FIG. 70 is an enlarged sectional view of the reducer 310 shown in FIG. 69.

The reverse rotation prevention mechanism 250 according to the eighth embodiment differs from the reverse rotation prevention mechanism 200 according to the seventh embodiment in that the third frictional force generation unit is not provided. More specifically, the shapes of an output shaft 203, casing 226, and output plate 228 are different from those of the reverse rotation prevention mechanism 200. Further, the output plate side brake member used in the reverse rotation prevention mechanism 200 is not provided. The output shaft 203 is identical to the output shaft 202 except that the groove for fitting the C-shaped retaining ring 230 is provided at the end of the output shaft 203 inserted into the output plate 228 so as to be slightly more toward the output plate 228 than in the case of the output shaft 202 (see the seventh embodiment). The casing 226 differs from the casing 212 according to the seventh embodiment in that the second engaging portion 212e of the casing 212 is not provided associated with the absence of the output plate side brake member. In other words, the casing 226 differs only slightly in the shape of the edge of the opening toward the cover. Further, the output plate 228 differs from the output plate 220 according to the seventh embodiment in that the flange portion 220h having the brake surface 220i is not provided.

The end of the output shaft 203 is fixed to the output plate 228 by the C-shaped retaining ring 230, and the lock plate 218 is prevented from being moved in the axial direction of the output shaft 203 toward the cover 224.

In the reverse rotation prevention mechanism 250 configured as described above, the output plate 228 cannot move toward the cover 224 and only the lock plate 218 moves toward the lock plate side brake member 216 when a force that causes the output plate 228 and the lock plate 218 to be spaced apart from each other is generated. The brake surface 218n of the lock plate 218 is pressed by the brake surface 216d of the lock plate side brake member 216 so as to generate a frictional braking force.

The embodiments of the present invention are not limited to those described above and appropriate combinations or replacements of the features of the embodiments are also encompassed by the present invention. The embodiments may be modified by way of combinations, rearranging of the processing sequence, design changes, etc., based on the knowledge of a skilled person, and such modifications are also within the scope of the present invention.

The invention claimed is:

1. A reverse rotation prevention mechanism provided on a torque transmission path between an output shaft and a driving shaft of a motor, comprising:
   a first frictional force generation unit that resists rotation of a braking rotational member provided on the torque transmission path relative to a non-rotating fixed member; and
   a second frictional force generation unit that generates, when an external force is exerted on the output shaft, a braking force that prevents reverse rotation, wherein
   the second frictional force generation unit generates the braking force as a portion of the braking rotational member is pressed against the second frictional force generation unit as the first frictional force generation unit resists rotation of the braking rotational member.

2. The reverse rotation prevention mechanism according to claim 1, further comprising:
   a braking and pressing member that moves axially away from the braking rotational member due to a reactive force responsive to a force that presses the braking rotational member against the second frictional force generation unit when an external force is exerted on the output shaft; and
   a third frictional force generation unit that generates, when an external force is exerted on the output shaft, a braking force that prevents reverse rotation, by causing a portion of the braking and pressing member to be pressed.

3. The reverse rotation prevention mechanism according to claim 1, wherein
   the braking rotational member is pressed against the second frictional force generation unit by a driving shaft side rotational member provided on the torque transmission path more toward the driving shaft of the motor than the braking rotational member,
   the driving shaft side rotational member is engaged with and rotated, relative to the non-rotating fixed member, along with the braking rotational member when the motor is driven, and
   the first frictional force generation unit is provided between the braking rotational member and the driving shaft side rotational member.

4. The reverse rotation prevention mechanism according to claim 1, further comprising:
   a spacing mechanism that causes a portion of the braking rotational member to be spaced apart from the second frictional force generation unit when the motor is driven.

5. The reverse rotation prevention mechanism according to claim 1, wherein
   a portion of the braking rotational member is a tapered surface tapered with respect to a central axis of the braking rotational member.

6. The reverse rotation prevention mechanism according to claim 5, wherein
   a taper angle of the tapered surface is not less than 1° and less than 30°.

7. A motor with a reducer comprising:
   a motor;
   a worm to which a rotational force of a driving shaft of the motor is transmitted;
   a worm wheel in mesh with the worm;
   an output shaft to which the rotational force exerted on the worm wheel is transmitted; and
   the reverse rotation prevention mechanism according to claim 1.

8. The motor with a reducer according to claim 7, wherein the reverse rotation prevention mechanism is provided on a torque transmission path between the driving shaft of the motor and the worm.

9. The motor with a reducer according to claim 7, wherein the reverse rotation prevention mechanism is provided on a torque transmission path between the worm wheel and the output shaft.

10. A reverse rotation prevention mechanism provided on a torque transmission path between an output shaft and a driving shaft of a motor, comprising:
   a worm, to which a rotational force of the driving shaft of the motor is transmitted via the torque transmission path;
   a worm wheel in mesh with the worm, the worm wheel coupled to the output shaft such that the rotational force exerted on the worm wheel is transmitted to the output shaft;
   a first frictional force generation unit that resists rotation of a braking rotational member provided on the torque transmission path relative to a non-rotating fixed member;
   a second frictional force generation unit that generates, when an external force is exerted on the output shaft, a first braking force that prevents reverse rotation;
   a braking and pressing member that moves axially away from the braking rotational member due to a reactive force responsive to a force that presses the braking rotational member against the second frictional force generation unit when an external force is exerted on the output shaft; and
   a third frictional force generation unit that generates, when the external force is exerted on the output shaft, a second braking force that prevents reverse rotation, by causing a portion of the braking and pressing member to be pressed, wherein
   the second frictional force generation unit generates the braking force as a portion of the braking rotational member is pressed against the second frictional force generation unit as the first frictional force generation unit resists rotation of the braking rotational member.

11. A reverse rotation prevention mechanism provided on a torque transmission path between an output shaft and a driving shaft of a motor, comprising:
   an output shaft side rotational member coupled to the output shaft;
   a braking rotational member provided adjacent to the output shaft side rotational member;
   a driving shaft side rotational member engaged with and rotated along with the output shaft side rotational member and the braking rotational member when the motor is driven, the driving shaft side rotational member being coupled toward the driving shaft of the motor; and
   a frictional force generation unit which generates, when an external force is exerted on the output shaft, a braking force that prevents reverse rotation, by causing the output shaft side rotational member to move axially away from the braking rotational member and cause a portion of the braking rotational member to be pressed.

12. The reverse rotation prevention mechanism according to claim 11, further comprising:
   a spacing mechanism that causes a portion of the braking rotational member to be spaced apart from the frictional force generation unit when the motor is driven.

* * * * *